US011158880B2

(12) United States Patent
Chao et al.

(10) Patent No.: US 11,158,880 B2
(45) Date of Patent: Oct. 26, 2021

(54) TRANSLUCENT AND TRANSPARENT SEPARATORS

(71) Applicant: QuantumScape Battery, Inc., San Jose, CA (US)

(72) Inventors: Cheng-Chieh Chao, San Jose, CA (US); Zhebo Chen, San Jose, CA (US); Lei Cheng, San Jose, CA (US); Niall Donnelly, Malvern, PA (US); Tim Holme, Mountain View, CA (US); Tommy Huang, San Jose, CA (US); Sriram Iyer, Cupertino, CA (US); Kian Kerman, San Jose, CA (US); Harsh Maheshwari, San Jose, CA (US); Jagdeep Singh, Los Gatos, CA (US); Gengfu Xu, Santa Clara, CA (US)

(73) Assignee: QuantumScape Battery, Inc., San Jose, CA (US)

( * ) Notice: Subject to any disclaimer, the term of this patent is extended or adjusted under 35 U.S.C. 154(b) by 118 days.

(21) Appl. No.: 16/320,072

(22) PCT Filed: Aug. 4, 2017

(86) PCT No.: PCT/US2017/045635
§ 371 (c)(1),
(2) Date: Jan. 23, 2019

(87) PCT Pub. No.: WO2018/027200
PCT Pub. Date: Feb. 8, 2018

(65) Prior Publication Data
US 2019/0260073 A1 Aug. 22, 2019

Related U.S. Application Data

(60) Provisional application No. 62/371,640, filed on Aug. 5, 2016.

(51) Int. Cl.
H01M 10/0562 (2010.01)
H01M 10/0525 (2010.01)
H01M 10/052 (2010.01)

(52) U.S. Cl.
CPC ..... *H01M 10/0562* (2013.01); *H01M 10/052* (2013.01); *H01M 10/0525* (2013.01);
(Continued)

(58) Field of Classification Search
CPC .......... H01M 10/0562; H01M 10/052; H01M 10/0525; H01M 2300/0068;
(Continued)

(56) References Cited

U.S. PATENT DOCUMENTS 4,259,061 A  3/1981 Dubetsky
4,340,436 A  7/1982 Dubetsky et al.
(Continued)

FOREIGN PATENT DOCUMENTS

CN  101518164  8/2009
CN  102010183  4/2011
(Continued)

OTHER PUBLICATIONS

Yi et al., "Key parameters governing the densification of cubic-$Li_7La_3Zr_2O_{12}$ Li+conductors", Journal Of Power Sources, Elsevier SA, CH, vol. 352, Mar. 31, 2017, pp. 156-164.
(Continued)

*Primary Examiner* — Kwang Han
(74) *Attorney, Agent, or Firm* — Squire Patton Boggs (US) LLP

(57) ABSTRACT

Provided herein are defect-free solid-state separators which are useful as $Li^+$ ion-conducting electrolytes in electrochemical cells and devices, such as, but not limited to, rechargeable batteries. In some examples, the separators have a $Li^+$ ion-conductivity greater than $1*10^{-3}$ S/cm at room temperature.

25 Claims, 11 Drawing Sheets

(52) U.S. Cl.
CPC ............... *H01M 2300/008* (2013.01); *H01M 2300/0068* (2013.01); *H01M 2300/0071* (2013.01); *H01M 2300/0091* (2013.01)

(58) Field of Classification Search
CPC ... H01M 2300/0071; H01M 2300/008; H01M 2300/0091; Y02E 60/10
See application file for complete search history.

(56) References Cited

U.S. PATENT DOCUMENTS

| | | |
|---|---|---|
| 4,492,783 A | 1/1985 | Tanaka et al. |
| 5,014,763 A | 5/1991 | Frank |
| 5,130,067 A | 7/1992 | Flaitz et al. |
| 5,256,242 A | 10/1993 | Imaeda et al. |
| 5,279,994 A | 1/1994 | Kerkar |
| 5,296,318 A | 3/1994 | Gozdz et al. |
| 5,456,000 A | 10/1995 | Gozdz et al. |
| 5,460,904 A | 10/1995 | Gozdz et al. |
| 5,620,637 A | 4/1997 | Kaga et al. |
| 5,874,162 A | 2/1999 | Bastian et al. |
| 5,922,493 A | 7/1999 | Humphrey, Jr. et al. |
| 6,277,524 B1 | 8/2001 | Kanno |
| 6,306,535 B1 | 10/2001 | Tomimatsu et al. |
| 6,322,923 B1 | 11/2001 | Spotnitz et al. |
| 6,447,712 B1 | 9/2002 | Dogan et al. |
| 6,656,641 B1 | 12/2003 | Kumar |
| 6,852,138 B1 | 2/2005 | Topsoe et al. |
| 6,863,862 B2 | 3/2005 | Rasouli et al. |
| 6,924,065 B2 | 8/2005 | Noh |
| 7,108,827 B1 | 9/2006 | Hata et al. |
| 7,736,810 B2 | 6/2010 | Noh |
| 7,794,557 B2 | 9/2010 | Hui et al. |
| 7,901,658 B2 | 3/2011 | Weppner et al. |
| 7,923,149 B2 | 4/2011 | Hwang et al. |
| 7,947,213 B2 | 5/2011 | Badding et al. |
| 8,092,941 B2 | 1/2012 | Weppner et al. |
| 8,268,488 B2 | 9/2012 | Neudecker |
| 8,283,843 B2 | 10/2012 | Pan et al. |
| 8,309,258 B2 | 11/2012 | Kanamura et al. |
| 8,329,605 B2 | 12/2012 | Bernard-Granger et al. |
| 8,431,287 B2 | 4/2013 | Teramoto |
| 8,658,317 B2 | 2/2014 | Weppner et al. |
| 8,697,292 B2 | 4/2014 | Kanno et al. |
| 8,828,580 B2 | 9/2014 | Visco et al. |
| 8,865,355 B2 | 10/2014 | Iriyama et al. |
| 8,877,388 B1 | 11/2014 | Ihlefeld et al. |
| 8,940,446 B1 | 1/2015 | Holme et al. |
| 9,034,526 B2 | 5/2015 | Teshima et al. |
| 9,093,717 B2 | 7/2015 | Sakamoto et al. |
| 9,287,106 B1 | 3/2016 | Miao et al. |
| 9,362,546 B1 | 6/2016 | Donnelly et al. |
| 9,806,372 B2 | 10/2017 | Holme et al. |
| 9,966,630 B2 | 5/2018 | Cheng et al. |
| 9,970,711 B2 | 5/2018 | Iyer et al. |
| 10,008,742 B2 | 6/2018 | Holme et al. |
| 10,103,405 B2 | 10/2018 | Choi et al. |
| 10,283,811 B2 | 5/2019 | Badding et al. |
| 10,290,895 B2 | 5/2019 | Holme et al. |
| 10,305,141 B2 | 5/2019 | Choi et al. |
| 10,347,936 B2 | 7/2019 | Choi et al. |
| 10,347,937 B2 | 7/2019 | Beck et al. |
| 10,361,455 B2 | 7/2019 | Allenic et al. |
| 10,403,931 B2 | 9/2019 | Holme et al. |
| 10,403,932 B2 | 9/2019 | Choi et al. |
| 10,422,581 B2 | 9/2019 | Lyer et al. |
| 10,431,806 B2 | 10/2019 | Donnelly et al. |
| 10,431,850 B2 | 10/2019 | Choi et al. |
| 10,439,251 B2 | 10/2019 | Holme et al. |
| 10,563,918 B2 | 2/2020 | Iyer et al. |
| 10,651,502 B2 | 5/2020 | Holme et al. |
| 10,766,165 B2 | 9/2020 | Badding et al. |
| 10,804,564 B2 | 10/2020 | Allenic et al. |
| 10,862,161 B2 | 12/2020 | Choi et al. |
| 2002/0054419 A1 | 5/2002 | Beteille et al. |
| 2003/0049499 A1 | 3/2003 | Murakawa et al. |
| 2003/0072870 A1 | 4/2003 | Brandle et al. |
| 2003/0148179 A1 | 8/2003 | Uyama et al. |
| 2004/0191617 A1 | 9/2004 | Visco et al. |
| 2005/0016839 A1 | 1/2005 | Horne et al. |
| 2006/0120160 A1 | 6/2006 | Park et al. |
| 2006/0197245 A1 | 9/2006 | Cheng et al. |
| 2007/0015061 A1 | 1/2007 | Klaassen |
| 2007/0148553 A1 | 6/2007 | Weppner et al. |
| 2007/0231704 A1 | 10/2007 | Inda |
| 2008/0145751 A1 | 6/2008 | Ogumi et al. |
| 2009/0162755 A1 | 6/2009 | Neudecker |
| 2009/0194222 A1 | 8/2009 | Teramoto |
| 2009/0197172 A1 | 8/2009 | Inda |
| 2009/0226790 A1 | 9/2009 | Kanamura et al. |
| 2009/0301769 A1 | 12/2009 | Seppa et al. |
| 2009/0311567 A1 | 12/2009 | Visco et al. |
| 2009/0317724 A1 | 12/2009 | Kumar et al. |
| 2010/0047696 A1 | 2/2010 | Yoshida et al. |
| 2010/0203383 A1 | 8/2010 | Weppner et al. |
| 2011/0045355 A1 | 2/2011 | Ichikawa et al. |
| 2011/0052972 A1 | 3/2011 | Sohn |
| 2011/0053000 A1 | 3/2011 | Kanamura et al. |
| 2011/0053001 A1 | 3/2011 | Babic et al. |
| 2011/0053002 A1 | 3/2011 | Yamamura et al. |
| 2011/0133136 A1 | 6/2011 | Weppner et al. |
| 2011/0198785 A1 | 8/2011 | Kester et al. |
| 2011/0223487 A1 | 9/2011 | Johnson et al. |
| 2011/0244337 A1 | 10/2011 | Ohta et al. |
| 2011/0262796 A1 | 10/2011 | Shimooka et al. |
| 2011/0281175 A1 | 11/2011 | Hudson et al. |
| 2012/0100433 A1 | 4/2012 | Suyama et al. |
| 2012/0196189 A1 | 8/2012 | Babic et al. |
| 2012/0237834 A1 | 9/2012 | Ogasa |
| 2012/0276439 A1 | 11/2012 | Fujita et al. |
| 2013/0085055 A1 | 4/2013 | Raj et al. |
| 2013/0122380 A1 | 5/2013 | Visco et al. |
| 2013/0177811 A1 | 7/2013 | Roffat et al. |
| 2013/0189562 A1 | 7/2013 | Dolle et al. |
| 2013/0216783 A1 | 8/2013 | Duan et al. |
| 2013/0230778 A1 | 9/2013 | Saimen et al. |
| 2013/0260257 A1 | 10/2013 | Choi |
| 2013/0288875 A1 | 10/2013 | Miyagawa et al. |
| 2013/0344416 A1 | 12/2013 | Sakamoto et al. |
| 2014/0057153 A1 | 2/2014 | Visco et al. |
| 2014/0060723 A1 | 3/2014 | Herle et al. |
| 2014/0072870 A1 | 3/2014 | Otsuka et al. |
| 2014/0093785 A1 | 4/2014 | Sugiura et al. |
| 2014/0099538 A1 | 4/2014 | Johnson et al. |
| 2014/0120409 A1 | 5/2014 | Ouchi et al. |
| 2014/0120421 A1 | 5/2014 | Ouchi et al. |
| 2014/0134483 A1 | 5/2014 | Ouchi et al. |
| 2014/0162113 A1 | 6/2014 | Ohta et al. |
| 2014/0170504 A1 | 6/2014 | Baek et al. |
| 2014/0186720 A1 | 7/2014 | Kintaka |
| 2014/0193695 A1 | 7/2014 | Hoshina et al. |
| 2014/0205910 A1 | 7/2014 | Weppner et al. |
| 2014/0287305 A1* | 9/2014 | Wachsman .......... H01M 10/052 429/211 |
| 2014/0295287 A1 | 10/2014 | Eisele et al. |
| 2014/0377665 A1 | 12/2014 | Yoshida et al. |
| 2015/0015542 A1 | 1/2015 | Hou |
| 2015/0024292 A1 | 1/2015 | Yamada et al. |
| 2015/0037688 A1 | 2/2015 | Otsuka et al. |
| 2015/0044576 A1 | 2/2015 | Eisele et al. |
| 2015/0056520 A1 | 2/2015 | Thokchom et al. |
| 2015/0099188 A1 | 4/2015 | Holme et al. |
| 2015/0099190 A1 | 4/2015 | Holme et al. |
| 2015/0130115 A1 | 5/2015 | Sung et al. |
| 2015/0180001 A1 | 6/2015 | Johnson et al. |
| 2015/0200420 A1 | 7/2015 | Holme et al. |
| 2015/0243974 A1 | 8/2015 | Holme et al. |
| 2015/0295274 A1 | 10/2015 | Engel et al. |
| 2015/0333307 A1 | 11/2015 | Thokchom et al. |
| 2016/0056500 A1 | 2/2016 | Holme et al. |
| 2016/0087321 A1 | 3/2016 | Wöhrle et al. |
| 2016/0111751 A1 | 4/2016 | Badding et al. |
| 2016/0149260 A1 | 5/2016 | Badding et al. |
| 2016/0190639 A1 | 6/2016 | Sung et al. |

(56) References Cited

U.S. PATENT DOCUMENTS

| | | |
|---|---|---|
| 2016/0204466 A1 | 7/2016 | Nogami et al. |
| 2016/0211547 A1 | 7/2016 | Hwang et al. |
| 2016/0229701 A1 | 8/2016 | Heine et al. |
| 2016/0240887 A1 | 8/2016 | Hatta et al. |
| 2016/0244665 A1 | 8/2016 | Vosgroene et al. |
| 2016/0293988 A1 | 10/2016 | Sakamoto et al. |
| 2016/0308243 A1 | 10/2016 | Herle et al. |
| 2016/0308244 A1 | 10/2016 | Badding et al. |
| 2017/0005367 A1 | 1/2017 | Van Berkel et al. |
| 2017/0022112 A1 | 1/2017 | Karpenko et al. |
| 2017/0054139 A1 | 2/2017 | Kerkamm |
| 2017/0062873 A1 | 3/2017 | Iyer et al. |
| 2017/0162901 A1 | 6/2017 | Chen et al. |
| 2017/0183265 A1 | 6/2017 | Badding et al. |
| 2017/0214048 A1 | 7/2017 | Qian et al. |
| 2017/0214084 A1 | 7/2017 | Lei et al. |
| 2018/0069263 A1 | 3/2018 | Holme et al. |
| 2018/0301754 A1 | 10/2018 | Badding et al. |
| 2018/0375149 A1 | 12/2018 | Beck et al. |
| 2019/0214678 A1 | 7/2019 | Hwang et al. |
| 2019/0245178 A1 | 8/2019 | Cao et al. |
| 2019/0260073 A1 | 8/2019 | Chao et al. |
| 2019/0363398 A1 | 11/2019 | Badding et al. |

FOREIGN PATENT DOCUMENTS

| | | |
|---|---|---|
| CN | 102280659 A | 12/2011 |
| CN | 103117413 | 5/2013 |
| CN | 109 378 525 A | 2/2019 |
| JP | H02-111658 A | 4/1990 |
| JP | 2000-128629 | 5/2000 |
| JP | 2004-63261 A | 2/2004 |
| JP | 2006-8488 | 1/2006 |
| JP | 2012-031025 | 2/2012 |
| JP | 2012-224520 A | 11/2012 |
| JP | 2012-243743 | 12/2012 |
| JP | 2013-107779 | 6/2013 |
| JP | 2013-134852 | 7/2013 |
| JP | 2013-214421 | 10/2013 |
| JP | 2014-2965 A | 1/2014 |
| JP | 2015-130481 A | 7/2015 |
| JP | 2015-215998 | 12/2015 |
| WO | WO 2011/038773 | 4/2011 |
| WO | WO 2012/114175 | 8/2012 |
| WO | WO 2013/010692 | 1/2013 |
| WO | WO 2013/128769 | 9/2013 |
| WO | WO 2015/054320 | 4/2015 |
| WO | WO 2015/076944 | 5/2015 |
| WO | WO 2016/069749 | 5/2016 |
| WO | WO 2017/131676 A1 | 8/2017 |
| WO | WO 2017/197406 A1 | 11/2017 |
| WO | WO 2018/075972 A1 | 4/2018 |
| WO | WO 2018/236394 A1 | 12/2018 |
| WO | WO 2019/090360 A1 | 5/2019 |
| WO | WO 2020/081718 A1 | 4/2020 |

OTHER PUBLICATIONS

Agrawal et al., "Solid polymer electrolytes: materials designing and all-solid-state battery applications: an overview", Journal of Physics D: Applied Physics 41, 2008, 223001, 18 pages.

Ahmad et al., "Concentration and mobility of mobile Li+ions in $Li_6BaLa_2Ta_2O_{12}$ and $Li_5La_3Ta_2O_{12}$ garnet lithium ion conductors," J Mater Sci: Mater Electron, 2015, vol. 26, pp. 8136-8142.

Ahmad, Mohamad M., "Lithium ionic conduction and relaxation dynamics of spark plasma sintered $Li_5La_3Ta_2O_{12}$ garnet nanoceramics," Ahmad Nanoscale Research Letters, 2015, 10:58, 10 pages.

Ahn et al., "Local impedance spectroscopic and microstructural analyses of Al-in-diffused $Li_7La_3Zr_2O_{12}$," Journal of Power Sources, 2014, vol. 254, pp. 287-292.

Allen et al., "Effect of substitution (Ta, Al, Ga) on the conductivity of $Li_7La_3Zr_2O_{12}$", issued on Journal of Power Sources 2012, vol. 206, pp. 315-319.

Arora et al., "Battery Separators", Chemical Reviews, 2004, vol. 104, pp. 4419-4462.

Baek et al., "Garnet related lithium ion conductor processed by spark plasma sintering for all solid state batteries," Journal of Power Sources, 2014, vol. 249, pp. 197-206.

Baggetto et al., "High Energy Density All-Solid-State Batteries: A Challenging Concept Towards 3D Integration", Advanced Functional Materials, 2008, vol. 18, pp. 1057-1066.

Bernuy-Lopez et al., "Atmosphere Controlled Processing of Ga-Substituted Garnets for High Li-Ion Conductivity Ceramics," Chem. Mater. 2014, vol. 26, pp. 3610-3617.

Bonderer et al., "Free-Standing Ultrathin Ceramic Foils," Journal of the American Ceramic Society, 2010, vol. 93, No. 11, pp. 3624-3631.

Bruce et al.,"Li—O2 and Li—S batteries with high energy storage", Nature Materials, Jan. 2012, vol. 11, pp. 19-29.

Buschmann et al. "Lithium metal electrode kinetics and ionic conductivity of the solid lithium ion conductors "$Li_7La_3Zr_2O_{12}$" and $Li_{7-x}La_3Zr2_{2-x}Ta_xO_{12}$ with garnet-type strucutre," Journal of Power Sources, 2012, vol. 206, pp. 236-244.

Buschmann et al., "Structure and dynamics of the fast lithium ion conductor $Li_7La_3Zr_2O_{12}$", Phys. Chem. Chem. Phys., 2011, vol. 13, pp. 19378-19392.

Cao et al., "Effect of Sb—Ba codoping on the ionic conductivity of $Li_7La_3Zr_2O_{12}$ ceramic," Ceramics International, 2015, vol. 41, pp. 6232-6236.

Chen et al., "Origin of High Li+ Conduction in Doped $Li_7La_3Zr_2O_{12}$ Garnets," Chemistry of Materials, 2015, vol. 27, pp. 5491-5494.

Chen et al., "Sol-gel derived Li—La—Zr—O thin films as solid electrolytes for lithium-ion batteries", Journal of Materials Chemistry A, 2014, vol. 2, pp. 13277-13282.

Cheng et al., "Effect of microstructure and surface impurity segregation on the electrical and electrochemical properties of dense Al-substituted $Li_7La_3Zr_2O_{12}$," J. Mater. Chem. A, 2014, vol. 2, pp. 172-181.

Cheng et al., "Effect of Surface Microstructure on Electrochemical Performance of Garnet Solid Electrolytes," ACS Appl. Mater. Interfaces, 2015, vol. 7, pp. 2073-2081.

Cheng et al., "Interrelationships among Grain Size, Surface Composition Air Stability, and Interfacial Resistance of Al-Substitued $Lin_7La_3Zr_2O_{12}$ Solid Electrolytes," ACS Appl. Mater. Interfaces, 2015, vol. 7, pp. 17649-17655.

Cheng et al., "The origin of high electrolyte-electrode interfacial resistances in lithium cells containing garnet type solid electrolytes," Phys. Chem. Chem. Phys., 2014, vol. 16, pp. 18294-18300.

David et al., "Microstructure and Li-Ion Conductivity of Hot-Pressed Cubic $Li_7La_3Zr_2O_{12}$," J. Am. Cerami. Soc., 2015, pp. 1-6.

Deng et al., "Effect of the morphology of Li—La—Zr—O Solid electrolyte coating on the electrochemical performance of spinel $LiMn_{1.95}Ni_{0.05}O_{3.98}F_{0.02}$ cathode materials," J. Mater. Chem. A, 2014, vol. 2, pp. 18889-18897.

Dhivya et al., "Effect of Simultaneous Substitution of Y and Ta on the Stabilization of Cubic Phase, Microstructure, and Li+Conductivity of $Li_7La_3Zr_2O_{12}$ Lithium Garnet," ACS Appl. Mater. Interfaces, 2014, vol. 6, pp. 17606-17615.

Dhivya et al., "Li+transport properties of W substituted $Li_7La_3Zr_2O_{12}$ cubic lithium garnets," AIP Advances, 2013, vol. 3, pp. 082115.1-082115.21, 22 pages.

Djenadic, Ruzica et al., "Nebulized spray pyrolysis of Al-doped $Li_7La_3Zr_2O_{12}$ solid electrolyte for battery applications," Solid State Ionics, Oct. 2014, vol. 263, pp. 49-56.

Dong et al., "Electrochemical perofmrance and lithium-ion insertion/extraction mechanism studies of the novel $Li_2ZrO_3$ anode materials," Electrochimica Acta, 2015, vol. 161, pp. 219-225.

Duvel, Andre, et al., "Mechanosynthesis of Solid Electrolytes: Preparation, Characterization, and Li Ion Transport Properties of Garnet-Type Al-Doped $Li_7La_3Zr_2O_{12}$ Crystallizing with Cubic Symmetry," The Journal of Physical Chemistry, 2012, vol. 116, pp. 15192-15202.

Extended European Search Report dated Feb. 22, 2017 for European application No. 14864783.7; 9 pages.

(56) References Cited

OTHER PUBLICATIONS

Ferrese et al., "Lithium Redistribution in Lithium-Metal Batteries", Journal of The Electrochemical Society, 159, 2012, pp. A1615-A1623.

Fries, R. et al., "Fabrication and properties of an anisotropic PZT/Polymer 0-3 composite," J. Mater. Sci.: Mater. in Electronics, 1994, vol. 5, pp. 238-243.

Fu et al., "Toward Garnet electrolyte-based Li metal batteries: An ultrathin, highly effective, artificial solid-state electrolyte/metallic Li interface", Science Advances, vol. 3, No. 4, Apr. 7, 2017, pp. 1-11.

Fu et al., "Stabilizing the Garnet Solid-Electrolyte/Polysulfide Interface in Li—S Batteries", Chemistry of Materials, vol. 29, No. 19, Sep. 26, 2017, pp. 8037-8041.

Geiger et al., "Crystal Chemistry and Stability of "$Li_7La_3Zr_2O_2$" Garnet: A Fast Lithium-Ion Conductor," Inorganic Chemistry, 2011, vol. 50, pp. 1089-1097.

Goodenough, John, B., "Solid Electrolytes for Next Generation Batteries," Texas Materials Institute, The University of Texas at Austin, May 14-18, 2012, DOE Vehicle Technologies Annual Merit Review Meeting, 18 pages.

Gorte et al., "Anodes for Direct Oxidation of Dry Hydrocarbons in a Solid-Oxide Fuel Cell", Advanced Materials, 2000, vol. 12, No. 19, pp. 1465-1469.

Gu et al., "Effects of penta- and trivalent dopants on structures and conductivity $Li_7La_3Zr_2O_{12}$ ," Solid State Ionics, 2015, vol. 274, pp. 100-105.

Han et a., "Experimental visualization of lithium conduction pathways in garnet-type $Li_7La_3Zr_2O_{12}$," Chem. Commun., 2012, vol. 48, pp. 9840-9842.

Hayashi et al., "New Phases in $La_2O_3$—$Li_2O$—$Ta_2O_5$ System," Mat. Res. Bull. 1986, vol. 21, No. 3, pp. 289-293.

Herrmann et al., "Micro-segregation in liquid phase sintered silicon carbide ceramics," Journal of the European Ceramic Society, Apr. 1, 2010, vol. 30, pp. 1495-1501.

Hitz et al., "Highly Li-Stuffed Garnet-Type $Li_{7-x}La_3Zr_{2-x}YxO_{12}$," Journal of The Electrochemical Society, 2013, vol. 160, No. 8, pp. A1248-A1255.

Hyooma et al.,"Crystal Structures of $La_3Li_5M_2O_{12}$ (M=Nb, Ta)," Mat. Res. Bull. 1988, vol. 23, No. 10, pp. 1399-1407.

International Search Report and Written Opinion dated Apr. 15, 2016 in PCT/US2016/015209, 14 pages.

International Search Report and Written Opinion dated Dec. 1, 2016 in PCT/2016/043428, 11 pages.

International Search Report and Written Opinion dated Mar. 10, 2015 in PCT/US2014/059578, 15 pages.

International Search Report and Written Opinion dated Mar. 23, 2015 in PCT/US2014/059575, 16 pages.

Ishiguro et al., "Stability of Nb—Doped Cubic $Li_7La_3Zr_2O_2$ with Lithium Metal," Journal of the Electrochemical Society, 2013, vol. 160, No. 10, pp. A1690-A1693.

Ito, Seitaro et al., "A rocking chair type all-solid-state lithium ion battery adopting $Li_2O$—$ZrO_2$ coated $LiNi_{0.8}Co_{0.15}Al_{0.05}O_2$ and a sulfide based electrolyte," Journal of Power Sources, 248, 2014, pp. 943-950.

Jalem et al., "Effects of Gallium doping in Garnet-Type $Li_7La_3Zr_2O_{12}$ Solid Electrolytes," Chemistry of Materials, 2015, vol. 27, pp. 2821-2831.

Jalem et al., "Insights into the Lithium-Ion Conduction Mechanism of Garnet-Type Cubic $Li_5La_3Ta_2O_{12}$ by ab-Initio Calculations," J. Phys. Chem. C 2015, vol. 119, pp. 20783-20791.

Janani et al., "Influence of sintering additives on densification and $Li^+$ conductivity of Al doped $Li_7La_3Zr_2O_{12}$ lithium garnet," RSC Adv. 2014, vol. 4, pp. 51228-51238.

Janani et al., "Optimization of Lithium Content and Sintering Aid for Maximized Li+ Conductivity and Density in Ta-Doped $Li_7La_3Zr_2O_{12}$," J. Am. Ceram. Soc., 2015, pp. 1-8; DOI: 10.1111/jace.13578.

Jin et al., "Al-doped $Li_7La_3Zr_2O_2$ synthesized by a polymerized complex method," Journal of Power Sources, 2011, vol. 196, pp. 8683-8687.

Jung et al., "Ceramic separators based on Lip-conducting inorganic electrolyte for high-performance lithium-ion batteries with enhanced safety," Journal of Power Sources, 2015, vol. 293, pp. 675-683.

Kang et al., "First-Principles Study of Chemical Stability of Lithium Oxide Garnets $Li_7La_3M_2O_{12}$ (M=Zr, Sn, or Hf)," The Journal of Physical Chemistry C, 2014, vol. 118 (31), pp. 17402-17406.

Kato et al., "Preparation of thick-film electrode-solid electrolyte composites on $Li_7La_3Zr_2O_{12}$ and their electrochemical properties," Journal of Power Sources, 303, 2016, pp. 65-72.

Katsui et al., "Preparation of cubic and tetragonal $Li_7La_3Zr_2O_{12}$ flim by metal organic chemical vapor deposition," Thin Solid Films, vol. 584, Jun. 2015, pp. 130-134.

Kc et al., "Point defects in garnet-type solid electrolyte (c-$Li_7La_3Zr_2O_{12}$) for Li-ion batteries," Solid State Ionics, 2014, vol. 261, pp. 100-105.

Kerman et al. "Review—Practical Challenges Hindering the Development of Solid State Li Ion Batteries", Journal of the Electrochemical Society, 2017, vol. 164. No. 7, pp. A1731-A1744.

Kerman et al., "Complex oxide nanomembranes for energy conversion and storage: A review ", Journal of Materials Research, vol. 29, No. 3, Feb. 14, 2014, pp. 320-337.

Kihira et al., "Effect of Simultaneous Substitution of Alkali Metals and Nb in $Li_7La_3Zr_2O_{12}$ on Lithium-Ion Conductivity," ECS Electrochemistry Letters, 2013, vol. 2, No. 7, pp. A56-A59.

Kim et al., "Characterization of the interface between $LiCoO_2$ and $Li_7La_3Zr_2O_{12}$ in an all-solid-state rechargeable lithium battery," Journal of Power Sources, 196, 2011, pp. 764-767.

Kim et al., "Epitaxial growth and lithium ion conductivity of lithium-oxide garnet for an all solid-state battery electrolyte†", Dalton Transactions, 2013, vol. 42, pp. 13112-13117.

Kim et al., "The Effect of Relative Density on the Mechanical Properties of Hot-Pressed Cubic $Li_7La_3Zr_2O_{12}$," J. Am. Ceram. Soc., 2016, pp. 1-8.; DOI: 10.1111/jace.14084.

Klenk et al., "Local structure and dyanmics of lithium garnet ionic conductors: tetragonal and cubic $Li_7La_3Zr_2O_7$," Phys. Chem. Chem. Phys., 2015, vol. 17, pp. 8758-8768.

Kokal et al., "Preparation and characterization of three dimensionally ordered macroporous $Li_5La_3Ta_2O_{12}$ by colloidal crystal templating for all-solid-state lithium-ion batteries," Ceramics International, 2015, vol. 41, pp. 737-741.

Kokal et al., "Sol-gel synthesis and lithium ion conductivity of $Li_7La_3Zr_2O_{12}$ with garnet-related type structure," Solid State Ionics, 2011, vol. 185, pp. 42-46.

Kotobuki et al., "Compatibility of $Li_7La_3Zr_2O_{12}$ Solid Electrolyte to All-Solid-State Battery Using Li Metal Anode," *Journal of the Electrochemical Society*, 2010, vol. 157, No. 10, pp. A1076-A1079.

Kotobuki et al., "Preparation of Sintered $Li_5La_3Nb_2O_{12}$ Garnet-type Li Ion Conductor via Spark Plasma Sintering Synthesis," Int. J. Electroact. Mater. 2014, vol. 2, pp. 17-21.

Kotobuki et al., "Fabrication of all-solid-state lithium battery with lithium metal anode using $Al_2O_3$-added $Li_7La_3Zr_2O_{12}$ solid electrolyte," Journal of Power Sources, 2011, vol. 196, pp. 7750-7754.

Lai et al., "Ultrahigh-Energy-Density Microbatteries Enabled by New Electrode Architecture and Micropackaging Design," Adv. Mater., 2010, vol. 22, pp. E139-E144.

Lallemant et al., "Transparent polycrystalline alumina obtained by SPS: Green bodies processing effect," Journal of the European Ceramic Society, 2012, vol. 32, pp. 2909-2915.

Langer et al., "Syntheis of single phase cubic Al-substituted $Li_7La_3Zr_2O_{12}$ by solid state lithiation of mixed hydroxides," Journal of Alloys and Compounds, 2015, vol. 645, pp. 64-69.

Lau et al., "Density Functional Investigation of the Thermodynamic Stability of Lithium Oxide Bulk Crystalline Structures as a Function of Oxygen Pressure", J. Phys. Chemistry C, 2011, vol. 115, pp. 23625-23633.

Lee et al., "High lithium ion conductivity of $Li_7La_3Zr_2O_{12}$ synthesized by solid state reaction," Solid State Ionics, 2014, vol. 258, pp. 13-17.

Li et al., "Optimizing Li conductivity in a garnet framework," J. Mater. Chem., 2012, vol. 22, pp. 15357-15361.

(56) References Cited

OTHER PUBLICATIONS

Li et al., "The reaction of $Li_{6.5}La_3Zr_{1.5}Ta_{0.5}O_{12}$ with water," Solid State Ionics, 2015, vol. 269, pp. 57-61.

Li et al., "W-Doped $Li_7La_3Zr_2O_{12}$ Ceramic Electrolytes for Solid State Li-ion Batteries," Electrochimica Acta, 2015, vol. 180, pp. 37-42.

Liu et al., "High Ion Conductivity in Garnet-type F-doped $Li_7La_3Zr_2O_{12}$," Journal of Inorganic Materials, Sep. 2015, vol. 30, No. 9, pp. 995-1001.

Liu et al., "Reversible ion exchange and structural stability of garnet-type Nb-doped $Li_7La_3Zr_2O_{12}$ in water for applications in lithium batteries," Journal of Power Sources, 2015, vol. 282, pp. 286-293.

Liu et al., "Achieving high capacity in bulk-type solid-state lithium ion battery based on $Li_{6.75}La_3Zr_{1.75}Ta_{0.25}O_{12}$ electrolyte: Interfacial resistance," Journal of Power Sources, 2016, vol. 324, pp. 349-357.

Matsuda et al., "Phase formation of a garnet-type lithium-ion conductor $Li_{7-3x}Al_xLa_3Zr_2O_{12}$," Solid State Ionics, 2015, vol. 277, pp. 23-29.

Matsui et al., "Phase stability of a garnet-type lithium ion conductor $Li_7La_3Zr_2O_{12}$," The Royal Society of Chemistry, Dalton Transactions, 2014, vol. 43, pp. 1019-1024.

Matsui et al., "Phase transformation of the garnet structured lithium ion conductor: $Li_7La_3Zr_2O_{12}$", Solid State Ionics, 2014, vol. 262, pp. 155-159.

McCloskey et al., "On the Mechanism of Nonaqueous $Li$—$O_2$ Electrochemistry on C and Its Kinetic Overpotentials: Some Implications for Li-Air Batteries", J. Phys. Chemistry C, 2012, vol. 116, pp. 23897-23905.

Miara et al., "Effect of Rb and Ta Doping on the Ionic Conductivity and Stability of the Garnet $Li_{7+2x-y}(La_{3-x}Rb_x)(Zr_{2-y}Ta_y)O_{12}$ ($0 \leq x \leq 0.375$, $0 \leq y \leq 1$) Superionic Conductor: A First Principles Investigation," Chem. Mater. 2013, vol. 25, pp. 3048-3055.

Miara et al., "First-Principles Studies on Cation Dopants and Electrolyte|Cathode Interphases for Lithium Garnets," Chemestry of Materials, 2015, vol. 27, pp. 4040-4047.

Minami et al., "Crystallization Process for Superionic $Li_7P_3S_{11}$ Glass—Ceramic Electrolytes", Journal of the American Ceramic Society, 2011, vol. 94, pp. 1779-1783.

Miyauchi et al., "New Amorphous Thin Films of Lithium Ion Conductive Solid Electrolyte," Solid State Ionics 9 & 10, 1983, pp. 1469-1472.

Mizuno et al., "Environmentally Friendly Flux Growth of High-Quality, Idiomorphic $Li_5La_3Nb_2O_{12}$ Crystals," Cryst. Growth Des., 2013, vol. 13, pp. 479-484.

Moshkovich et al., "The study of the anodic stability of alkyl carbonate solutions by in situ FTIR spectroscopy, EQCM, NMR and MS," Journal of Electroanalytical Chemistry, 2001, vol. 497, pp. 84-96.

Mukhopadhyay et al., "Structure and Stoichiometry in Supervalent Doped $Li_7La_3Zr_2O_{12}$," Chem. Mater., 2015, vol. 27, pp. 3658-3665.

Murugan et al., "Schnelle Lithiumionenleitung in granatartigem $Li_7La_3Zr_2O_{12}$", Angew. Chem., 2007, vol. 119, pp. 7925-7928, with English translation—"Fast Lithium Ion Conduction in Garnet-Type $Li_7La_3Zr_2O_{12}$", Angew. Chem. Int. Ed., 2007, vol. 46, pp. 7778-7781.

Narayanan et al., "Dopant Concentration—Porosity—Li-Ion Conductivity Relationship in Garnet-Type $Li_{5+2x}La_3Ta_{2-x}Y_xO_{12}$ ($0.05 \leq x \leq 0.75$) and Their Stability in Water and 1 M LiCl," Inorganic Chemistry, 2015, vol. 54, pp. 6968-6977.

Nemori et al., "Stability of garnet-type solid electrolyte $Li_xLa_3A_{2-y}B_yO_{12}$ (A=Nb or Ta, B=Sc or Zr)," Solid State Ionics, 2015, vol. 282, pp. 7-12.

Neudecker et al., "'Lithium-Free' Thin-Film Battery with In Situ Plated Li Anode," Journal of The Electrochemical Society, 2000, vol. 147, No. 2, pp. 517-523.

Ni et al., "Room temperature elastic moduli and Vickers hardness of hot-pressed LLZO cubic garnet," J. Mater. Sci., 2012, vol. 47, pp. 7978-7985.

Nyman et al., "Alternative Approach to Increasing Li Mobility in Li—La—Nb/Ta Garnet Electrolytes," Chem. Mater., 2010, vol. 22, No. 19, pp. 5401-5410.

Office Action dated May 8, 2015 in U.S. Appl. No. 14/531,929, 12 pages.

English translation of the office action of Chinese application No. 201480055386.4 dated Jan. 4, 2017; 9 pages.

Office Action of Chinese application No. 201480055387.9 dated Dec. 22, 2016 together with English translation; 7 pages.

Office Action of Japanese application No. 2016-520586 dated Nov. 28, 2017 together with English translation; 8 pages.

Ohta et al., "Co-sinterable lithium garnet-type oxide electrolyte with cathode for all-solid-state lithium ion battery," Journal of Power Sources, 2014, vol. 265, pp. 40-44.

Ohta et al., "High lithium ionic conductivity in the garnet-type oxide $Li_{7-x}La_3(Zr_{2-x}, Nb_x)O_{12}$ (X=0-2)," Journal of Power Sources, 2011, vol. 196, pp. 3342-3345.

Ohta et al., "All-solid-state lithium ion battery using garnet-type oxide and $Li_3BO_3$ solid electrolytes fabricated by screen-printing," Journal of Power Sources, vol. 238, 2013, pp. 53-56.

Ohta et al., "Electrochemical performance of an all-solid-state lithium ion battery with garnet-type oxide electrolyte," Journal of Power Sources, vol. 202, 2012, pp. 332-335.

Onodera et al., "Flux Growth of Idiomorphic Garnet-Type Solid Electrolyte Crystals for All-Solid-State Lithium-Ion Rechargeable Batteries," The Electrochemical Society, 2012, Abstract #1198, 1 page.

Park et al., "Effects of crystallinity and impurities on the electrical conductivity of Li—La—Zr—O thin films," Thin Solid Films, 2015, vol. 576, pp. 55-60.

Peng et al., "A Reversible and Higher-Rate $Li$—$O_2$ Battery", Science, Aug. 3, 2012, vol. 337, pp. 563-567.

Puech et al., "Elaboration and characterization of a free standing LiSICON membrane for aqueous lithiumeair battery," Journal of Power Sources, vol. 214, 2012, pp. 330-336.

Quartarone et al., "Electrolytes for solid-state lithium rechargeable batteries: recent advances and perspectives", Chemical Society Reviews, vol. 40, 2011, pp. 2525-2540.

Ramakumar et al., "Structure and Li+ dyanmics of Sb-doped $Li_7La_3Zr_2O_{12}$ fast lithium ion conductors," Phys. Chem. Chem. Phys. 2013, vol. 15, pp. 11327-11338.

Ramzy et al., "Tailor-Made Development of Fast Li Ion Conducting Garnet-Like Solid Electrolytes," American Chemical Society, Applied Materials and Interfaces, 2010, vol. 2, No. 2, pp. 385-390.

Rangasamy et al., "A High Conducting Oxide—Sulfide Composite Lithium Superionic Conductor," J. Mater. Chem. A, published 2014, vol. 2, pp. 4111-4116.

Rangasamy et al., "The effect of 24c-site (A) cation substitution on the tetragonal-cubic phase transition in $Li_{7-x}La_{3-x}A_xZr_2O_{12}$ garnet-based ceramic electrolyte," Journal of Power Sources, 2013, vol. 230, pp. 261-266.

Rangasamy et al., "The role of Al and Li concentration on the formation of cubic garnet solid electrolyte of nominal composition $Li_7La_3Zr_2O_{12}$," Solid State Ionics, 2012, vol. 206, pp. 28-32.

Rao et al., "In Situ Neutron Diffraction Monitoring of $Li_7La_3Zr_2O_{12}$ Formation: Toward a Rational Synthesis of Garnet Solid Electrolytes," Chemistry of Materials, 2015, vol. 27, pp. 2903-2910.

Raskovalov et al., "Structure and transport properties of $Li_7La_3Zr_{2-0.75x}Al_xO_{12}$ supersonic solid electrolytes," Journal of Power Sources, 2013, vol. 238, pp. 48-52.

Reed, James S., Principles of Ceramics Processing, 2nd Edition, John Wiley & Sons, Inc., New York, Jan. 1995, pp. 60-61.

Reinacher et al., "Preparation an electrical properties of garnet-type $Li_6BaLa_2Ta_2O_{12}$ lithium solid electrolyte thin films prepared by pulsed laser deposition," Solid State Ionics, 2014, vol. 258, pp. 1-7.

Ren et al., "Direct observation of lithium dendrites inside garnet-type lithium-ion solid electrolyte," Electrochemistry Communications, 2015, vol. 57, pp. 27-30.

Ren et al., "Effects of Li source microstructure and ionic conductivity of Al-contained $Li_{6.75}La_3Zr_{1.75}Ta_{0.25}O_{12}$ cermics," Journal of the European Ceramic Society, 2015, vol. 35, pp. 561-572.

(56) References Cited

OTHER PUBLICATIONS

Rettenwander et al., "Site Occupation of Ga and Al in Stabilized Cubic $Li_{7-3(x+y)}Ga_xAl_yLa_3Zr_2O_{12}$ Garnets as Deduced from $^{27}Al$ and $^{71}Ga$ MAS NMR at Ultrahigh Magnetic Fields," Chemistry of Materials, 2015, vol. 27, pp. 3135-3142.

Rettenwander et al., "Synthesis, Crystal Chemistry, and Electrochemical Properties of $Li_{z-2x}La_3Zr_{2-x}Mo_xO_{12}$ (x=0.1-0.4): Stabilization of the Cubic Garnet Polymorph via Substitution of $Zr^{4+}$ by $Mo^{6+}$," Inorganic Chemistry, 2015, vol. 54, pp. 10440-10449.

Rettenwander et al., "DFT study of the role of $Al^{3+}$ in the fast ion-conductor $Li_{7-3x}Al^{3+}{}_xLa_3Zr_2O_{12}$ Garnet," Chem. Mater. 2014, vol. 26, pp. 2617-2623.

Rosero-Navarro et al., "Preparation of $Li_7La_3(Zr_2-x,Nb_x)O_{12}$ (x=0-1.5) and $Li_3BO_{3/LiBO2}$ composites at low temperatures using a sol-gel process," Solid State Ionics, 2016, vol. 285, pp. 6-12.

Sakamoto et al., "Synthesis of nano-scale fast ion conducting cubic $Li_7La_3Zr_2O_{12}$", Nanotechnology, 2013, vol. 24, 424005, 8 pages.

Sakamoto, Jeff, "Garnet-based ceramic electrolyte: Enabling Li metal anodes and solid state batteries," Beyond Lithium Ion VI, Jun. 4-6, 2013, Boulder, CO., 36 pages.

Sakuda et al., "Evaluation of elastic modulus of $Li_2S—P_2S_5$ glassy solid electrolyte by ultrasonic sound velocity measurement and compression test", Journal of the Ceramic Society of Japan 121, 2013, pp. 946-949.

Satyanarayana et al., "Structure and Li+ dynamics of Sb-doped $Li_7La_3Zr_2O_{12}$ fast lithium ion conductors", issued on Phys.Chem. Chem. Phys., 2013, vol. 15, pp. 11327-11335.

Schafbauer et al., "Tape Casting as a Multi Purpose Shaping Technology for Different Applications in Energy Issues", Materials Science Forum vols. 706-709, 2012, pp. 1035-1040.

Schmidt et al., "In-situ, non-destructive acoustic characterization of solid state electrolyte cells", Journal of Power Sources, 2016, vol. 324, pp. 126-133. Added on May 2018.

Second Office Action of Chinese Application No. 201480055386.4 dated Nov. 1, 2017 together with English translation, 10 pages.

Sharafi et al., Characterizing the $Li—Li_7La_3Zr_2O_{12}$ interface stability and kinetics as a function of temperature and current density, Journal of Power Sources, 2016, vol. 302, pp. 135-139.

Shimonishi et al., "Synthesis of garnet-type $Li_{7-x}La_3Zr_2O_{12-1/2x}$ and its stability in aqueous solutions," Solid State Ionics, 2011, vol. 183, pp. 48-53.

Shin et al., "Synergistic multi-doping effects on the $Li_7La_3Zr_2O_{12}$ solid electrolyte for fast lithium ion conduction," Scientific Reports, 2015, pp. 1-9.

Song et al., "Crystal structure, migration mechanism and electrochemical performance of Cr-stabilized garnet," 2014, vol. 268, pp. 135-139.

Suárez et al., "Sintering to Transparency of Polycrystalline Ceramic Materials," 2012, ISBN: 978-953-51-0017-1, 28 pages; InTech, Available from: http://www.intechopen.com/books/sintering-of-ceramics-new-emerging-techniques/sintering-to-transparencyof-polycrystalline-ceramic-materials.

Sudo et al., "Interface behavior between garnet-type lithium-conducting solid electrolyte and lithium metal," Solid State Ionics, 2014, vol. 262, pp. 151-154.

Suzuki et al., "Transparent cubic garnet-type solid electrolyte of $Al_2O_3$-doped $Li_7La_3Zr_2O_{12}$," Solid State Ionics, 2015, vol. 278, pp. 172-176.

Tadanaga et al., "Low temperature synthesis of highly ion conductive $Li_7La_3Zr_2O_{12}—Li_3BO_3$ composites," Electrochemistry Communications, 2013, vol. 33, pp. 51-54.

Takada, "Progress and prospective of solid-state lithium batteries", Acta Materialia 61,2013, pp. 759-770.

Takeda et al., "High Pressure Form of Fluoride Garnets $Na_3M_2Li_3F_{12}$(M= & Fe)," Mat. Res. Bull., 1977, vol. 12, No. 7, pp. 689-692.

Tan et al., "Fabrication and characterization of $Li_7La_3Zr_2O_{12}$ thin films for lithium ion battery," ECS Solid Sate Letters, vol. 1, No. 6, Oct. 3, 2012, pp. Q57-Q60.

Teng, Shiang, et al., "Recent Developments in garnet based solid state electrolytes for thin film batteries," Current Opinion in Solid State and Materials Science, Feb. 2014, vol. 18, Issue 18, pp. 29-38.

Thangadurai et al., "Fast Solid-State Li Ion Conducting Garnet-Type Structure Metal Oxides for Energy Storage," J. Phys. Chem. Lett, 2015, vol. 6, pp. 292-299.

Thangadurai et al., "$Li_6ALa_2N\,O_{12}$ (A=Ca, Sr, Ba): A New Class of Fast Lithium Ion Conductors with Garnet-Like Structure," J. Am. Ceram. Soc., 2005, vol. 88, No. 2, pp. 411-418.

Thangadurai et al., "Novel Fast Lithium Ion Conduction in Garnet-Type $Li_5La_3M_2O_{12}$ (M=NB, Ta)," J. Am. Ceram. Soc., 2003, vol. 86, No. 3, pp. 437-440.

Thangadurai et al., "Garnet-type solid-state fast Li ion conductors for Li batteries: critical review", Chemical Society Reviews, 2014, vol. 43, pp. 4714-4727.

Thompson et al., "A Tale of Two Sites: On Defining the Carrier Concentration in Garnet-Based Ionic Conductors for Advanced Li Batteries," Adv. Energy Mater., 2015, 1500096, pp. 1-9.

Toda, S., et al., "Low temperature cubic garnet-type $CO_2$-doped $Li_7La_3Zr_2O_{12}$," Solid State Ionics, 2013, vol. 233, pp. 102-106.

Tong et al., "Highly Conductive Li Garnets by a Multielement Doping Strategy", Inorganic Chemistry, 2015, vol. 54, pp. 3600-3607.

Ulissi, Ulderico et al., "All solid-state battery using layered oxide cathode, lithium-carbon composite anode and thio-LISICON electrolyte," Solid State Ionics, vol. 296, 2016, pp. 13-17.

Wainwright et al., "Forces generated by anode growth in cylindrical $Li/MoS_2$ cells," Journal of Power Sources, 1991, vol. 34, pp. 31-38.

Wang et al., "Correlation and mechanism of lithium ion diffusion with the crystal strcutre of $Li_7La_3Zr_2O_{12}$ revealed by an internal friction technique," Phys. Chem. Chem. Phys., 2014, vol. 16, pp. 7006-7014.

Wang et al., "The synergistic effects of al and Te on the structure and Li+-mobility of garnet-type solid electrolytes", J. Mater. Chem. A. 2014, vol. 2, pp. 20271-20279.

Wang et al., "Transparent ceramics: Processing, materials and applications," Progress in Solid State Chemistry, 2013, vol. 41, pp. 20-54.

Wang, Dawei et al., "Toward Understanding the Lithium Transport Mechanism in Garnet-type Solid Electrolytes: Li+ Ion Exchanges and Their Mobility at Octahedral/Tetrahedral Sites," Chem. Mater. 2015, vol. 27, pp. 6650-6659.

Wang, Shutao et al., "Syntheses and structures of lithium zirconates for high-temperature $CO_2$ absorption," J. Mater. Chem. A, 2013, vol. 1, pp. 3540-3550.

Wang, Yuxing et al., "Phase transition in lithium garnet oxide ionic conductors $Li_7La_3Zr_2O_{12}$: The role of Ta substitution and $H_2O/CO_2$ exposure," Journal of Power Sources, 2015, vol. 275, pp. 612-620.

Wilkinson et al., "Effects of physical constraints on Li cycability," Journal of Power Sources, 1991, vol. 36, pp. 517-527.

Wolfenstine et al., "A preliminary investigation of fracture toughness of $Li_7La_3Zr_2O_{12}$ and its comparisoin to other solid Li-ion conductors," Materials letters, 2013, vol. 96, pp. 117-120.

Wolfenstine et al., "Chemical stability of cubic $Li_7La_3Zr_2O_{12}$ with molten lithium at elevated temperature", J. Mater. Sci., 2013, vol. 48, pp. 5846-5851. DOI 10.1007/s10853-013-7380-z.

Xie et al., "Lithium Distribution in Aluminum-Free Cubic $Li_7La_3Zr_2O_{12}$", issued on Chem. Mater. 2011, vol. 23, pp. 3587-3589.

Xie et al., "Low-temperature synthesis of $Li_7La_3Zr_2O_{12}$with cubic garnet-type structure," Materials Research Bulletin, 2012, vol. 47, pp. 1229-1232.

Xu et al., "Multistep sintering to synthesize fast lithium garnets," Journal of Power Sources, 2016, vol. 302, pp. 291-297.

Yang et al., "Nanostructured Garnet-Type Solid Electrolytes for Lithium Batteries: Electrospinning Synthesis of $Li_7La_3Zr_2O_{12}$ Nanowires and Particle Size-Dependent Phase Transformation", J.Physical Chemistry C, 2015, vol. 119, pp. 14947-14953.

Yi et al., "Flame made nanoparticles permit processing of dense, flexible, Li+ conducting ceramic electrolyte thin films of cubic-$Li_7La_3Zr_2O_{12}$ (c-LLZO) ," J. Mater. Chem. A, 2016, vol. 4, pp. 12947-12954.

(56) References Cited

OTHER PUBLICATIONS

Yoshima et al., "Thin hybrid electrolyte based on garnet-type lithium-ion conductor $Li_7La_3Zr_2O_{12}$ for 12 V-class bipolar batteries," Journal of Power Sources, 2016, vol. 302, pp. 283-290.
Zaiss et al., "Fast ionic conduction in cubic hafnium garnet $Li_7La_3Hf_2O_{12}$," Ionics, Springer-Verlag, 2010, vol. 16, pp. 855-858.
Zhang et al., "Effect of lithium ion concentration on the microstructure evolution and its association with the ionic conductivity of cubic garnet-type nominal $Li_7Al_{0.25}La_3Zr_2O_{12}$ solid electrolytes", Solid State Ionics, 2016, vol. 284, pp. 53-60.
Zhang et al., "Field assisted sintering of dense Al-substituted cubic phase $Li_7La_3Zr_2O_{12}$ solid electrolytes," Journal of Power Sources, 2014, vol. 268, pp. 960-964.
Zhang et al., "Preparation of cubic $Li_7La_3Zr_2O_{12}$ solid electrolyte using a nano-sized core-shell structured precursor," Journal of Alloys and Compounds, 2015, vol. 644, pp. 793-798.
Cheng et al., "Measurement of the Sintering Pressure in Ceramic Films", J. Am. Ceram. Soc., 1988, vol. 71, No. 4, pp. 276-280.
Cologna et al., "Effect of Al and Ce doping on the deformation upon sintering in sequential tape cast layers for solid oxide fuel cells", Journal of Power Sources, vol. 193, 2009, pp. 80-85.
Cologna et al., "Vertical sintering to measure the uniaxial viscosity of thin ceramic layers", Acta Materialia, vol. 58, 2010, pp. 5558-5564.
Gotschel et al., "Processing of preceramic paper and ceramic green tape derived multilayer structures", Advances in Applied Ceramics, vol. 112, No. 6, 2013, pp. 358-365.
Han et al., "Control of shrinkage on the behavior of co-firing offerrite and varistor multi-layers composite with organic content", J Electroceram, 2009, vol. 23, pp. 559-563.
Muralidharan et al., "Optimization of process parameters for the production of Ni—Mn—Co—Fe based NTC chip thermistors through tape casting route", Journal of Alloys and Compounds, 2011, vol. 509, pp. 9363-9371.
Olenick, "Ultra-Thin Flexible Ceramic Membranes for Electronic Applications", 46th International Symposium on Microelectronics (IMAPS 2013) | Sep. 30-Oct. 3, 2013 | Orlando, FL USA.; 5 pages.
Yang et al., "Tape-casted transparent alumina ceramic wafers", J. Mater. Res., Oct. 14, 2014, vol. 29, No. 19, pp. 2312-2317.
Yu et al., "Experimental determination of the uniaxial viscosity of low-temperature co-fired ceramic tapes by vertical sintering", Ceramics International, 2014, vol. 40, pp. 9367-9375.
Cheng J et al., "On the green density sintering behavior and electrical property of tape cast $Ce_{0.9}Gd_{0.1}O_{1.95}$ electrolyte films", Materials Research Bulletin, Dec. 1, 2002, vol. 37, No. 15, pp. 2437-2446, XP004395782.
Gurauskis et al., "Laser drilling of Ni—YSZ cermets", Journal of the European Ceramic Society, Oct. 1, 2008, vol. 28, No. 14, pp. 2671-2680, XP023610743; doi:10.10166.jeurceramsoc.2008.04.012.
L.B. Kong et al., Chapter 2, Transparent Ceramics, Topics in Mining, Metallurgy and Materials Engineering, DOI 10.1007/978-3-319-18956-7_2; pp. 29-90.
Rauscher et al. "Steel-sheet fabrication by tape casting, Low Temperature Cofired Ceramics LTCC View project Colloidal Processing View project", International Journal of Powder Metallurgy, vol. 44, No. 6, 2008, 11 pages.
Will et al., "Fabrication of thin electrolytes for second-generation solid oxide fuel cells", Solid State Ionics 131, (2000), pp. 79-96.
Willmann et al., "Characteristics and Evaluation Criteria of Substrate-based Manufacturing. Is roll-to roll the best solution for printed electronics?", Organic Electronics, 2014, vol. 15, pp. 1631-1640.
Reppert T. et al., " $Li_7La_3Zr_2D_{12}$ electrolyte for all-solid-state batteries", Future Energy, Oct. 17, 2014, pp. 1-1, XP055813972, Retrieved from the Internet: URL:https://juser.fz-juelich.de/record/171892/files/FZJ-2014-05448.pdf [retrieved on Jun. 15, 2021].
Reppert T. et al., "Oxide-ceramic electrolyte layers for all-solid-state lithium batteries", Jan. 21, 2015, pp. 1-1, XP055814028, Retrieved from the Internet: URL:https://juser.fz-juelich.de/record/188042/files/FZJ-2015-01520.pdf.

\* cited by examiner

TRANSLUCENT AND TRANSPARENT SEPARATORS

CROSS-REFERENCE TO RELATED APPLICATIONS

This application is a National Stage entry of International PCT Patent Application No. PCT/US2017/45635, filed Aug. 4, 2017, which claims the benefit of priority to U.S. Provisional Patent Application No. 62/371,640, filed Aug. 5, 2016, the entire contents of each of which are herein incorporated by reference in their entirety for all purposes.

FIELD

The present disclosure concerns solid electrolytes suitable for use in electrochemical cells and devices.

BACKGROUND

In a rechargeable $Li^+$ ion battery, $Li^+$ ions move from a negative electrode to a positive electrode during discharge and in the opposite direction during charge. This process produces electrical energy (Energy=Voltage×Current) in a circuit connecting the electrodes, which is electrically insulated from, but parallel to, the $Li^+$ ion conduction path. The battery's voltage (V versus Li) is a function of the chemical potential difference for Li situated in the positive electrode as compared to the negative electrode and is maximized when Li metal is used as the negative electrode. An electrolyte physically separates and electrically insulates the positive and negative electrodes while also providing a conduction medium for $Li^+$ ions. The electrolyte ensures that when Li metal oxidizes at the negative electrode during discharge (e.g., $Li \leftrightarrow Li^+ + e^-$) and produces electrons, these electrons conduct between the electrodes by way of an external circuit which is not the same pathway taken by the $Li^+$ ions.

Conventional rechargeable batteries use liquid electrolytes to separate the positive and negative electrodes. However, liquid electrolytes suffer from several problems including flammability during thermal runaway, outgassing at high voltages, and chemical incompatibility with lithium metal negative electrodes. As an alternative, solid electrolytes have been proposed for next generation rechargeable batteries. For example, $Li^+$ ion-conducting ceramic oxides, such as lithium-stuffed garnets, have been considered as electrolyte separators. See, for example, US Patent Application Publication No. 2015/0099190, published Apr. 9, 2015, and filed Oct. 7, 2014, titled GARNET MATERIALS FOR LI SECONDARY BATTERIES AND METHODS OF MAKING AND USING GARNET MATERIALS; U.S. Pat. Nos. 8,658,317; 8,092,941; and 7,901,658; also U.S. Patent Application Publication Nos. 2013/0085055; 2011/0281175; 2014/0093785; and 2014/0170504; also Bonderer, et al. "Free-Standing Ultrathin Ceramic Foils," Journal of the American Ceramic Society, 2010, 93(11):3624-3631; and Murugan, et al., Angew Chem. Int. Ed. 2007, 46, 7778-7781), the entire contents of each of these publications are incorporated by reference in its entirety for all purposes.

Solid electrolytes tend to reduce a battery's total weight and volume, when compared to a liquid electrolyte, and thereby increase its gravimetric and volumetric energy density. Despite these advantages, solid electrolytes are still insufficient in several regards for commercial applications. Notably, solid electrolytes tend to include defects, pores, vacancies, uneven or rough surfaces, and other inhomogeneous, non-uniform features which may correlate with the formation of Li-dendrites, when these electrolytes are used in electrochemical cells. A challenge in the relevant field has been to prepare such solid electrolytes absent the aforementioned defects which conduct $Li^+$ ions without producing Li-dendrites.

Some solid separators are known and some separators are made with some techniques which tend to reduce the number of defects in these separators. See, for example, Kotobuki, M. et. al. Int. J Electroact. Mater. 2 (2014) 17-21; Ahmad, M. M. Nanoscale Research Letters, doi:10.1186/s11671-015-0777-7; Baek, S-W, et al.; Journal of Power Sources 249 (2014) 197-206; Botros, M. et al., Journal of Power Sources 309 (2016) 108e115; Zhang, Y. et al., Journal of Power Sources 268 (2014) 960-964; and Zhang, Y. et al., Solid State Ionics 284 (2015) 53-60. See, also Suzuki, et al., SOLID STATE IONICS 278 (2015) 172-176; www.ikts.fraunhofer.de/content/dam/ikts/en/images/publications/jahresberichte1/jb2013/11_3_Gelcasting_-_A_shapeing_method_for_particularly_defect-free_ceramic_parts.pdf; and J. Ni et al, J Mater Sci, 47, 7978 (2012).

There is therefore a need for improved materials and methods for making defect-free solid electrolytes. What is needed are, for example, new separators, e.g., a thin-film lithium-stuffed garnet separator which is defect-free, as well as methods for making and using the same. The instant disclosure provides solutions to some of these problems in the relevant field as well new separators for $Li^+$ rechargeable batteries.

SUMMARY

In one embodiment, set forth herein is a $Li^+$ ion-conducting separator, wherein the separator is polycrystalline and has a $d_{90}$ grain size that is less than 20 μm and wherein the separator transmits greater than 30% of incident light at 500 nm, 600 nm, or 700 nm wavelength. In some examples, this separator is a thin film approximately 10 nm to 500 μm in thickness and has a $Li^+$ ion conductivity greater than $1*10^{-3}$ S/cm. In certain examples, the separator includes an oxide, a sulfide, a borohydride, or a halide which conducts $Li^+$ ions.

In a second embodiment, set forth herein are method for making a $Li^+$ ion-conducting separator, wherein the separator is polycrystalline and has a $d_{90}$ grain size that is less than 20 μm and wherein the separator transmits greater than 30% of incident light at 500 nm, 600 nm, or 700 nm wavelength. In some of these methods, the methods include at least one step which includes conventional sintering, hot isostatic pressing, sinter forging, gel casting, hot pressing sintering, spark plasma sintering, or a combination thereof.

In a third embodiment, set forth herein are electrochemical devices (e.g., rechargeable batteries) which include a solid separator described herein.

In a fourth embodiment, set forth herein are methods of using the electrochemical devices described herein.

BRIEF DESCRIPTIONS OF THE DRAWINGS

FIG. 1. shows an optical image of a translucent LPSI separator, prepared according to Example 1.

FIG. 2. shows an optical image of a translucent lithium-stuffed garnet separator, prepared according to Example 1.

DETAILED DESCRIPTION

Figure 1:
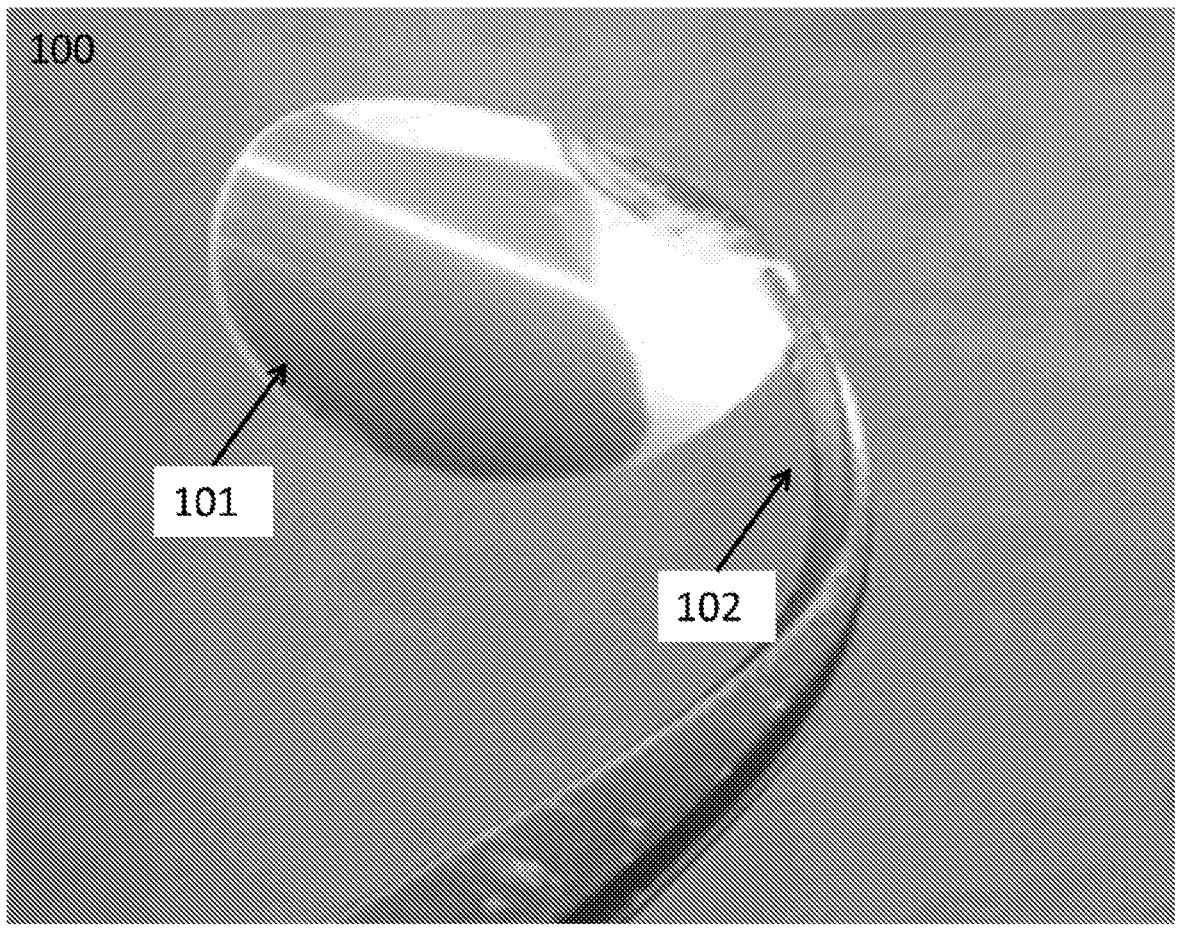

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the inventions herein are not intended to be limited to the embodiments presented, but are to be accorded their widest scope consistent with the principles and novel features disclosed herein.

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

I. DEFINITIONS

As used herein, the term "about," when qualifying a number, e.g., 15% w/w, refers to the number qualified and optionally the numbers included in a range about that qualified number that includes ±10% of the number. For example, about 15% w/w includes 15% w/w as well as 13.5% w/w, 14% w/w, 14.5% w/w, 15.5% w/w, 16% w/w, or 16.5% w/w. For example, "about 75° C.," includes 75° C. as well 68° C., 69° C., 70° C., 71° C., 72° C., 73° C., 74° C., 75° C., 76° C., 77° C., 78° C., 79° C., 80° C., 81° C., 82° C., or 83° C.

As used herein, the phrase "Li$^+$ ion-conducting separator," refers to an solid electrolyte which conducts Li$^+$ ions, is substantially insulating to electrons (e.g., the lithium ion conductivity is at least >$10^3$ and often >$10^6$ times greater than the electron conductivity), and which acts as a physical barrier or spacer between the positive and negative electrodes in an electrochemical cell.

As used herein "median diameter ($d_{50}$)" refers to the median size, in a distribution of sizes, measured by microscopy techniques or other particle size analysis techniques, including, but not limited to, scanning electron microscopy or dynamic light scattering. $D_{50}$ by number includes the characteristic dimension at which 50% of the particles are smaller than the recited size; $D_{50}$ by area (volume) refers to the diameter of the particle for which half of the area (volume) is filled by smaller particles. Unless otherwise specified, $D_{50}$ refers to a $D_{50}$ by area as calculated by SEM grain size analysis.

As used herein "diameter ($d_{90}$)" refers to the size, in a distribution of sizes, measured by microscopy techniques or other particle size analysis techniques, including, but not limited to, scanning electron microscopy or dynamic light scattering. $D_{90}$ by number includes the characteristic dimension at which 90% of the particles have diameters smaller than the recited size. $D_{90}$ by area (volume) refers to a diameter of the particle for which 90% of the area (volume) is filled by smaller particles. Unless otherwise specified, $D_{90}$ refers to a $D_{90}$ by area as calculated by SEM grain size analysis.

As used herein "diameter ($d_{10}$)" refers to the size, in a distribution of sizes, measured by microscopy techniques or other particle size analysis techniques, including, but not limited to, scanning electron microscopy or dynamic light scattering. $D_{10}$ by number includes the characteristic dimension at which 10% of the particles are smaller than the recited size.

As used herein, "selected from the group consisting of" refers to a single member from the group, more than one member from the group, or a combination of members from the group. A member selected from the group consisting of A, B, and C includes, for example, A only, B only, or C only, as well as A and B, A and C, B and C, as well as A, B, and C.

As used herein, the phrases "electrochemical cell" or "battery cell" shall mean a single cell including a positive electrode and a negative electrode, which have ionic communication between the two using an electrolyte. In some embodiments, the same battery cell includes multiple positive electrodes and/or multiple negative electrodes enclosed in one container.

As used herein, the terms "cathode" and "anode" refer to the electrodes of a battery. During a charge cycle in a Li-secondary battery, Li ions leave the cathode and move through an electrolyte, to the anode. During a charge cycle, electrons leave the cathode and move through an external circuit to the anode. During a discharge cycle in a Li-secondary battery, Li ions migrate towards the cathode through an electrolyte and from the anode. During a discharge cycle, electrons leave the anode and move through an external circuit to the cathode.

As used herein, the term "catholyte," refers to a Li ion conductor that is intimately mixed with, or that surrounds, or that contacts the positive electrode active materials and provides an ionic pathway for Li$^+$ to and from the active materials. Catholytes suitable with the embodiments described herein include, but are not limited to, catholytes having the acronyms name LPS, LXPS, LXPSO, where X is Si, Ge, Sn, As, Al, LATS, or also Li-stuffed garnets, or combinations thereof, and the like. Catholytes may also be liquid, gel, semi-liquid, semi-solid, polymer, and/or solid polymer ion conductors known in the art. Catholytes include those catholytes set forth in US Patent Application Publication No. 2015-0171465, which published on Jun. 18, 2015, entitled SOLID STATE CATHOLYTE OR ELECTROLYTE FOR BATTERY USING $Li_4MP_BS_C$ (M=Si, Ge, AND/OR Sn), filed May 15, 2014, the contents of which are incorporated by reference in their entirety. Catholytes include those catholytes set forth in US Patent Application Publication No. 2015/0099190, published on Apr. 9, 2015, entitled GARNET MATERIALS FOR LI SECONDARY BATTERIES AND METHODS OF MAKING AND USING GARNET MATERIALS, and filed Oct. 7, 2014, the contents of which are incorporated by reference in their entirety. In some examples, the gel electrolyte referred to herein is an 80:20 to 50:50 vol. % PVDF:HFP to EC:EMC. Herein, PVDF is polyvinylidene fluoride; HFP is hexafluorophosphate; EC is ethylene carbonate; and EMC is ethyl methyl carbonate.

As used herein, the term "electrolyte," refers to an ionically conductive and electrically insulating material. Electrolytes are useful for electrically insulating the positive and negative electrodes of a secondary battery while allowing for the conduction of ions, e.g., $Li^+$, through the electrolyte. In some of the electrochemical devices described herein, the electrolyte includes a solid film, pellet, or monolith of a $Li^+$ conducting oxide, such as a lithium-stuffed garnet. In some examples, the electrolyte further includes a gel electrolyte which is laminated to or directly contacting the solid film, pellet, or monolith.

As used herein, the phrase "pellet" refers to a body of material produced by a batch process with at least one compaction step. The pellet may be a "green pellet", i.e., before heating or sintering, or a "sintered pellet", i.e., after heating or sintering at elevated temperatures to cause densification.

As used herein, the phrase "monolith" refers to a body of material that, on a length scale of ≥0.1 mm, is substantially uniform or homogeneous in structure and composition.

As used herein, the term "rational number" refers to any number which can be expressed as the quotient or fraction (e.g., p/q) of two integers (e.g., p and q), with the denominator (e.g., q) not equal to zero. Example rational numbers include, but are not limited to, 1, 1.1, 1.52, 2, 2.5, 3, 3.12, and 7.

As used herein, the phrase "subscripts and molar coefficients in the empirical formulas are based on the quantities of raw materials initially batched to make the described examples" means the subscripts, (e.g., 7, 3, 2, 12 in $Li_7La_3Zr_2O_{12}$ and the coefficient 0.35 in $0.35Al_2O_3$) refer to the respective elemental ratios in the chemical precursors (e.g., LiOH, $La_2O_3$, $ZrO_2$, $Al_2O_3$) used to prepare a given material, (e.g., $Li_7La_3Zr_2O_{12} \cdot 0.35Al_2O_3$).

As used herein, a "thickness" by which is film is characterized refers to the distance, or median measured distance, between the top and bottom faces of a film. As used herein, the top and bottom faces refer to the sides of the film having the largest surface area.

As used herein, the phrase "lithium stuffed garnet" refers to oxides that are characterized by a crystal structure related to a garnet crystal structure. U.S. Patent Application Publication No. U.S. 2015/0099190, which published Apr. 9, 2015 and was filed Oct. 7, 2014 as Ser. No. 14/509,029, is incorporated by reference herein in its entirety. This application describes Li-stuffed garnet solid-state electrolytes used in solid-state lithium rechargeable batteries. These Li-stuffed garnets generally having a composition according to $Li_ALa_BM'_CM''_DZr_EO_F$, $Li_ALa_BM'_CM''_DTa_EO_F$, or $Li_ALa_BM'_CM''_DNb_EO_F$, wherein 4<A<8.5, 1.5<B<4, 0≤C≤2, 0≤D≤2; 0≤E<3, 10<F<13, and M' and M'' are each, independently in each instance selected from Ga, Al, Mo, W, Nb, Sb, Ca, Ba, Sr, Ce, Hf, Rb, or Ta, or $Li_aLa_bZr_cAl_dMe''_eO_f$, wherein 5<a<8.5; 2<b<4; 0<c≤2.5; 0≤d<2; 0≤e<2, and 10<f<13 and Me'' is a metal selected from Ga, Nb, Ta, V, W, Mo, or Sb and as otherwise described in U.S. Patent Application Publication No. U.S. 2015/0099190, the entire contents of which are herein incorporated by reference in its entirety for all purposes. As used herein, lithium-stuffed garnets, and garnets, generally, include, but are not limited to, $Li_{7.0}La_3(Zr_{t1}+Nb_{t2}+Ta_{t3})O_{12}+0.35Al_2O_3$; wherein (t1+t2+t3=2) so that the La:(Zr/Nb/Ta) ratio is 3:2. Also, garnets used herein include, but are not limited to, $Li_xLa_3Zr_2O_F$+$yAl_2O_3$, wherein x ranges from 5.5 to 9; and y ranges from 0.05 to 1. In these examples, subscripts x, y, and F are selected so that the garnet is charge neutral. In some examples x is 7 and y is 1.0. In some examples, x is 5 and y is 1.0. In some examples, x is 6 and y is 1.0. In some examples, x is 8 and y is 1.0. In some examples, x is 9 and y is 1.0. In some examples x is 7 and y is 0.35. In some examples, x is 5 and y is 0.35. In some examples, x is 6 and y is 0.35. In some examples, x is 8 and y is 0.35. In some examples, x is 9 and y is 0.35. In some examples x is 7 and y is 0.7. In some examples, x is 5 and y is 0.7. In some examples, x is 6 and y is 0.7. In some examples, x is 8 and y is 0.7. In some examples, x is 9 and y is 0.7. In some examples x is 7 and y is 0.75. In some examples, x is 5 and y is 0.75. In some examples, x is 6 and y is 0.75. In some examples, x is 8 and y is 0.75. In some examples, x is 9 and y is 0.75. In some examples, x is 7 and y is 0.8. In some examples, x is 5 and y is 0.8. In some examples, x is 6 and y is 0.8. In some examples, x is 8 and y is 0.8. In some examples, x is 9 and y is 0.8. In some examples x is 7 and y is 0.5. In some examples, x is 5 and y is 0.5. In some examples, x is 6 and y is 0.5. In some examples, x is 8 and y is 0.5. In some examples, x is 9 and y is 0.5. In some examples x is 7 and y is 0.4. In some examples, x is 5 and y is 0.4. In some examples, x is 6 and y is 0.4. In some examples, x is 8 and y is 0.4. In some examples, x is 9 and y is 0.4. In some examples, x is 7 and y is 0.3. In some examples, x is 5 and y is 0.3. In some examples, x is 6 and y is 0.3. In some examples, x is 8 and y is 0.3. In some examples, x is 9 and y is 0.3. In some examples x is 7 and y is 0.22. In some examples, x is 5 and y is 0.22. In some examples, x is 6 and y is 0.22. In some examples, x is 8 and y is 0.22. In some examples, x is 9 and y is 0.22. Also, garnets as used herein include, but are not limited to, $Li_xLa_3Zr_2O_{12}+yAl_2O_3$. In one embodiment, the Li-stuffed garnet herein has a composition of $Li_7Li_3Zr_2O_{12}$. In another embodiment, the Li-stuffed garnet herein has a composition of $Li_7Li_3Zr_2O_{12} \cdot Al_2O_3$. In yet another embodiment, the Li-stuffed garnet herein has a composition of $Li_7Li_3Zr_2O_{12} \cdot 0.22Al_2O_3$. In yet another embodiment, the Li-stuffed garnet herein has a composition of $Li_7Li_3Zr_2O_{12} \cdot 0.35Al_2O_3$. In certain other embodiments, the Li-stuffed garnet herein has a composition of $Li_7Li_3Zr_2O_{12} \cdot 0.5Al_2O_3$. In another embodiment, the Li-stuffed garnet herein has a composition of $Li_7Li_3Zr_2O_{12} \cdot 0.75Al_2O_3$.

As used herein, garnet does not include YAG-garnets (i.e., yttrium aluminum garnets, or, e.g., $Y_3Al_5O_{12}$). As used herein, garnet does not include silicate-based garnets such as pyrope, almandine, spessartine, grossular, hessonite, or cinnamon-stone, tsavorite, uvarovite and andradite and the solid solutions pyrope-almandine-spessarite and uvarovite-grossular-andradite. Garnets herein do not include nesosilicates having the general formula $X_3Y_2(SiO_4)_3$ wherein X is Ca, Mg, Fe, and, or, Mn; and Y is Al, Fe, and, or, Cr.

As used herein, the phrase "phase pure" refers to a material characterized as having a single phase (i.e., type of solid matter) as determined by x-ray powder diffraction (XRD) analysis. For example, phase pure cubic lithium-stuffed garnet is a material having a cubic crystalline structure. The material includes lithium (Li), lanthanum (La), zirconium (Zr), oxygen (O) and optionally dopant atoms (e.g., Al) bonded in a polycrystalline array, wherein each unit cell in the crystallite has cubic symmetry. Phase pure lithium-stuffed garnet includes the solid material, $Li_7La_3Zr_2O_{12}$, wherein the amounts of Li, La, Zr, and O may vary so long as the material remains polycrystalline, with cubic crystalline symmetry. $Li_7La_3Zr_2O_{12}$ can form several crystal phases. One phase that $Li_7La_3Zr_2O_{12}$ forms in addition to a cubic phase is a tetragonal crystalline phase which includes Li, La, Zr, and O atoms bonded in a polycrystalline array, wherein each unit cell within the crystallite has tetragonal symmetry. Phase pure cubic lithium-stuffed garnet is a lithium-stuffed garnet that is at least 99% or more by volume cubic lithium-stuffed garnet. Phase pure cubic lithium-stuffed garnet is phase pure even though the respective amounts of Li, La, Zr, O, and/or Al change so long as the lithium-stuffed garnet remains polycrystalline, with cubic crystalline symmetry. For example, $Li_7La_3Zr_2O_{12}$ may be doped with Al or $Al_2O_3$ and remain phase pure so long as the doped composition, e.g., $La_7La_3Zr_2O_{12}Al_2O_3$, is polycrystalline, with each unit cell having cubic crystalline symmetry. A lithium-stuffed garnet that includes more than trace amounts (more than 1% by volume) of secondary phases is not phase pure.

Examples of phase pure lithium-stuffed garnets as well as lithium-stuffed garnets having primary and secondary phases are found, for example, in U.S. patent application Ser. No. 15/631,884, filed Jun. 23, 2017, entitled LITHIUM BATTERY ELECTROLYTE WITH PHASE INCLUSIONS, and in International PCT Patent Application No. PCT/US2017/039069, filed Jun. 23, 2017, entitled LITHIUM BATTERY ELECTROLYTE WITH PHASE INCLUSIONS.

As used herein, the phrase "secondary phase" refers to a distinct phase within or adjacent to a primary phase, wherein the primary phase is the phase present is the greatest amount. For example, a small amount of $LiAlO_2$ phase within a bulk $Li_7La_3Zr_2O_{12}Al_x$ phase is a secondary phase. The secondary phase may be identified and quantified, for example, by quantitative x-ray powder diffraction analysis. The secondary phase may be identified and quantified, for example, by quantitative electron microscopy, e.g., SEM in back-scattered electron imaging mode, which shows density contrast. As another example, glancing incidence XRD may be used to identify small secondary phases on the surface of a body, such as but not limited to a pellet or thin film. As another example, selected area x-ray diffraction patterns in transmission electron microscopy may identify microscopic secondary phases. Some secondary phases may be amorphous, weakly diffracting, or thin or small enough as to not be easily identifiable via diffraction techniques. When cubic lithium-stuffed garnet is the primary phase (i.e., the phase present in largest amount by volume), the secondary phases include, but are not limited to tetragonal phase garnet; $La_2Zr_2O_7$; $La_2O_3$; $LaAlO_3$; $La_2(Li_{0.5}Al_{0.5})O_4$; $LiLaO_2$; $LiZr_2O_3$; $Li_aZr_bO_c$, wherein $1 \leq a \leq 8$, $1 \leq b \leq 2$, and $1 \leq c \leq 7$, and wherein subscripts a, b, and c are selected so that $Li_aZr_bO_c$ is charge neutral; $Li_gAl_hO_i$, wherein $1 \leq g \leq 5$, $1 \leq h \leq 5$, and $2 \leq i \leq 8$, and wherein subscripts g, h, i are selected so that $Li_gAl_hO_i$ is charge neutral; $La_dTa_eO_f$, wherein $1 \leq d \leq 3$, $1 \leq e \leq 7$, and $4 \leq f \leq 19$, and wherein subscripts d, e, and f are selected so that $La_dTa_eO_f$ is charge neutral; $Li_rTa_sO_t$, wherein $1 \leq r \leq 2$, $1 \leq s \leq 3$, and $3 \leq t \leq 7$, and wherein subscripts r, s, and t are selected so that $Li_rTa_sO_t$ is charge neutral; $La_nNb_pO_q$, wherein $1 \leq n \leq 3$, $1 \leq p \leq 7$, and $4 \leq q \leq 19$, and wherein subscripts n, p, and q are selected so that $La_nNb_pO_q$ is charge neutral; $Li_uNb_vO_x$, wherein $1 \leq u \leq 3$, $1 \leq p \leq 3$, and $3 \leq x \leq 9$, and wherein subscripts u, v, and x are selected so that $Li_uNb_vO_x$ is charge neutral; and any combination thereof.

As used herein, the phrases "garnet precursor chemicals," "chemical precursor to a garnet-type electrolyte," "precursors to garnet" and "garnet precursor materials" refers to chemicals, which react to form a lithium-stuffed garnet material described herein. These chemical precursors include, but are not limited to lithium hydroxide (e.g., LiOH), lithium oxide (e.g., $Li_2O$), zirconium oxide (e.g., $ZrO_2$), zirconium nitrate, zirconium acetate, lanthanum oxide (e.g., $La_2O_3$), lanthanum nitrate, lanthanum acetate, aluminum oxide (e.g., $Al_2O_3$), aluminum (e.g., Al), aluminum nitrate (e.g., $AlNO_3$), aluminum nitrate nonahydrate, aluminum (oxy) hydroxide (gibbsite and boehmite), gallium oxide, corundum, niobium oxide (e.g., $Nb_2O_5$), tantalum oxide (e.g., $Ta_2O_5$).

As used herein the phrase "garnet-type electrolyte," refers to an electrolyte that includes a lithium stuffed garnet material described herein as the Li$^+$ ion conductor. The advantages of Li-stuffed garnet solid-state electrolytes are many, including as a substitution for liquid, flammable electrolytes commonly used in lithium rechargeable batteries.

As used herein, the phrase "doped with alumina" means that $Al_2O_3$ is used to replace certain components of another material, e.g., a garnet. A lithium stuffed garnet that is doped with $Al_2O_3$ refers to garnet wherein aluminum (Al) substitutes for an element in the lithium stuffed garnet chemical formula, which may be, for example, Li or Zr.

As used herein, the term "defect" refers to an imperfection or a deviation from a pristine structure that interacts with (absorbs, scatters, reflects, refracts, etc) light. Defects may include, but not limited to, a pore, a grain boundary, a dislocation, a crack, a separation, a chemical inhomogeneity, or a phase segregation of two or more materials in a solid material. A perfect crystal is an example of a material that lacks defects. A nearly 100% dense oxide electrolyte that has a planar surface, with substantially no pitting, inclusions, cracks, pores, or divots on the surface, is an example of an electrolyte that is substantially lacking defects. Defects can include a second phase inclusion (e.g., a $Li_2S$ phase inside a LPSI electrolyte). Defects can include a pore inclusion. Defects can include a grain boundary wherein two adjacent grains have a region where their separation is greater than 10 nm. Defects can include pores in a porous separator As used herein, the phrase "defect density," refers to the volumetric density of defects. For example, if the defect in a primary phase is a second phase inclusion, and the second phase inclusion occupies 10% of the volume of the primary phase in which the secondary phase is, then the defect density is 10% by volume.

As used herein, the phrase "scattering center," refers to a position in a material which scatters light waves which range from 500 nm to 700 nm in wavelength.

As used herein, the phrase "geometric porosity," refers to fractional volume attributed to pore space, calculated by measuring the geometric density and dividing by the theoretical crystalline density, and subtracting that quotient from the number, 1.

As used herein, the phrase "lithium interfacial resistance," refers to the interfacial resistance of a material towards the incorporation and conduction of Li$^+$ ions. A lithium interfacial ASR ($ASR_{interface}$) is calculated from the interfacial resistance ($R_{interface}$) via $ASR_{interface}=R_{interface}*A/2$ where A is the area of the electrodes in contact with the separator and the factor of 2 accounts for 2 interfaces, assuming they are symmetric, as demonstrated in Example 5, herein.

As used herein, the term "uniform," refers to a property characterization which is constant over a given surface area or volume, e.g., over a surface area of at least 100 nm² or over a volume of at least 1000 nm³.

As used herein the term "porous," refers to a material that includes pores, e.g., nanopores, mesopores, or micropores.

As used herein, the phrase "porosity as determined by SEM," refers to measurement of density by using an image analysis software. First, a user or software assigns pixels and/or regions of an image as porosity. Second, the area fraction of those regions is summed. Finally, the porosity fraction determined by SEM is equal to the area fraction of the porous region of the image.

As used here, the phrase "inorganic solid state electrolyte," refers to a material not including a majority phase of carbon which conducts ions (e.g., Li⁺) but does not conduct electrons. Example inorganic solid state electrolytes include oxide electrolytes and sulfide electrolytes, which are further described in the instant disclosure.

In some examples, the electrolytes herein may include, or be layered with, or be laminated to, or contact a sulfide electrolyte. As used here, the phrase "sulfide electrolyte," includes, but is not limited to, electrolytes referred to herein as LSS, LTS, LXPS, or LXPSO, where X is Si, Ge, Sn, As, Al, or Li—Sn—Si—P—S or Li—As—Sn—S. In these acronyms (LSS, LTS, LXPS, or LXPSO), S refers to the element S, Si, or combinations thereof, and T refers to the element Sn. "Sulfide electrolyte" may also include $Li_aP_bS_cX_d$, $Li_aB_bS_cX_d$, $Li_aSn_bSi_bS_cX_d$, $Li_aSn_bS_cX_d$ or $Li_aSi_bS_cX_d$ where X=F, Cl, Br, I, and 10%≤a≤50%, 10%≤b, b'≤44%, 24%≤c≤70%, 0≤d≤18%. "Sulfide electrolyte" may also include $Li_aP_bSi_cSn_dX_eO_f$ where 10%≤a≤50%, 5%≤b≤30%, 0≤c≤10%, 0≤d≤10%, 0≤e≤30%, 0≤f≤10% and X=F, Cl, Br, I, or mixtures thereof. Up to 10 at % oxygen may be present in the sulfide electrolytes, either by design or as a contaminant species.

In some examples, the sulfide electrolyte layer is a material containing Si, Li, O, P, and S and is referred to herein as a SLOPS material. In some examples, the electrolyte layer is a material containing Si, Li, O, P, and S and is referred to herein as a SLOPS/LSS material. As used herein, LSS includes, unless otherwise specified, a 60:40 molar ratio $Li_2S:SiS_2$.

As used herein, "SLOPS" includes, unless otherwise specified, a 60:40 molar ratio of $Li_2S:SiS_2$ with 0.1-10 mol. % $Li_3PO_4$. In some examples, "SLOPS" includes $Li_{10}Si_4S_{13}$ (50:50 $Li_2S:SiS_2$) with 0.1-10 mol. % $Li_3PO_4$. In some examples, "SLOPS" includes $Li_{26}Si_7S_{27}$ (65:35 $Li_2S:SiS_2$) with 0.1-10 mol. % $Li_3PO_4$. In some examples, "SLOPS" includes $Li_4SiS_4$ (67:33 $Li_2S:SiS_2$) with 0.1-5 mol. % $Li_3PO_4$. In some examples, "SLOPS" includes $Li_{14}Si_3S_{13}$ (70:30 $Li_2S:SiS_2$) with 0.1-5 mol. % $Li_3PO_4$. In some examples, "SLOPS" is characterized by the formula (1−x)(60:40 $Li_2S:SiS_2$)*(x)($Li_3PO_4$), wherein x is from 0.01 to 0.99. As used herein, "LBS-POX" refers to an electrolyte composition of $Li_2S:B_2S_3:Li_3PO_4:LiX$ where X is a halogen (X=F, Cl, Br, I). The composition can include $Li_3BS_3$ or $Li_5B_7S_{13}$ doped with 0-30% lithium halide such as LiI and/or 0-10% $Li_3PO_4$.

As used here, "LSS" refers to lithium silicon sulfide which can be described as $Li_2S$—$SiS_2$, Li—$SiS_2$, Li—S—Si, and/or a catholyte consisting essentially of Li, S, and Si. LSS refers to an electrolyte material characterized by the formula $Li_xSi_yS_z$ where 0.33≤x≤0.5, 0.1≤y≤0.2, 0.4≤z≤0.55, and it may include up to 10 atomic % oxygen. LSS also refers to an electrolyte material comprising Li, Si, and S. In some examples, LSS is a mixture of $Li_2S$ and $SiS_2$. In some examples, the ratio of $Li_2S:SiS_2$ is 90:10, 85:15, 80:20, 75:25, 70:30, 2:1, 65:35, 60:40, 55:45, or 50:50 molar ratio. LSS may be doped with compounds such as $Li_xPO_y$, $Li_xBO_y$, $Li_4SiO_4$, $Li_3MO_4$, $Li_3MO_3$, $PS_x$, and/or lithium halides such as, but not limited to, LiI, LiCl, LiF, or LiBr, wherein 0<x≤5 and 0<y≤5.

As used here, "LTS" refers to a lithium tin sulfide compound which can be described as $Li_2S:SnS_2:As_2S_5$, $Li_2S$—$SnS_2$, $Li_2S$—SnS, Li—S—Sn, and/or a catholyte consisting essentially of Li, S, and Sn. The composition may be $Li_xSn_yS_z$ where 0.25≤x≤0.65, 0.05≤y≤0.2, and 0.25≤z≤0.65. In some examples, LTS is a mixture of $Li_2S$ and $SnS_2$ in the ratio of 80:20, 75:25, 70:30, 2:1, or 1:1 molar ratio. LTS may include up to 10 atomic % oxygen. LTS may be doped with Bi, Sb, As, P, B, Al, Ge, Ga, and/or In and/or lithium halides such as, but not limited to, LiI, LiCl, LiF, or LiBr, As used herein, "LATS" refers to LTS, as used above, and further comprising Arsenic (As).

As used here, "LXPS" refers to a material characterized by the formula $Li_aMP_bS_c$, where M is Si, Ge, Sn, and/or Al, and where 2≤a≤8, 0.5≤b≤2.5, 4≤c≤12. "LSPS" refers to an electrolyte material characterized by the formula $L_aSiP_bS_c$, where 2≤a≤8, 0.5≤b≤2.5, 4≤c≤12. LSPS refers to an electrolyte material characterized by the formula $L_aSiP_bS_c$, wherein, where 2≤a≤8, 0.5≤b≤4≤c≤12, d<3. In these examples, the subscripts are selected so that the compound is neutrally charged. Exemplary LXPS materials are found, for example, in International Patent Application Publication No. PCT/US2014/038283, filed May 16, 2014 as PCT/US2014/038283, and titled SOLID STATE CATHOLYTE OR ELECTROLYTE FOR BATTERY USING $LI_4MP_BS_C$ (M=Si, Ge, AND/OR Sn), which is incorporated by reference herein in its entirety. When M is Sn and Si—both are present—the LXPS material is referred to as LSTPS. As used herein, "LSTPSO," refers to LSTPS that is doped with, or has, O present. In some examples, "LSTPSO," is a LSTPS material with an oxygen content between 0.01 and 10 atomic %. "LSPS," refers to an electrolyte material having Li, Si, P, and S chemical constituents. As used herein "LSTPS," refers to an electrolyte material having Li, Si, P, Sn, and S chemical constituents. As used herein, "LSPSO," refers to LSPS that is doped with, or has, O present. In some examples, "LSPSO," is a LSPS material with an oxygen content between 0.01 and 10 atomic %. As used herein, "LATP," refers to an electrolyte material having Li, As, Sn, and P chemical constituents. As used herein "LAGP," refers to an electrolyte material having Li, As, Ge, and P chemical constituents. As used herein, "LXPSO" refers to a catholyte material characterized by the formula $Li_aMP_bS_cO_d$, where M is Si, Ge, Sn, and/or Al, and where 2≤a≤8, 0.5≤b≤2.5, 4≤c≤12, d<3. LXPSO refers to LXPS, as defined above, and having oxygen doping at from 0.1 to about 10 atomic %. LPSO refers to LPS, as defined above, and having oxygen doping at from 0.1 to about 10 atomic %.

As used here, "LPS," refers to an electrolyte having Li, P, and S chemical constituents. As used herein, "LPSO," refers to LPS that is doped with or has O present. In some examples, "LPSO," is a LPS material with an oxygen content between 0.01 and 10 atomic %. LPS refers to an electrolyte material that can be characterized by the formula $Li_xP_yS_z$ where 0.33≤x≤0.67, 0.07≤y≤0.2 and 0.4≤z≤0.55. LPS also refers to an electrolyte characterized by a product formed from a mixture of $Li_2S:P_2S_5$ wherein the molar ratio is 10:1, 9:1, 8:1, 7:1, 6:1 5:1, 4:1, 3:1, 7:3, 2:1, or 1:1. LPS also refers to an electrolyte characterized by a product formed from a mixture of $Li_2S:P_2S_5$ wherein the reactant or precursor amount of $Li_2S$ is 95 atomic % and $P_2S_5$ is 5 atomic %. LPS also refers to an electrolyte characterized by a product formed from a mixture of $Li_2S:P_2S_5$ wherein the reactant or precursor amount of $Li_2S$ is 90 atomic % and $P_2S_5$ is 10 atomic %. LPS also refers to an electrolyte characterized by a product formed from a mixture of $Li_2S:P_2S_5$ wherein the reactant or precursor amount of $Li_2S$ is 85 atomic % and $P_2S_5$ is 15 atomic %. LPS also refers to an electrolyte characterized by a product formed from a mixture of $Li_2S:P_2S_5$ wherein the reactant or precursor amount of $Li_2S$ is 80 atomic % and $P_2S_5$ is 20 atomic %. LPS also refers to an electrolyte characterized by a product formed from a mixture of $Li_2S:P_2S_5$ wherein the reactant or precursor amount of $Li_2S$ is 75 atomic % and $P_2S_5$ is 25 atomic %. LPS also refers to an electrolyte characterized by a product formed from a mixture of $Li_2S:P_2S_5$ wherein the reactant or precursor amount of $Li_2S$ is 70 atomic % and $P_2S_5$ is 30 atomic %. LPS also refers to an electrolyte characterized by a product formed from a mixture of $Li_2S:P_2S_5$ wherein the reactant or precursor amount of $Li_2S$ is 65 atomic % and $P_2S_5$ is 35 atomic %. LPS also refers to an electrolyte characterized by a product formed from a mixture of $Li_2S:P_2S_5$ wherein the reactant or precursor amount of $Li_2S$ is 60 atomic % and $P_2S_5$ is 40 atomic %. LPS may also be doped with a lithium halide such as LiF, LiCl, LiBr, or LiI at a 0-40% molar content.

As used here, "LBS" refers to an electrolyte material characterized by the formula $Li_aB_bS_c$ and may include oxygen and/or a lithium halide (LiF, LiCl, LiBr, LiI) at 0-40 mol %.

As used here, "LPSO" refers to an electrolyte material characterized by the formula $Li_xP_yS_zO_w$ where $0.33 \leq x \leq 0.67$, $0.07 \leq y \leq 0.2$, $0.4 \leq z \leq 0.55$, $0 \leq w \leq 0.15$. Also, LPSO refers to LPS, as defined above, that includes an oxygen content of from 0.01 to 10 atomic %. In some examples, the oxygen content is 1 atomic %. In other examples, the oxygen content is 2 atomic %. In some other examples, the oxygen content is 3 atomic %. In some examples, the oxygen content is 4 atomic %. In other examples, the oxygen content is 5 atomic %. In some other examples, the oxygen content is 6 atomic %. In some examples, the oxygen content is 7 atomic %. In other examples, the oxygen content is 8 atomic %. In some other examples, the oxygen content is 9 atomic %. In some examples, the oxygen content is 10 atomic %.

As used herein, the term "LBHI" refers to a lithium conducting electrolyte comprising Li, B, H, and I. LBHI includes a compound having the formula $aLiBH_4+bLiX$ where X=Cl, Br, and/or I and where a:b=7:1, 6:1, 5:1, 4:1, 3:1, 2:1, or within the range a/b=2-4. LBHI may further include nitrogen in the form of compound having the formula $aLiBH_4+bLiX+cLiNH_2$ where (a+c)/b=2-4 and c/a=0-10.

As used herein, the term "LPSI" refers to a lithium conducting electrolyte comprising Li, P, S, and I. LPSI includes a compound having the formula $aLi_2S+bP_2S_y+cLiX$ where X=Cl, Br, and/or I and where y=3-5 and where a/b=2.5-4.5 and where (a+b)/c=0.5-15.

As used herein, the term "LIRAP" refers to a lithium rich antiperovskite and is used synonymously with "LOC" or "$Li_3OCl$". The composition of LIRAP is $aLi_2O+bLiX+cLiOH+dAl_2O_3$ where X=Cl, Br, I, or mixtures thereof, a/b=0.7-9, c/a=0.01-1, d/a=0.001-0.1.

As used herein, the term "grains" refers to domains of material within the bulk of a material that have a physical boundary which distinguishes the grain from the rest of the material. For example, in some materials both crystalline and amorphous components of a material, often having the same chemical composition, are distinguished from each other by the boundary between the crystalline component and the amorphous component. The approximate diameter within the boundaries of a crystalline component, or of an amorphous component, is referred herein as the grain size. Grains may be observed in SEM if appropriate techniques are applied to bring the grains into higher relief these techniques may include chemical etching or exposure to high energy electron beams.

As used herein, the phrase "grain size" refers the characteristic dimension, or maximum dimension (e.g., diameter of a spherically-shaped grain), defining a region that has a homogeneous composition, crystalline structure, and crystal orientation. Grains can be observed by high resolution TEM or electron back-scatter diffraction (EBSD).

As used herein, the phrase "green film" refers to an unsintered film including at least one member selected from garnet materials, precursors to garnet materials, binder, solvent, carbon, dispersant, or combinations thereof.

As used herein the term "making," refers to the process or method of forming or causing to form the object that is made. For example, making an energy storage electrode includes the process, process steps, or method of causing the electrode of an energy storage device to be formed. The end result of the steps constituting the making of the energy storage electrode is the production of a material that is functional as an electrode.

As used herein, the phrase "providing" refers to the provision of, generation or, presentation of, or delivery of that which is provided.

As used herein, the term, "Ra," is a measure of surface roughness wherein Ra is an arithmetic average of absolute values of sampled surface roughness amplitudes where the sampling is performed over an area of 1 $mm^2$ to 10 $cm^2$. Surface roughness measurements can be accomplished using, for example, a Keyence VK-X100 instrument that measures surface roughness using a laser. As used herein, the term, "Rt," is a measure of surface roughness wherein Rt is the maximum peak height of sampled surface roughness amplitudes. Disclosed herein are methods of modifying the surface roughness of an oxide electrolyte, which methods include polishing, ablating, exposing to laser, exposing to plasma, exposing to ozone, exposing to a reducing atmosphere at elevate temperatures such as but not limited to 400° C., 500° C., 600° C., 700° C., 800° C., 900° C., 1000° C., 1100° C., 1200° C., 1300° C., or higher, or annealing the surface in order to achieve the desired surface roughness.

As used herein, surface roughness refers to a measurement of either an arithmetic average of absolute values of sampled surface roughness amplitudes or a measurement of the maximum peak height of sampled surface roughness amplitudes. As used herein, the term, "Ra," is a measure of surface roughness wherein Ra is an arithmetic average of absolute values of sampled surface roughness amplitudes. Surface roughness measurements can be accomplished using, for example, a Keyence VK-X100 instrument that measures surface roughness using a laser. As used herein, the term, "Rt," is a measure of surface roughness wherein Rt is the maximum peak height of sampled surface roughness amplitudes.

As used herein, the phrase "density as determined by geometric measurements," refers to measurements of density obtained by physical mass and volume measurements. Density is determined by the ratio of measured mass to the measured volume. Customary techniques including the Archimedes method may be employed for such determinations.

As used herein, the phrase "density as determined by scanning electron microscopy (SEM)," refers to the analysis of scanning electron microscopy (SEM) images. This analysis includes measuring the relative amounts of the electrolyte separator which are porous or vacant with respect to the electrolyte separator which is fully dense. The SEM images useful for this analysis include those obtained by SEM cross-sectional analysis using focused ion beam (FIB) milling.

As used herein, the phrase "density as measured by the Archimedes method," refers to a density inclusive of closed porosity but exclusive of open porosity. The dimensions of a dry part are measured and the volume is calculated and recorded as $V_d$; the mass of the dry part is measured and recorded as $m_d$. Vacuum infiltration of the part with a solvent such as toluene or IPA is then conducted by, for example, pulling a vacuum om the parts for at least one hour to a pressure less than −20 inHg and then submerge the parts in solvent, infiltrate for at least 30 minutes. Next, the vacuum is releases, keeping parts submerged in solvent. Then, the surface liquid is wiped off of the part, and record the mass $m_w$ of the part when wet. Finally, recording the mass $m_s$ of the part when submerged in the cup is performed. The Archimedes bulk density is calculated as $m_d/(m_w-m_s)\rho_s$, where $\rho_s$ is the solvent density, and the open porosity is $(m_w-m_d)/(m_w-m_s)$.

As used herein the phrase "free-standing thin film," refers to a film that is not adhered or supported by an underlying substrate. In some examples, free-standing thin film is a film that is self-supporting, which can be mechanically manipulated or moved without need of a substrate adhered or fixed thereto. A free-standing thin film can be laminated or bonded to a current collector or electrode, but such a free-standing thin film is only free-standing when not supported by an underlying substrate. A free-standing thin film is at least 0.5 cm$^2$ in lateral extent. Lateral extent is determined by multiplying the length of the film by the width of the film. For example, a film that has a length of of 0.71 cm and a width of 0.71 cm would have a lateral extent of 0.5 cm$^2$. For example, a film that has a length of of 0.1 cm and a width of 0.5 cm would have a lateral extent of 0.5 cm$^2$. These are non-limiting lateral extent examples.

As used here, the phrase "inorganic solid state electrolyte," refers to a material not including carbon which conducts ions (e.g., Li$^+$) but does not conduct electrons. Example inorganic solid state electrolytes include oxide electrolytes and sulfide electrolytes, which are further described in the instant disclosure.

As used here, the term "transparent" refers to a material that has a transmission coefficient of greater than 0.9 when measured with incident light in transmission mode at a wavelength between 400-700 nm for a sample that is less than 100 μm thick. As used here, the term "translucent" refers to a material that has a transmission coefficient of between 0.1-0.9 when measured with incident light at a wavelength between 400-700 nm.

As used herein, the phrase "transmission coefficient," refers to the ratio of the amount of incident light which transmits through a material with respect to the total amount of incident light. A transmission coefficient of 0.5 means that half of the incident light which impinges upon a material transmits through that material.

II. SEPARATORS

In some examples, set forth herein is a Li$^+$ ion-conducting separator, wherein the separator is polycrystalline and transmits greater than 30% of incident light at 500 nm, 600 nm, or 700 nm incident wavelength. In certain examples, the separator transmits greater than 35% of incident light at 500 nm, 600 nm, or 700 nm incident light wavelength. In certain other examples, the separator transmits greater than 40% of incident light at 500 nm, 600 nm, or 700 nm incident light wavelength. In some examples, the separator transmits greater than 45% of incident light at 500 nm, 600 nm, or 700 nm incident light wavelength. In some other examples, the separator transmits greater than 50% of incident light at 500 nm, 600 nm, or 700 nm incident light wavelength. In certain examples, the separator transmits greater than 55% of incident light at 500 nm, 600 nm, or 700 nm incident light wavelength. In certain other examples, the separator transmits greater than 60% of incident light at 500 nm, 600 nm, or 700 nm incident light wavelength. In some examples, the separator transmits greater than 65% of incident light at 500 nm, 600 nm, or 700 nm incident light wavelength. In some other examples, the separator transmits greater than 70% of incident light at 500 nm, 600 nm, or 700 nm incident light wavelength. In certain examples, the separator transmits greater than 75% of incident light at 500 nm, 600 nm, or 700 nm incident light wavelength. In certain other examples, the separator transmits greater than 80% of incident light at 500 nm, 600 nm, or 700 nm incident light wavelength. In some examples, the separator transmits greater than 85% of incident light at 500 nm, 600 nm, or 700 nm incident light wavelength. In some other examples, the separator transmits greater than 90% of incident light at 500 nm, 600 nm, or 700 nm incident light wavelength. In certain examples, the separator transmits greater than 95% of incident light at 500 nm, 600 nm, or 700 nm incident light wavelength. In certain other examples, the separator transmits greater than 96% of incident light at 500 nm, 600 nm, or 700 nm incident light wavelength. In some other examples, the separator transmits greater than 97% of incident light at 500 nm, 600 nm, or 700 nm incident light wavelength. In certain examples, the separator transmits greater than 98% of incident light at 500 nm, 600 nm, or 700 nm incident light wavelength. In some examples, the separator transmits greater than 99% of incident light at 500 nm, 600 nm, or 700 nm incident light wavelength. In some other examples, the separator transmits greater than 99.5% of incident light at 500 nm, 600 nm, or 700 nm incident light wavelength. In certain examples, the separator transmits greater than 99.9% of incident light at 500 nm, 600 nm, or 700 nm incident light wavelength.

In some examples, set forth herein is a Li$^+$ ion-conducting separator, wherein the separator is polycrystalline, and has a $d_{90}$ grain size that is less than 20 μm, and transmits greater than 30% of incident light at 500 nm, 600 nm, or 700 nm incident light wavelength. In some examples, the $d_{90}$ grain size is less than 19 μm. In some examples, the $d_{90}$ grain size is less than 18 μm. In some examples, the $d_{90}$ grain size is less than 17 μm. In some examples, the $d_{90}$ grain size is less than 16 μm. In some examples, the $d_{90}$ grain size is less than 15 μm. In some examples, the $d_{90}$ grain size is less than 14 μm. In some examples, the $d_{90}$ grain size is less than 13 μm. In some examples, the $d_{90}$ grain size is less than 12 μm. In some examples, the $d_{90}$ grain size is less than 11 μm. In some examples, the $d_{90}$ grain size is less than 10 μm. In some examples, the $d_{90}$ grain size is less than 9 μm. In some examples, the $d_{90}$ grain size is less than 8 μm. In some examples, the $d_{90}$ grain size is less than 7 μm. In some examples, the $d_{90}$ grain size is less than 6 μm. In some examples, the $d_{90}$ grain size is less than 5 μm. In some examples, the $d_{90}$ grain size is less than 4 μm. In some examples, the $d_{90}$ grain size is less than 3 μm. In some examples, the $d_{90}$ grain size is less than 2 μm. In some examples, the $d_{90}$ grain size is less than 1 μm. In some examples, the $d_{90}$ grain size is less than 900 nm. In some examples, the $d_{90}$ grain size is less than 800 nm. In some examples, the $d_{90}$ grain size is less than 700 nm. In some examples, the $d_{90}$ grain size is less than 600 nm. In some examples, the $d_{90}$ grain size is less than 500 nm. In some examples, the $d_{90}$ grain size is less than 400 nm. In some examples, the $d_{90}$ grain size is less than 300 nm. In some examples, the $d_{90}$ grain size is less than 200 nm. In some examples, the $d_{90}$ grain size is less than 100 nm. In some examples, the $d_{90}$ grain size is less than 50 nm.

In some examples, the the $d_{90}$ grain size is less than 5 μm. In some examples, the the $d_{90}$ grain size is less than 3 μm. the $d_{90}$ grain size is less than 2 μm. In some of these examples, the grain size is related to the strength of the lithium-stuffed garnet film. In some of these examples, the grain size is related to the strength of the lithium-stuffed garnet pellet. In some of these examples, the grain size is related to the strength of the lithium-stuffed garnet monolith.

In some examples, set forth herein is a Li$^+$ ion-conducting separator, wherein the separator is polycrystalline, with a $d_{90}$ grain size is less than 20 μm, and transmits greater than 30% of incident light at 500 nm incident light wavelength. In some examples, the $d_{90}$ grain size is less than 19 μm. In some examples, the $d_{90}$ grain size is less than 18 μm. In some examples, the $d_{90}$ grain size is less than 17 μm. In some examples, the $d_{90}$ grain size is less than 16 μm. In some examples, the $d_{90}$ grain size is less than 15 μm. In some examples, the $d_{90}$ grain size is less than 14 μm. In some examples, the $d_{90}$ grain size is less than 13 μm. In some examples, the $d_{90}$ grain size is less than 12 μm. In some examples, the $d_{90}$ grain size is less than 11 μm. In some examples, the $d_{90}$ grain size is less than 10 μm. In some examples, the $d_{90}$ grain size is less than 9 μm. In some examples, the $d_{90}$ grain size is less than 8 μm. In some examples, the $d_{90}$ grain size is less than 7 μm. In some examples, the $d_{90}$ grain size is less than 6 μm. In some examples, the $d_{90}$ grain size is less than 5 μm. In some examples, the $d_{90}$ grain size is less than 4 μm. In some examples, the $d_{90}$ grain size is less than 3 μm. In some examples, the $d_{90}$ grain size is less than 2 μm. In some examples, the $d_{90}$ grain size is less than 1 μm. In some examples, the $d_{90}$ grain size is less than 90 nm. In some examples, the $d_{90}$ grain size is less than 900 nm. In some examples, the $d_{90}$ grain size is less than 800 nm. In some examples, the $d_{90}$ grain size is less than 700 nm. In some examples, the $d_{90}$ grain size is less than 600 nm. In some examples, the $d_{90}$ grain size is less than 500 nm. In some examples, the $d_{90}$ grain size is less than 400 nm. In some examples, the $d_{90}$ grain size is less than 300 nm. In some examples, the $d_{90}$ grain size is less than 200 nm. In some examples, the $d_{90}$ grain size is less than 100 nm. In some examples, the $d_{90}$ grain size is less than 50 nm.

In some examples, set forth herein is a Li$^+$ ion-conducting separator, wherein the separator is polycrystalline, with a $d_{90}$ grain size is less than 20 μm, and transmits greater than 30% of incident light at 500 nm and 600 nm incident light wavelength. In some examples, the $d_{90}$ grain size is less than 19 μm. In some examples, the $d_{90}$ grain size is less than 18 μm. In some examples, the $d_{90}$ grain size is less than 17 μm. In some examples, the $d_{90}$ grain size is less than 16 μm. In some examples, the $d_{90}$ grain size is less than 15 μm. In some examples, the $d_{90}$ grain size is less than 14 μm. In some examples, the $d_{90}$ grain size is less than 13 μm. In some examples, the $d_{90}$ grain size is less than 12 μm. In some examples, the $d_{90}$ grain size is less than 11 μm. In some examples, the $d_{90}$ grain size is less than 10 μm. In some examples, the $d_{90}$ grain size is less than 9 μm. In some examples, the $d_{90}$ grain size is less than 8 μm. In some examples, the $d_{90}$ grain size is less than 7 μm. In some examples, the $d_{90}$ grain size is less than 6 μm. In some examples, the $d_{90}$ grain size is less than 5 μm. In some examples, the $d_{90}$ grain size is less than 4 μm. In some examples, the $d_{90}$ grain size is less than 3 μm. In some examples, the $d_{90}$ grain size is less than 2 μm. In some examples, the $d_{90}$ grain size is less than 1 μm. In some examples, the $d_{90}$ grain size is less than 900 nm. In some examples, the $d_{90}$ grain size is less than 800 nm. In some examples, the $d_{90}$ grain size is less than 700 nm. In some examples, the $d_{90}$ grain size is less than 600 nm. In some examples, the $d_{90}$ grain size is less than 500 nm. In some examples, the $d_{90}$ grain size is less than 400 nm. In some examples, the $d_{90}$ grain size is less than 300 nm. In some examples, the $d_{90}$ grain size is less than 200 nm. In some examples, the $d_{90}$ grain size is less than 100 nm. In some examples, the $d_{90}$ grain size is less than 50 nm.

In some examples, set forth herein is a Li$^+$ ion-conducting separator, wherein the separator is polycrystalline, with a $d_{90}$ grain size is less than 20 μm, and transmits greater than 30% of incident light at 600 nm incident light wavelength. In some examples, the $d_{90}$ grain size is less than 19 μm. In some examples, the $d_{90}$ grain size is less than 18 μm. In some examples, the $d_{90}$ grain size is less than 17 μm. In some examples, the $d_{90}$ grain size is less than 16 μm. In some examples, the $d_{90}$ grain size is less than 15 μm. In some examples, the $d_{90}$ grain size is less than 14 μm. In some examples, the $d_{90}$ grain size is less than 13 μm. In some examples, the $d_{90}$ grain size is less than 12 μm. In some examples, the $d_{90}$ grain size is less than 11 μm. In some examples, the $d_{90}$ grain size is less than 10 μm. In some examples, the $d_{90}$ grain size is less than 9 μm. In some examples, the $d_{90}$ grain size is less than 8 μm. In some examples, the $d_{90}$ grain size is less than 7 μm. In some examples, the $d_{90}$ grain size is less than 6 μm. In some examples, the $d_{90}$ grain size is less than 5 μm. In some examples, the $d_{90}$ grain size is less than 4 μm. In some examples, the $d_{90}$ grain size is less than 3 μm. In some examples, the $d_{90}$ grain size is less than 2 μm. In some examples, the $d_{90}$ grain size is less than 1 μm. In some examples, the $d_{90}$ grain size is less than 900 nm. In some examples, the $d_{90}$ grain size is less than 800 nm. In some examples, the $d_{90}$ grain size is less than 700 nm. In some examples, the $d_{90}$ grain size is less than 600 nm. In some examples, the $d_{90}$ grain size is less than 500 nm. In some examples, the $d_{90}$ grain size is less than 400 nm. In some examples, the $d_{90}$ grain size is less than 300 nm. In some examples, the $d_{90}$ grain size is less than 200 nm. In some examples, the $d_{90}$ grain size is less than 100 nm. In some examples, the $d_{90}$ grain size is less than 50 nm.

In some examples, set forth herein is a Li$^+$ ion-conducting separator, wherein the separator is polycrystalline, with a $d_{90}$ grain size is less than 20 μm, and transmits greater than 30% of incident light at 700 nm incident light wavelength.

In some examples, set forth herein is a Li$^+$ ion-conducting separator, wherein the separator has a transmission coefficient greater than 0.5 to an incident wavelength in the range 300-700 nm.

In some examples, set forth herein is a Li$^+$ ion-conducting separator, wherein the separator has a transmission coefficient greater than 0.6 to an incident wavelength in the range 300-700 nm.

In some examples, set forth herein is a $Li^+$ ion-conducting separator, wherein the separator has a transmission coefficient greater than 0.7 to an incident wavelength in the range 300-700 nm.

In some examples, set forth herein is a $Li^+$ ion-conducting separator, wherein the separator has a transmission coefficient greater than 0.8 to an incident wavelength in the range 300-700 nm.

In some examples, set forth herein is a $Li^+$ ion-conducting separator, wherein the separator has a transmission coefficient greater than 0.9 to an incident wavelength in the range 300-700 nm.

In some examples, set forth herein is a $Li^+$ ion-conducting separator, wherein the separator has a transmission coefficient greater than 0.95 to an incident wavelength in the range 300-700 nm.

In some examples, set forth herein is a $Li^+$ ion-conducting separator, wherein the separator has a transmission percentage greater than 50% of incident light at 500 nm incident light wavelength. In some examples, the transmission percentage is greater than 51%. In some examples, the transmission percentage is greater than 52%. In some examples, the transmission percentage is greater than 53%. In some examples, the transmission percentage is greater than 54%. In some examples, the transmission percentage is greater than 55%. In some examples, the transmission percentage is greater than 56%. In some examples, the transmission percentage is greater than 57%. In some examples, the transmission percentage is greater than 58%. In some examples, the transmission percentage is greater than 59%.

In some examples, set forth herein is a $Li^+$ ion-conducting separator, wherein the separator has a transmission percentage greater than 60% at 500 nm incident light wavelength. In some examples, the transmission percentage is greater than 61%. In some examples, the transmission percentage is greater than 62%. In some examples, the transmission percentage is greater than 63%. In some examples, the transmission percentage is greater than 64%. In some examples, the transmission percentage is greater than 65%. In some examples, the transmission percentage is greater than 66%. In some examples, the transmission percentage is greater than 67%. In some examples, the transmission percentage is greater than 68%. In some examples, the transmission percentage is greater than 69%.

In some examples, set forth herein is a $Li^+$ ion-conducting separator, wherein the separator has a transmission percentage greater than 70% at 500 nm incident light wavelength. In some examples, the transmission percentage is greater than 71%. In some examples, the transmission percentage is greater than 72%. In some examples, the transmission percentage is greater than 73%. In some examples, the transmission percentage is greater than 74%. In some examples, the transmission percentage is greater than 75%. In some examples, the transmission percentage is greater than 76%. In some examples, the transmission percentage is greater than 77%. In some examples, the transmission percentage is greater than 78%. In some examples, the transmission percentage is greater than 79%.

In some examples, set forth herein is a $Li^+$ ion-conducting separator, wherein the separator has a transmission percentage greater than 80% at 500 nm incident light wavelength. In some examples, the transmission percentage is greater than 81%. In some examples, the transmission percentage is greater than 82%. In some examples, the transmission percentage is greater than 83%. In some examples, the transmission percentage is greater than 84%. In some examples, the transmission percentage is greater than 85%. In some examples, the transmission percentage is greater than 86%. In some examples, the transmission percentage is greater than 87%. In some examples, the transmission percentage is greater than 88%. In some examples, the transmission percentage is greater than 89%.

In some examples, set forth herein is a $Li^+$ ion-conducting separator, wherein the separator has a transmission percentage greater than 90% at 500 nm incident light wavelength. In some examples, the transmission percentage is greater than 91%. In some examples, the transmission percentage is greater than 92%. In some examples, the transmission percentage is greater than 93%. In some examples, the transmission percentage is greater than 94%. In some examples, the transmission percentage is greater than 95%. In some examples, the transmission percentage is greater than 96%. In some examples, the transmission percentage is greater than 97%. In some examples, the transmission percentage is greater than 98%. In some examples, the transmission percentage is greater than 99%.

In some examples, set forth herein is a $Li^+$ ion-conducting separator, wherein the separator has a transmission percentage greater than 99% at 500 nm incident light wavelength.

In some examples, set forth herein is a $Li^+$ ion-conducting separator, wherein the separator transmits greater than 30% of 400 nm to 700 nm light. In some examples, the transmission percentage is greater than 91%. In some examples, the transmission percentage is greater than 92%. In some examples, the transmission percentage is greater than 93%. In some examples, the transmission percentage is greater than 94%. In some examples, the transmission percentage is greater than 95%. In some examples, the transmission percentage is greater than 96%. In some examples, the transmission percentage is greater than 97%. In some examples, the transmission percentage is greater than 98%. In some examples, the transmission percentage is greater than 99%.

In some examples, set forth herein is a $Li^+$ ion-conducting separator, wherein the separator transmits greater than 40% of incident light at 400 nm to 700 nm incident light wavelength.

In some examples, set forth herein is a $Li^+$ ion-conducting separator, wherein the separator transmits greater than 50% of incident light at 400 nm to 700 nm incident light wavelength.

In some examples, set forth herein is a $Li^+$ ion-conducting separator, wherein the separator transmits greater than 60% of incident light at 400 nm to 700 nm incident light wavelength.

In some examples, set forth herein is a $Li^+$ ion-conducting separator, wherein the separator transmits greater than 70% of incident light at 400 nm to 700 nm incident light wavelength.

In some examples, set forth herein is a $Li^+$ ion-conducting separator, wherein the separator transmits greater than 80% of incident light at 400 nm to 700 nm incident light wavelength.

In some examples, set forth herein is a $Li^+$ ion-conducting separator, wherein the separator transmits greater than 90% of incident light at 400 nm to 700 nm incident light wavelength.

In some examples, set forth herein is a $Li^+$ ion-conducting separator, wherein the separator transmits greater than 99% of incident light at 400 nm to 700 nm incident light wavelength.

In some examples, set forth herein is a $Li^+$ ion-conducting separator, wherein the separator is 90% transparent to 400 nm to 700 nm light. In some examples, set forth herein is a Li⁺ ion-conducting separator, wherein the separator is about 70% transparent to 500 nm light when the thickness is less than 100 μm. In some examples, set forth herein is a Li⁺ ion-conducting separator, wherein the separator is about 80% transparent to 500 nm light when the thickness is less than 100 μm. In some examples, set forth herein is a Li⁺ ion-conducting separator, wherein the separator is about 90% transparent to 500 nm light when the thickness is less than 100 μm. In some examples, set forth herein is a Li⁺ ion-conducting separator, wherein the separator is about 95% transparent to 500 nm light when the thickness is less than 100 μm. In some examples, set forth herein is a Li⁺ ion-conducting separator, wherein the separator is about 98% transparent to 500 nm light when the thickness is less than 100 μm. In some examples, set forth herein is a Li⁺ ion-conducting separator, wherein the separator is about 99% transparent to 500 nm light when the thickness is less than 100 μm. In some examples, set forth herein is a Li⁺ ion-conducting separator, wherein the separator is about 70% transparent to 500 nm light when the thickness is less than 50 μm. In some examples, set forth herein is a Li⁺ ion-conducting separator, wherein the separator is about 80% transparent to 500 nm light when the thickness is less than 50 μm. In some examples, set forth herein is a Li⁺ ion-conducting separator, wherein the separator is about 90% transparent to 500 nm light when the thickness is less than 50 μm. In some examples, set forth herein is a Li⁺ ion-conducting separator, wherein the separator is about 95% transparent to 500 nm light when the thickness is less than 50 μm. In some examples, set forth herein is a Li⁺ ion-conducting separator, wherein the separator is about 98% transparent to 500 nm light when the thickness is less than 50 μm. In some examples, set forth herein is a Li⁺ ion-conducting separator, wherein the separator is about 99% transparent to 500 nm light when the thickness is less than 50 μm. In some examples, set forth herein is a Li⁺ ion-conducting separator, wherein the separator is about 70% transparent to 500 nm light when the thickness is less than 30 μm. In some examples, set forth herein is a Li⁺ ion-conducting separator, wherein the separator is about 80% transparent to 500 nm light when the thickness is less than 30 μm. In some examples, set forth herein is a Li⁺ ion-conducting separator, wherein the separator is about 90% transparent to 500 nm light when the thickness is less than 30 μm. In some examples, set forth herein is a Li⁺ ion-conducting separator, wherein the separator is about 95% transparent to 500 nm light when the thickness is less than 30 μm. In some examples, set forth herein is a Li⁺ ion-conducting separator, wherein the separator is about 98% transparent to 500 nm light when the thickness is less than 30 μm. In some examples, set forth herein is a Li⁺ ion-conducting separator, wherein the separator is about 99% transparent to 500 nm light when the thickness is less than 30

In some examples, set forth herein is a Li⁺ ion-conducting separator, wherein the separator has a 10% total reflectance for 400 nm to 700 nm light.

In some examples, set forth herein is a Li⁺ ion-conducting separator, wherein less than 10% of the total reflectance is diffuse reflectance and the remainder of the total reflectance is specular reflectance. In certain examples, the separator with this property has a surface roughness ($R_a$) less than 5 μm.

In some examples, the separator has a surface roughness from 0.05 μm $R_a$ to 4 μm $R_a$, wherein $R_a$ is an arithmetic average of absolute values of sampled surface roughness amplitudes. In some examples, the surface roughness from 0.05 μm Ra to 4 μm $R_a$. In some examples, the surface has a surface roughness from 0.5 μm $R_t$ to 30 μm $R_t$, wherein $R_t$ is the maximum peak height of sampled surface roughness amplitudes. In some examples, the surface roughness is from 1.6 μm $R_a$ to 2.2 μm $R_a$. In other examples, the surface roughness is from 3.2 μm $R_a$ to 3.7 μm $R_a$. In still other examples, the surface roughness is from 1 μm $R_t$ to 28 μm $R_t$. In some other examples, the surface roughness is from 10 μm $R_t$ to 30 μm $R_t$. In certain examples, the surface roughness is from 15 μm $R_t$ to 30 μm $R_t$. In some examples, the crystallite size in the grains is about 200 nm to 1 μm. In some examples, the crystallite size in the grains is about 100 nm to 5 μm. In some examples, the surface roughness is 0.05 μm, 0.1 μm Ra, 0.2 μm Ra, 0.3 μm Ra, 0.4 μm Ra, 0.5 μm Ra, 0.6 μm Ra, 0.7 μm Ra, 0.8 μm Ra, 0.9 μm Ra, 1 μm Ra, 1.5 μm, 2 μm Ra, 2.5 μm Ra, 3 μm Ra, 3.5 μm, or 4 μm Ra.

In some examples, set forth herein is a Li⁺ ion-conducting separator, wherein the separator is an oxide, a sulfide, a sulfide-halide, or a borohydride.

In some examples, set forth herein is a Li⁺ ion-conducting separator, wherein the separator is an oxide selected from a lithium-stuffed garnet characterized by the formula $Li_xLa_yZr_zO_t \cdot qAl_2O_3$, wherein $4<x<8$, $1<y<4$, $1<z<3$, $6<t<14$, $0 \leq q \leq 1$. In certain examples, q is 0.1, 0.2, 0.3, 0.4, 0.5, 0.6, 0.7, 0.8, 0.9, or 1.

In some examples, set forth herein is a Li⁺ ion-conducting separator, wherein the lithium-stuffed garnet is doped with Al, Nb, Ga, and/or Ta.

In some examples, set forth herein is a Li⁺ ion-conducting separator, wherein the lithium-stuffed garnet is doped with Nb, Ga, and/or Ta, and wherein the separator is not doped with Al.

In some examples, set forth herein is a Li⁺ ion-conducting separator, wherein the lithium-stuffed garnet is $Li_aLa_bZr_cAl_dMe''_eO_f$, wherein $5<a<8.5$; $2<b<4$; $0<c \leq 2.5$; $0 \leq d<2$; $0 \leq e<2$, and $10<f<13$ and Me'' is a metal selected from Nb, Ga, Ta, or combinations thereof.

In some examples, set forth herein is a Li⁺ ion-conducting separator, wherein the lithium-stuffed garnet is characterized by the formula $Li_xLa_yZr_zO_t \cdot 0.22(Al_2O_3)$ or $Li_xLa_yZr_zO_t \cdot (Al_2O_3)$, wherein $5<x<8.5$.

In some examples, set forth herein is a Li⁺ ion-conducting separator, wherein the separator is a sulfide or sulfide-halide selected from LPSI, LSS, SLOPS, LSTPS, SLOBS, or LATS, wherein LPSI, LSS, SLOPS, LSTPS, SLOBS, or LATS are as defined in the definition section. In some examples, set forth herein is a Li⁺ ion-conducting separator, wherein the separator is a LIRAP or LBHI as defined in the definition section.

In some examples, set forth herein is a Li⁺ ion-conducting separator, wherein the separator is a solid thin film, monolith, or a composite with a polymer. In some examples, the separator is a thin film. In some examples, the separator is a monolith. In some examples, the separator is a composite with a polymer.

In some examples, set forth herein is a Li⁺ ion-conducting separator, wherein the separator includes a lithium-stuffed garnet oxide characterized by the formula $Li_uLa_vZr_xO_y \cdot zAl_2O_3$, wherein u is a rational number from 4 to 10;
v is a rational number from 2 to 4;
x is a rational number from 1 to 3;
y is a rational number from 10 to 14; and
z is a rational number from 0 to 1;

In some examples, u, v, x, y, and z are selected so that the lithium-stuffed garnet oxide is charge neutral.

In some examples, set forth herein is a Li$^+$ ion-conducting separator, wherein the separator is a lithium-stuffed garnet oxide characterized by the formula Li$_u$La$_v$Zr$_x$O$_y$.zAl$_2$O$_3$, wherein
u is a rational number from 4 to 10;
v is a rational number from 2 to 4;
x is a rational number from 1 to 3;
y is a rational number from 10 to 14; and
z is a rational number from 0 to 1;
In some examples, u, v, x, y, and z are selected so that the lithium-stuffed garnet oxide is charge neutral.

In some examples, set forth herein is a Li$^+$ ion-conducting separator, wherein the separator includes a lithium-stuffed garnet oxide characterized by the formula Li$_u$La$_3$Zr$_2$O$_{12}$.zAl$_2$O$_3$, wherein 4≤u≤10 and 0<z≤1.

In some examples, set forth herein is a Li$^+$ ion-conducting separator, wherein the separator is a lithium-stuffed garnet oxide characterized by the formula Li$_u$La$_3$Zr$_2$O$_{12}$.zAl$_2$O$_3$, wherein 4≤u≤10 and 0<z≤1.

In some examples, set forth herein is a Li$^+$ ion-conducting separator, wherein the separator includes a lithium-stuffed garnet oxide characterized by the formula Li$_{6.15-7.1}$La$_3$Zr$_2$O$_{12}$.0.5Al$_2$O$_3$ or Li$_{6.4-7.7}$La$_3$Zr$_2$O$_{12}$.0.11Al$_2$O$_3$.

In some examples, set forth herein is a Li$^+$ ion-conducting separator, wherein the separator is a lithium-stuffed garnet oxide characterized by the formula Li$_{6.75-7.1}$La$_3$Zr$_2$O$_{12}$.0.5Al$_2$O$_3$.

In some examples, set forth herein is a Li$^+$ ion-conducting separator, wherein the separator includes:
a lithium sulfide characterized by one of the following Formula
Li$_a$Si$_b$Sn$_c$P$_d$S$_e$O$_f$, wherein 2≤a≤8, b+c=1, 0.5≤d≤2.5, 4≤e≤12, and 0<f≤10;
Li$_g$As$_h$Sn$_j$S$_k$O$_l$, wherein 2≤g≤6, 0≤h≤1, 0≤j≤1, 2≤k≤6, and 0≤l≤10;
Li$_m$P$_n$S$_p$X$_q$, wherein X=Cl, Br, and/or I, 2≤m≤6, 0≤n≤1, 0≤p≤1, 2≤q≤6; or
a mixture of (Li$_2$S):(P$_2$S$_5$) having a molar ratio from about 10:1 to about 6:4 and LiI, wherein the ratio of [(Li$_2$S):(P$_2$S$_5$)]:LiI is from 95:5 to 50:50;
a mixture of LiI and Al$_2$O$_3$;
Li$_3$N;
LIRAP;
LPS+X, wherein X is selected from Cl, I, or Br;
vLi$_2$S+wP$_2$S$_5$+yLiX;
vLi$_2$S+wSiS$_2$+yLiX;
vLi$_2$S+wSnS$_2$+zP$_2$S$_5$+yLiX;
vLi$_2$S+wSiS$_2$+zP$_2$S$_5$+yLiX;
vLi$_2$S+wB$_2$S$_3$+yLiX;
a mixture of LiBH$_4$ and LiX wherein X is selected from Cl, I, or Br; or
vLiBH$_4$+wLiX+yLiNH$_2$, wherein X is selected from Cl, I, or Br; and
wherein coefficients v, w, and y and z are rational numbers from 0 to 1.

In some examples, set forth herein is a Li$^+$ ion-conducting separator, wherein the separator includes a lithium sulfide characterized by Li$_{10}$Si$_{0.5}$Sn$_{0.5}$P$_2$S$_{12}$ and Li$_{7.4}$P$_{1.6}$S$_{7.2}$I.

In some examples, set forth herein is a Li$^+$ ion-conducting separator, wherein the separator is a lithium sulfide characterized by Li$_{10}$Si$_{0.5}$Sn$_{0.5}$P$_2$S$_{12}$ and Li$_{7.4}$P$_{1.6}$S$_{7.2}$I.

In some examples, set forth herein is a Li$^+$ ion-conducting separator, wherein the separator includes a lithium sulfide characterized by Li$_{7.4}$P$_{1.6}$S$_{7.2}$I.

In some examples, set forth herein is a Li$^+$ ion-conducting separator, wherein the separator includes a borohydride selected from LBHI and LBHI-N.

In some examples, set forth herein is a Li$^+$ ion-conducting separator, wherein the separator is a borohydride selected from LBHI and LBHI-N.

In some examples, set forth herein is a Li$^+$ ion-conducting separator, wherein the separator is a pellet or a film. In some examples, the separator is a pellet. In some other examples, the separator is a film. In some other examples, the separator is a thin film.

Figure 8:
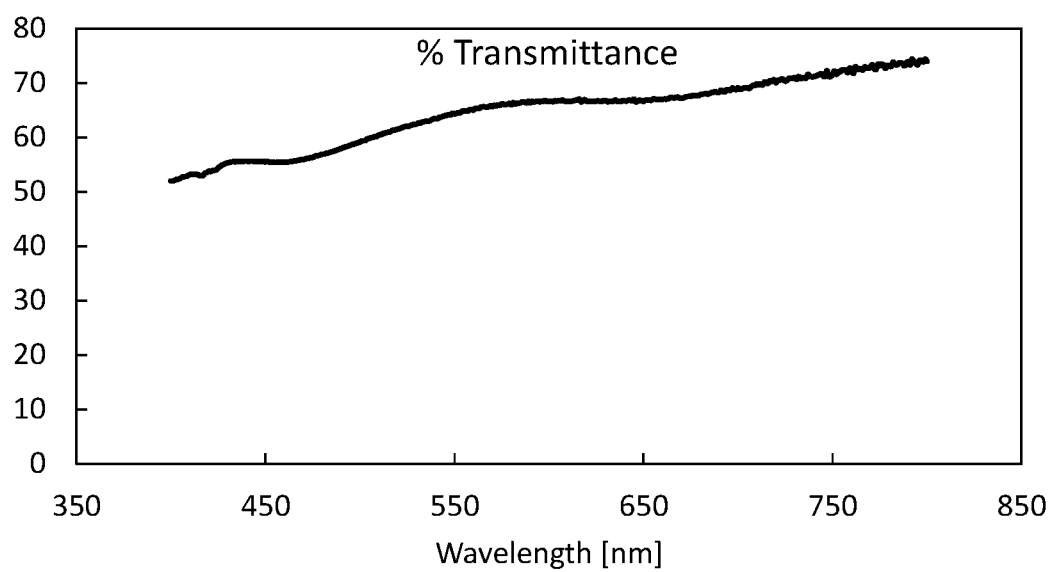
FIG. 8 shows a plot of transmission versus wavelength for a translucent lithium-stuffed garnet separator, prepared according to Example 2.

In some examples, set forth herein is a Li$^+$ ion-conducting separator, wherein the separator has a transmission percentage that varies by less than ±10% over an area of at least 0.5 cm$^2$. The transmittance of samples was measured by Thermo Evolution 220 UV-Vis instrument with 60 mm integrating sphere. The UV-Vis spectra was collected in transmittance mode with a wavelength range 400-800 nm and 2 nm/sec scan speed. A baseline correction was performed before measurements using 100% T (no sample)/0% T (blocked sample) method. All samples were mirror-polished to 0.7 mm thick to eliminate surface scattering and thickness effect. Results of such a measurement on one sample are shown in FIG. 8.

In some examples, set forth herein is a Li$^+$ ion-conducting separator, wherein the separator has a transmission percentage that varies by less than ±9% over an area of at least 0.5 cm$^2$.

In some examples, set forth herein is a Li$^+$ ion-conducting separator, wherein the separator has a transmission percentage that varies by less than ±8% over an area of at least 0.5 cm$^2$.

In some examples, set forth herein is a Li$^+$ ion-conducting separator, wherein the separator has a transmission percentage that varies by less than ±7% over an area of at least 0.5 cm$^2$.

In some examples, set forth herein is a Li$^+$ ion-conducting separator, wherein the separator has a transmission percentage that varies by less than ±6% over an area of at least 0.5 cm$^2$.

In some examples, set forth herein is a Li$^+$ ion-conducting separator, wherein the separator has a transmission percentage that varies by less than ±5% over an area of at least 0.5 cm$^2$.

In some examples, set forth herein is a Li$^+$ ion-conducting separator, wherein the separator has a transmission percentage that varies by less than ±4% over an area of at least 0.5 cm$^2$.

In some examples, set forth herein is a Li$^+$ ion-conducting separator, wherein the separator has a transmission percentage that varies by less than ±3% over an area of at least 0.5 cm$^2$.

In some examples, set forth herein is a Li$^+$ ion-conducting separator, wherein the separator has a transmission percentage that varies by less than ±2% over an area of at least 0.5 cm$^2$.

In some examples, set forth herein is a Li$^+$ ion-conducting separator, wherein the separator has a transmission percentage that varies by less than ±1% over an area of at least 0.5 cm$^2$.

In some examples, set forth herein is a Li$^+$ ion-conducting separator, wherein the transmission coefficient is 0.2±0.1 and the separator thickness is less than 1 mm.

In some examples, set forth herein is a Li$^+$ ion-conducting separator, wherein the transmission coefficient is 0.3±0.1 and the separator thickness is less than 1 mm.

In some examples, set forth herein is a Li$^+$ ion-conducting separator, wherein the transmission coefficient is 0.4±0.1 and the separator thickness is less than 1 mm.

In some examples, set forth herein is a $Li^+$ ion-conducting separator, wherein the transmission coefficient is 0.5±0.1 and the separator thickness is less than 1 mm.

In some examples, set forth herein is a $Li^+$ ion-conducting separator, wherein the transmission coefficient is 0.6±0.1 and the separator thickness is less than 1 mm.

In some examples, set forth herein is a $Li^+$ ion-conducting separator, wherein the transmission coefficient is 0.7±0.1 and the separator thickness is less than 1 mm.

The In some examples, set forth herein is a $Li^+$ ion-conducting separator, wherein the transmission coefficient is 0.8±0.1 and the separator thickness is less than 1 mm.

In some examples, set forth herein is a $Li^+$ ion-conducting separator, wherein the transmission coefficient is 0.9±0.1 and the separator thickness is less than 1 cm.

In some examples, set forth herein is a $Li^+$ ion-conducting separator, wherein the transmission coefficient is 0.2±0.1 and the separator thickness is less than 1 cm.

In some examples, set forth herein is a $Li^+$ ion-conducting separator, wherein the transmission coefficient is 0.3±0.1 and the separator thickness is less than 1 cm.

In some examples, set forth herein is a $Li^+$ ion-conducting separator, wherein the transmission coefficient is 0.4±0.1 and the separator thickness is less than 1 cm.

In some examples, set forth herein is a $Li^+$ ion-conducting separator, wherein the transmission coefficient is 0.5±0.1 and the separator thickness is less than 1 cm.

In some examples, set forth herein is a $Li^+$ ion-conducting separator, wherein the transmission coefficient is 0.6±0.1 and the separator thickness is less than 1 cm.

In some examples, set forth herein is a $Li^+$ ion-conducting separator, wherein the transmission coefficient is 0.7±0.1 and the separator thickness is less than 1 cm.

The In some examples, set forth herein is a $Li^+$ ion-conducting separator, wherein the transmission coefficient is 0.8±0.1 and the separator thickness is less than 1 cm.

In some examples, set forth herein is a $Li^+$ ion-conducting separator, wherein the transmission coefficient is 0.9±0.1 and the separator thickness is less than 1 cm.

In some examples, set forth herein is a $Li^+$ ion-conducting separator, wherein the transmission coefficient is 0.2±0.1 and the separator thickness is less than 1 µm.

In some examples, set forth herein is a $Li^+$ ion-conducting separator, wherein the transmission coefficient is 0.3±0.1 and the separator thickness is less than 1 µm.

In some examples, set forth herein is a $Li^+$ ion-conducting separator, wherein the transmission coefficient is 0.4±0.1 and the separator thickness is less than 1 µm.

In some examples, set forth herein is a $Li^+$ ion-conducting separator, wherein the transmission coefficient is 0.5±0.1 and the separator thickness is less than 1 µm.

In some examples, set forth herein is a $Li^+$ ion-conducting separator, wherein the transmission coefficient is 0.6±0.1 and the separator thickness is less than 1 µm.

In some examples, set forth herein is a $Li^+$ ion-conducting separator, wherein the transmission coefficient is 0.7±0.1 and the separator thickness is less than 1 µm.

The In some examples, set forth herein is a $Li^+$ ion-conducting separator, wherein the transmission coefficient is 0.8±0.1 and the separator thickness is less than 1 µm.

In some examples, set forth herein is a $Li^+$ ion-conducting separator, wherein the transmission coefficient is 0.9±0.1 and the separator thickness is less than 1 µm.

In some examples, set forth herein is a $Li^+$ ion-conducting separator, wherein the separator is transparent over an area of at least 1 $cm^2$. In some examples, the separator is transparent over an area of at least 1.5 $cm^2$. In some examples, the separator is transparent over an area of at least 2 $cm^2$. In some examples, the separator is transparent over an area of at least 2.5 $cm^2$. In some examples, the separator is transparent over an area of at least 3 $cm^2$. In some examples, the separator is transparent over an area of at least 3.5 $cm^2$. In some examples, the separator is transparent over an area of at least 4 $cm^2$. In some examples, the separator is transparent over an area of at least 4.5 $cm^2$. In some examples, the separator is transparent over an area of at least 5 $cm^2$.

In some examples, set forth herein is a $Li^+$ ion-conducting separator, wherein the separator is translucent over an area of at least 1 $cm^2$. In some examples, the separator is translucent over an area of at least 1.5 $cm^2$. In some examples, the separator is translucent over an area of at least 2 $cm^2$. In some examples, the separator is translucent over an area of at least 2.5 $cm^2$. In some examples, the separator is translucent over an area of at least 3 $cm^2$. In some examples, the separator is translucent over an area of at least 3.5 $cm^2$. In some examples, the separator is translucent over an area of at least 4 $cm^2$. In some examples, the separator is translucent over an area of at least 4.5 $cm^2$. In some examples, the separator is translucent over an area of at least 5 $cm^2$.

In some examples, set forth herein is a $Li^+$ ion-conducting separator, wherein the separator is translucent over an area of at least $64 \cdot \pi$ $mm^2$.

In some examples, set forth herein is a $Li^+$ ion-conducting separator, wherein the separator is transparent over an area of at least $64 \cdot \pi$ $mm^2$.

In some examples, set forth herein is a $Li^+$ ion-conducting separator, wherein the separator is transparent over an area of at least 0.5 $cm^2$.

In some examples, set forth herein is a $Li^+$ ion-conducting separator, wherein the separator is transparent over an area of at least 5 $cm^2$.

In some examples, set forth herein is a $Li^+$ ion-conducting separator, wherein the separator is transparent over an area of at least 25 $cm^2$.

In some examples, set forth herein is a $Li^+$ ion-conducting separator, wherein the separator is transparent over an area of at least 100 $cm^2$.

In some examples, set forth herein is a $Li^+$ ion-conducting separator, wherein the separator is transparent over an area of at least 200 $cm^2$.

In some examples, set forth herein is a $Li^+$ ion-conducting separator, wherein the $d_{90}$ grain size ranges from 0.1 to 20 µm.

In some examples, set forth herein is a $Li^+$ ion-conducting separator having a defect density from $1/m^2$ to $1/mm^2$. In some examples, there is only one defect per $m^2$. In some examples, there is only one defect per $cm^2$. In some examples, there is only one defect per $mm^2$. In some examples, there is only one defect per $µm^2$. In some examples, there is only one defect per 10 $nm^2$.

In some examples herein, the solid-state electrolyte is a lithium-stuffed garnet electrolyte having a defect density less than $1/m^2$. In some examples herein, the solid-state electrolyte is a lithium-stuffed garnet electrolyte having a defect density less than $1/cm^2$. In some examples herein, the solid-state electrolyte is a lithium-stuffed garnet electrolyte having a defect density less than $1/mm^2$. In some examples herein, the solid-state electrolyte is a lithium-stuffed garnet electrolyte having a defect density less than $1/µm^2$. In some examples herein, the solid-state electrolyte is a lithium-stuffed garnet electrolyte having a defect density less than $1/nm^2$.

In some examples, set forth herein is a Li$^+$ ion-conducting separator, wherein a scattering center density ranges from 1/m$^2$ to 1/mm$^2$. In some examples, there is only one scattering center per m$^2$. In some examples, there is only one scattering center per cm$^2$. In some examples, there is only one scattering center per mm$^2$. In some examples, there is only one scattering center per μm$^2$. In some examples, there is only one scattering center per nm$^2$.

In some examples, set forth herein is a Li$^+$ ion-conducting separator, wherein a geometric porosity from ranges 10 ppb to 6%.

In some examples, set forth herein is a Li$^+$ ion-conducting separator, wherein an Archimedes porosity from ranges 10 ppb to 6%.

In some examples, set forth herein is a Li$^+$ ion-conducting separator, wherein a density from 94%-99.9999% as measured by a 2D cross-section.

In some examples, set forth herein is a Li$^+$ ion-conducting separator, wherein the separator is a pellet, monolith or thin film having a thickness less than 1 mm and greater than 10 nm.

In some examples, set forth herein is a Li$^+$ ion-conducting separator, wherein the separator is a pellet, monolith or thin film having a thickness less than 1 cm and greater than 10 nm.

In some examples, set forth herein is a Li$^+$ ion-conducting separator, wherein the separator is a pellet, monolith or thin film having a thickness less than 1 μm and greater than 10 nm.

In some examples, set forth herein is a Li$^+$ ion-conducting separator, having a Geometric porosity less than 5% by volume.

In some examples, set forth herein is a Li$^+$ ion-conducting separator, having an Archimedes porosity less than 5% by volume.

In some examples, set forth herein is a Li$^+$ ion-conducting separator, having a Archimedes porosity less than 1% by volume.

In some examples, set forth herein is a Li$^+$ ion-conducting separator, wherein the D$_{90}$ grain is from 0.4 μm to 20 μm.

In some examples, set forth herein is a Li$^+$ ion-conducting separator, wherein the separator consists essentially of more than 95% of a primary phase when measured by a quantitative XRD.

In some examples, set forth herein is a Li$^+$ ion-conducting separator, wherein the separator consists essentially of more than 98% of a primary phase when measured by a quantitative XRD.

In some examples, set forth herein is a Li$^+$ ion-conducting separator, wherein the separator consists essentially of more than 99% of a primary phase when measured by a quantitative XRD.

In some examples, set forth herein is a Li$^+$ ion-conducting separator, wherein the separator consists essentially of more than 99.9% of a primary phase when measured by a quantitative XRD.

In some examples, set forth herein is a Li$^+$ ion-conducting separator which includes: a lithium-stuffed garnet oxide characterized by the formula Li$_u$La$_v$Zr$_x$O$_y$·zTa$_2$O$_5$, wherein
  u is a rational number from 4 to 10;
  v is a rational number from 2 to 4;
  x is a rational number from 1 to 3;
  y is a rational number from 10 to 14; and
  z is a rational number from 0 to 1;
  wherein u, v, x, y, and z are selected so that the lithium-stuffed garnet oxide is charge neutral.

In some examples, set forth herein is a Li$^+$ ion-conducting separator which includes a lithium-stuffed garnet oxide characterized by the formula Li$_u$La$_v$Zr$_x$O$_y$·zNb$_2$O$_5$, wherein
  u is a rational number from 4 to 10;
  v is a rational number from 2 to 4;
  x is a rational number from 1 to 3;
  y is a rational number from 10 to 14; and
  z is a rational number from 0 to 1;
  wherein u, v, x, y, and z are selected so that the lithium-stuffed garnet oxide is charge neutral.

In some examples, set forth herein is a Li$^+$ ion-conducting separator which includes a lithium-stuffed garnet oxide characterized by the formula Li$_u$La$_v$Zr$_x$O$_y$·zGa$_2$O$_3$, wherein
  u is a rational number from 4 to 10;
  v is a rational number from 2 to 4;
  x is a rational number from 1 to 3;
  y is a rational number from 10 to 14; and
  z is a rational number from 0 to 1;
  wherein u, v, x, y, and z are selected so that the lithium-stuffed garnet oxide is charge neutral.

In some examples, set forth herein is a Li$^+$ ion-conducting separator which includes a lithium-stuffed garnet oxide characterized by the formula Li$_u$La$_v$Zr$_x$O$_y$·zTa$_2$O$_5$·bAl$_2$O$_3$, wherein
  u is a rational number from 4 to 10;
  v is a rational number from 2 to 4;
  x is a rational number from 1 to 3;
  y is a rational number from 10 to 14; and
  z is a rational number from 0 to 1;
  b is a rational number from 0 to 1;
  wherein z+b≤1
  wherein u, v, x, y, and z are selected so that the lithium-stuffed garnet oxide is charge neutral.

In some examples, set forth herein is a Li$^+$ ion-conducting separator which includes a lithium-stuffed garnet oxide characterized by the formula Li$_u$La$_v$Zr$_x$O$_y$·zNb$_2$O$_5$·bAl$_2$O$_3$, wherein
  u is a rational number from 4 to 10;
  v is a rational number from 2 to 4;
  x is a rational number from 1 to 3;
  y is a rational number from 10 to 14; and
  z is a rational number from 0 to 1;
  b is a rational number from 0 to 1;
  wherein z+b≤1
  wherein u, v, x, y, and z are selected so that the lithium-stuffed garnet oxide is charge neutral.

In some examples, set forth herein is a Li$^+$ ion-conducting separator which includes a lithium-stuffed garnet oxide characterized by the formula Li$_u$La$_v$Zr$_x$O$_y$·zGa$_2$O$_3$bAl$_2$O$_3$, wherein
  u is a rational number from 4 to 10;
  v is a rational number from 2 to 4;
  x is a rational number from 1 to 3;
  y is a rational number from 10 to 14; and
  z is a rational number from 0 to 1;
  b is a rational number from 0 to 1;
  wherein z+b≤1
  wherein u, v, x, y, and z are selected so that the lithium-stuffed garnet oxide is charge neutral.

In some examples, set forth herein is a Li$^+$ ion-conducting separator, wherein the lithium ion conductivity is greater than 10$^{-4}$ S/cm at 25° C.

In some examples, set forth herein is a Li$^+$ ion-conducting separator, wherein the lithium interfacial area-specific resistance is less than 20 Ωcm$^2$ at 25° C.

In some examples, set forth herein is a Li+ ion-conducting separator, wherein the translucent properties of the separators are uniform over a surface area of at least 100 nm².

III. THIN FILMS

In certain examples, the translucent or transparent film disclosed herein is a thin film having a thickness that is between about 10 nm to 100 µm.

In some examples, the translucent or transparent film has a thickness from about 10 µm to about 100 µm. In some other of the methods disclosed herein, these film have a thickness from about 20 µm to about 100 µm. In certain of the methods disclosed herein, the film has a thickness from about 30 µm to about 100 µm. In certain other of the methods disclosed herein, the film has a thickness from about 40 µm to about 100 µm. In yet other methods disclosed herein, the film has a thickness from about 50 µm to about 100 µm. In still other methods disclosed herein, the film has a thickness from about 60 µm to about 100 µm. In yet some other methods disclosed herein, the film has a thickness from about 70 µm to about 100 µm. In some of the methods disclosed herein, the film has a thickness from about 80 µm to about 100 µm. In some other of the methods disclosed herein, the film has a thickness from about 90 µm to about 100 µm. In some of the methods disclosed herein, the film has a thickness from about 10 µm to about 90 µm. In some other of the methods disclosed herein, the film has a thickness from about 20 µm to about 80 µm. In certain of the methods disclosed herein, the film has a thickness from about 30 µm to about 70 µm. In certain other of the methods disclosed herein, the film has a thickness from about 40 µm to about 60 µm. In yet other methods disclosed herein, the film has a thickness from about 50 µm to about 90 µm. In still other methods disclosed herein, the film has a thickness from about 60 µm to about 90 µm. In yet some other methods disclosed herein, the film has a thickness from about 70 µm to about 90 µm. In some of the methods disclosed herein, the film has a thickness from about 80 µm to about 90 µm. In some other of the methods disclosed herein, the film has a thickness from about 30 µm to about 60 µm. In some examples, the films have a thickness of about 1-150 µm. In some of these examples the films has a thickness of about 1 µm. In some other examples the films has a thickness of about 2 µm. In certain examples, the films has a thickness of about 3 µm. In certain other examples the films has a thickness of about 4 µm. In some other examples the films has a thickness of about 5 µm. In some examples the films has a thickness of about 6 µm. In some of these examples the films has a thickness of about 7 µm. In some examples the films has a thickness of about 8 µm. In some other examples the films has a thickness of about 9 µm. In certain examples the films has a thickness of about 10 µm. In some of these examples the films has a thickness of about 11 µm. In some other examples the films has a thickness of about 12 µm. In certain examples, the films has a thickness of about 13 µm. In certain other examples the films has a thickness of about 14 µm. In some other examples the films has a thickness of about 15 µm. In some examples the films has a thickness of about 16 µm. In some of these examples the films has a thickness of about 17 µm. In some examples the films has a thickness of about 18 µm. In some other examples the films has a thickness of about 19 µm. In certain examples the films has a thickness of about 20 µm.

In some examples, the translucent or transparent film is circularly-shaped and has a diameter of about 10 mm. In some examples, the diameter, is 1, 2, 3, 4, 5, 6, 7, 8, 9, 10, 11, 12, 13, 14, 15, 16, 17, 18, 19 or 20 mm.

In some examples, the translucent or transparent film is rectangularly-shaped and has a long edge length of about 10 cm. In some examples, the longer edge length, is 1, 2, 3, 4, 5, 6, 7, 8, 9, 10, 11, 12, 13, 14, 15, 16, 17, 18, 19 or 20 cm.

IV. METHODS OF MAKING SEPARATORS

In some examples, set forth herein is method for making a translucent and flexible Flexible Li+ ion-Conducting Separator, wherein the method comprises:
providing an inorganic material;
milling the inorganic material to form a milled inorganic material;
annealing the milled inorganic material to form an annealed inorganic material;
pressing the annealed inorganic material; and
heating the inorganic material.

In some examples of the methods set forth herein, the inorganic material is $Li_xLa_yZr_zO_t \cdot qAl_2O_3$, wherein $4<x<10$, $1<y<4$, $1<z<3$, $6<t<14$, $0 \le q \le 1$. In some other examples, the inorganic material is selected from LPSI, LSS, SLOPS, LSTPS, SLOBS, LATS, and combinations thereof. In yet other examples, the inorganic material is selected from LBHI, LBNHI, LBHCl, LBNHCl, LBHBr, LBNHBr and combinations thereof. In yet other examples, the inorganic material is $Li_aSi_bSn_cP_dS_eO_f$, wherein $2 \le a \le 8$, $b+c=1$, $0.5 \le d \le 2.5$, $4 \le e \le 12$, and $0 < f \le 10$. In other examples, the inorganic material is $Li_gAs_hSn_jS_kO_l$, wherein $2 \le g \le 6$, $0 \le h \le 1$, $0 \le j \le 1$, $2 \le k \le 6$, and $0 \le l \le 10$. In some other examples, the inorganic material is $Li_mP_nS_pI_q$, wherein $2 \le m \le 6$, $0 \le n \le 1$, $0 \le p \le 1$, $2 \le q \le 6$. In some other examples, the inorganic material is a mixture of $(Li_2S):(P_2S_5)$ having a molar ratio from about 10:1 to about 6:4 and LiI, wherein the ratio of $[(Li_2S):(P_2S_5)]$:LiI is from 95:5 to 50:50. In some other examples, the inorganic material is a mixture of LiI and $Al_2O_3$. In some other examples, the inorganic material is $Li_3N$. In some other examples, the inorganic material is a LPS+X, wherein X is selected from Cl, I, or Br. In some other examples, the inorganic material is $vLi_2S+wP_2S_5+yLiX$, $vLi_2S+wSiS_2+yLiX$, $vLiBH_4+wLiX+yLiNH_2$, or $vLi_2S+wB_2S_3+yLiX$, wherein coefficients v, w, and y are rational numbers from 0 to 1. In some other examples, the inorganic material is a mixture of $LiBH_4$ and LiX wherein X is selected from Cl, I, or Br. In these examples, X is selected from Cl, I, or Br.

In some examples of the methods set forth herein, the milling the inorganic material to form a milled inorganic material includes milling until the inorganic material has a $d_{50}$ particle size of 100 nm to 1000 nm.

In some examples, the annealing the milled inorganic material to form an annealed inorganic material includes heating the inorganic material. In some examples, the heating the inorganic material is in a controlled atmosphere. In some examples, the heating includes heating the inorganic material to at least 400, 500, 600, 700, 800, 900, or 1000° C. In some examples, the heating includes heating the inorganic material to at least 400, 500, 600, 700, 800, 900, or 1000° C. in an atmosphere having Argon, hydrogen, water, or a combination thereof.

In some examples, the pressing the annealed inorganic material and heating the inorganic material is accomplished simultaneously. In some examples, the pressing the annealed inorganic material precedes the heating the inorganic material. In some examples, the pressing the annealed inorganic material includes pressing to at least 100 pounds per square inch (PSI). In some examples, the pressing the annealed inorganic material includes pressing to at least 1000 pounds per square inch (PSI). In some examples, the pressing the annealed inorganic material includes pressing to at least 10,000 pounds per square inch (PSI). In some examples, the heating the annealed inorganic material includes heating to at least 500° C. In some examples, the pressing the annealed inorganic material includes heating to at least 750° C. In some examples, the heating the annealed inorganic material includes heating to at least 900° C. In some examples, the pressing the annealed inorganic material includes heating to at least 1000° C. In some examples, the heating the annealed inorganic material includes heating to at least 1200° C. In some examples, the pressing the annealed inorganic material includes heating to at least 1500° C. In some examples, the heating the annealed inorganic material includes heating to at least 17000° C. In some examples, the pressing the annealed inorganic material includes heating to at least 2000° C. In certain examples, the heating, and/or pressing is performed for 15 seconds, 30 seconds, 45 seconds, or 60 seconds. In certain examples, the heating, and/or pressing is performed for about 1 minute, about 2 minutes, about 5 minutes, or about 10 minutes.

In some examples, the method comprises melting an ion-conductor material or combination of ion-conductor materials or precursors to ion conductor materials and moulding, flowing, or pressing the melt into shape. In some examples, the method comprises melting an ion-conductor material or combination of ion-conductor materials or precursors to ion conductor materials and moulding the melt into shape. In some examples, the method comprises melting an ion-conductor material or combination of ion-conductor materials or precursors to ion conductor materials and flowing the melt into shape. In some examples, the method comprises melting an ion-conductor material or combination of ion-conductor materials or precursors to ion conductor materials and pressing the melt into shape. In some examples, the method comprises casting a powder of inorganic ion conductor and optionally a polymer into sheets. In some examples, the method further comprises calendering, densifying, laminating, or pressing the cast film. In some examples, the method includes polishing or cutting a sintered or heated material to reduce its thickness.

Green Films

In some examples, set forth herein are sintered electrolyte films. Prior to a heat treatment of a film having an inorganic and organic component (e.g., polymer), the film is referred to as a "green film." In some examples, the inorganic electrolyte is lithium-stuffed garnet powder, lithium-stuffed garnet chemical precursors, a sulfide electrolyte, or a combination thereof. In some examples, the inorganic electrolyte is a LIRAP or LBHI. In some examples, these films are extruded in layers or deposited or melt-cast or laminated onto other electrolytes in order to build up several layers of a composite electrolyte. In some examples, multiple green films are stacked and laminated prior to sintering. In some examples, these films are extruded as slurries that optionally include additional components. In some examples, these additional components include at least one member selected from a binder, a solvent, a dispersant, or combinations thereof. In some examples, the solid loading is at least 50% by volume. In some examples, the film thickness is less than 100 µm.

In some examples, the dispersant in the green film is a commercially available dispersant.

In some examples, the composite electrolytes films are extruded onto a substrate. In certain examples, the substrate is a polymer, a metal foil, or a metal powder. In some of these examples, the substrate is a metal foil. In some other examples, the substrate is a metal powder. In some of these examples, the metal is selected from Ni, Cu, Al, steel, alloys, or combinations thereof.

In some examples, the green films have a film thickness less than 75 µm and greater than 10 nm. In some examples, these films have a thickness less than 50 µm and greater than 10 nm. In some examples, the films include solid particles which are less than 5 µm at the particles maximum physical dimension (e.g., diameter for a spherical particle). In some examples, the films have a median solid particle grain size of between 0.1 µm to 10 µm. In other examples, the films are not adhered to any substrate. These films not adhered to any substrate are referred to as self-supporting or free standing.

In some examples, the electrolytes green films have a thickness from about 10 µm to about 100 µm. In some other of the methods disclosed herein, these film have a thickness from about 20 µm to about 100 µm. In certain of the methods disclosed herein, the film has a thickness from about 30 µm to about 100 µm. In certain other of the methods disclosed herein, the film has a thickness from about 40 µm to about 100 µm. In yet other methods disclosed herein, the film has a thickness from about 50 µm to about 100 µm. In still other methods disclosed herein, the film has a thickness from about 60 µm to about 100 µm. In yet some other methods disclosed herein, the film has a thickness from about 70 µm to about 100 µm. In some of the methods disclosed herein, the film has a thickness from about 80 µm to about 100 µm. In some other of the methods disclosed herein, the film has a thickness from about 90 µm to about 100 µm. In some of the methods disclosed herein, the film has a thickness from about 10 µm to about 90 µm. In some other of the methods disclosed herein, the film has a thickness from about 20 µm to about 80 µm. In certain of the methods disclosed herein, the film has a thickness from about 30 µm to about 70 µm. In certain other of the methods disclosed herein, the film has a thickness from about 40 µm to about 60 µm. In yet other methods disclosed herein, the film has a thickness from about 50 µm to about 90 µm. In still other methods disclosed herein, the film has a thickness from about 60 µm to about 90 µm. In yet some other methods disclosed herein, the film has a thickness from about 70 µm to about 90 µm. In some of the methods disclosed herein, the film has a thickness from about 80 µm to about 90 µm. In some other of the methods disclosed herein, the film has a thickness from about 30 µm to about 60 µm. In some examples, the films have a thickness of about 1-150 µm. In some of these examples the films has a thickness of about 1 µm. In some other examples the films has a thickness of about 2 µm. In certain examples, the films has a thickness of about 3 µm. In certain other examples the films has a thickness of about 4 µm. In some other examples the films has a thickness of about 5 µm. In some examples the films has a thickness of about 6 µm. In some of these examples the films has a thickness of about 7 µm. In some examples the films has a thickness of about 8 µm. In some other examples the films has a thickness of about 9 µm. In certain examples the films have a thickness of about 10 µm. In certain examples the films have a thickness of about 11 µm. In certain examples the films have a thickness of about 12 µm. In certain examples the films have a thickness of about 13 µm. In certain examples the films have a thickness of about 14 µm. In certain examples the films have a thickness of about 15 µm. In certain examples the films have a thickness of about 16 µm. In certain examples the films have a thickness of about 17 µm. In certain examples the films have a thickness of about 18 µm. In certain examples the films have a thickness of about 19 µm. In certain examples the films have a thickness of about 20 µm.

In some examples, the green electrolytes films set forth herein include an inorganic electrolyte combined with at least one or more polymers. In some of these examples, the polymers include, but are not limited to, polyethylene oxide (PEO), polypropylene oxide (PPO), PEO-PPO block copolymers, styrene-butadiene, polystyrene (PS), acrylates, diacrylates, methyl methacrylates, silicones, acrylamides, t-butyl acrylamide, styrenics, t-alpha methyl styrene, acrylonitriles, vinyl acetates, polypropylene (PP), polyvinyl butyral (PVB), polyvinyl pyrrolidone (PVP), atactic polypropylene (aPP), isotactive polypropylene ethylene propylene rubber (EPR), ethylene pentene copolymer (EPC), polyisobutylene (PIB), styrene butadiene rubber (SBR), polyolefins, polyethylene-co-poly-1-octene (PE-co-PO); PE-co-poly(methylene cyclopentane), (PE-co-PMCP), stereoblock polypropylenes, polypropylene polymethylpentene, polyethylene (e.g., low density linear polyethylene), polybutadiene, copolymer and combinations thereof.

In some examples, the methods here include batching raw precursor material as follows: LiOH, Al(NO$_3$)$_3$.9H$_2$O, ZrO$_2$, and La$_2$O$_3$ are gathered in quantities corresponding to molar amounts of the final Li-stuffed garnet setter plate final composition (Li$_4$La$_B$M'$_C$M"$_D$Zr$_E$O$_F$, Li$_4$La$_B$M'$_C$M"$_D$Ta$_E$O$_F$, or Li$_4$La$_B$M'$_C$M"$_D$Nb$_E$O$_F$, wherein 4<A<8.5, 1.5<B<4, 0≤C≤2, 0≤D≤2; 0≤E≤2, 10<F<13, e.g., Li$_7$La$_3$Zr$_2$O$_{12}$), as described above and as also described in various experimental examples of U.S. Patent Application Publication No. 2015-0099190 A1, the entire contents of which are herein incorporated by reference in its entirety for all purposes. In one embodiment, precursor materials are combined in proportions that, when reacted, produce a composition of Li$_7$Li$_3$Zr$_2$O$_{12}$ or Li$_7$Li$_3$Zr$_2$O$_{12}$(0.1-1.0) Al$_2$O$_3$. The precursor materials are dried at 120° C. for at least 45 minutes. The dried precursor materials mixed and are optionally in some embodiments milled in a ball mill between 6 and 8 hours using, in some examples, 0.3 mm yttria-stabilized zirconium oxide grinding media beads. The result is a particle size distribution of precursor materials with a d$_{50}$ of approximately 100 nm. In some examples, the result is a particle size distribution of precursor materials with a d$_{50}$ of approximately 100 nm to 600 nm. The precursor materials are optionally crushed using a Retzsch mill and sieved using a 40 mesh sieve for 5 minutes. The precursor materials are then placed in an alumina crucible, covered, and calcined 224 at about 900° C. (or 400 to 1200° C.) for approximately 6 hours (or 2, 4, 6, or 8 hours). The calcined product is then crushed with, for example, a mortar and pestle although other grinding and milling mechanisms may be used. The calcined and crushed precursor materials are then attrition milled by suspending approximately 62.5 weight % solids and 10 weight % dispersant, with a suspension media such as isopropyl alcohol making up the balance of the weight (i.e., approximately 27.5 weight %). In some examples, these steps includes about 60 g of garnet, about 30 g of solvent, and about 10 g of dispersant. In some examples, the solvent is isopropanol and butanol.

Examples of dispersants, used to facilitate suspension of the calcined and crushed precursor materials in the isopropyl alcohol include, but are not limited to, phosphate esters, RHODOLINE™ 4160, rhodoline 4188, Phoschem R6, phoschem PD, phospholan-131™, esters such as fish oil, BYK™ 22124, surfactants, fluorosurfactants, polyvinylpyridine (PVP), polyvinyl butadiene (PVB), TRITON™, phospholan-131™, BYK™ 22124, BYK™ 22416, Hypermer KD1™, polyalkylene amine such as Hypermer KD2, acrylic polymers such as Hypermer KD6™, Hypermer KD7™ and others, such as Dispersbyk-118, BYK™ 22146, Hypermer KD7™. While isopropyl alcohol is used in this example, other solvents may also be used including toluene, ethanol, combinations thereof (i.e., toluene:ethanol::4:1) and others. The attrition milling may be performed for approximately eight hours with an inert zirconia grinding media to produce a d$_{50}$ particle size distribution from approximately 100 nm to approximately 1 µm (e.g., 300 nm to approximately 400 nm).

The above materials can be formulated as a slurry. The slurry is optionally centrifuged at 2000 rpm for 1-12 hours. If, however, the slurry is centrifuged, the supernatant is drained and the percentage of solids in the remaining slurry is determined. If the slurry is not centrifuged, the solid loading is determined and adjusted appropriately. In some examples the percentage of solids in the slurry is between approximately 40 weight %, 50 weight % 60 weight % or 70 weight %. In some examples, the slurry is adjusted or prepared so that the slurry includes, in relative amounts respectively, approximately 60 g of garnet, approximately 100 g of solvent, approximately 4 g of binder (PVB) and approximately 1 g of plasticizer (e.g., dibutyl phthalate, benzyl dutyl phthalate).

In some examples, the slurry is mixed with a 4 weight % solution of polyvinyl butyral binder in toluene in a weight ratio of 1:1. This mixture is then dried, mechanically crushed (for example, using a mortar and pestle), and sieved 276, for example, using an 80 mesh sieve. Resulting from 276 is a slurry having approximately 100 g of garnet, 4 g of binder, and 1 g of plasticizer.

In some examples, the green film slurry used to make a sintered film includes about 50 wt % powder, 47.5 wt % solvent, 2 wt % binder and 0.5 wt % plasticizer. Binders and solvents are described herein, above and below. The combined components are then mixed and/or optionally milled for approximately 8 hours (e.g., by hand stirring although the components can be combined using appropriate mixer or blender). The mixed components are placed on a hot plate or oven to remove the solvents. Other methods to remove solvents such as ROTO-VAP™ or spray drying could also be used.

In some examples, the green film is then placed between, or on top of, commercially available (e.g., platinum) setter plates (or alternatively on a single substrate) and sintered 284 in a furnace at from approximately 500° C. to approximately 1300° C. (and preferably from 1075° C. to approximately 1150° C.) in an argon atmosphere, for approximately three hours to approximately six hours. In some examples, the setter plate is removed from the furnace at temperature to air quench. In some other examples, the setter plate is left in the oven to cool over many hours. The ramp rate of the furnace is from about 1° C./min to about 10° C./min.

In some examples, an unsintered thin film is prepared or cast so that it can be placed between setter plates in a subsequent sintering procedure. This process includes a slurry preparation step in which a combination of milled Li-stuffed garnet powder that is a product of the above materials with one or more solvents, a binder, and a plasticizer (such as dibutyl phthalate).

In some examples, the slurry includes a solvent selected from isopropanol, water, butanol, tetrahydrofuran (THF), with a binder (e.g., PVB), a plasticizer. In some examples, the solvent includes about 10-30% w/w isopropanol, 1-10% w/w water, 1-10% w/w butanol, and 10-30% w/w tetrahydrofuran (THF) [e.g. 100 grams garnet, 12 grams binder, 12 grams DBP, 20-30 grams solvent]. In some examples, the solvent includes about 20-30% w/w isopropanol, 3-6% w/w water, 3-6% w/w butanol, and 20-30% w/w tetrahydrofuran (THF). In some examples, the binder is 5% w/w. In some examples, the plasticizer is 5% w/w. In these examples, the garnet or calcined precursor materials represents the remaining % w/w (e.g., 40, 50, or 60% w/w). In some examples, a dispersant is used during the milling process. In some examples, the dispersant is a phosphate ester. In some examples, the plasticizer is dibutyl thalate or benzyl butyl phthalate. In some examples, the solvent is butanol and THF. In some examples, the solvent is butanol, water and THF. In some examples, the solvent is butanol, water, toluene, and THF. In some examples, the solvent is butanol and toluene. In some examples, the solvent is butanol, water and THF.

Examples of solvents include toluene, ethanol, diacetone alcohol, and combinations thereof. Other examples of solvents include combinations of isopropanol, butanol, and toluene. Other examples of solvents include methanol, ethanol, isopropanol, butanol, pentanol, hexanol, toluene, xylene, tetrahydrofuran, toluene:ethanol, acetone, N-methyl-2-pyrrolidone (NMP) diacetone alcohol, ethyl acetate, acetonitrile, hexane, nonane, dodecane, methyl ethyl ketone (MEK), and combinations thereof.

Examples of binders, used to facilitate the adhesion between the Li-stuffed garnet particles, include, but are not limited to, polypropylene (PP), polyvinyl butyral (PVB), poly ethyl methacrylate (PMMA), polyvinyl pyrrolidone (PVP), atactic polypropylene (aPP), isotactive polypropylene ethylene propylene rubber (EPR), ethylene pentene copolymer (EPC), polyisobutylene (PIB), styrene butadiene rubber (SBR), polyolefins, polyethylene-copoly-1-octene (PE-co-PO); PE-co-poly(methylene cyclopentane) (PE-co-PMCP); stereo block polypropylenes, polypropylene polymethylpentene copolymer, poly propylene carbonate, methyl methacrylate, ethyl methacrylate, and silicone. Other binders include binder is selected polypropylene (PP), atactic polypropylene (aPP), isotactic polypropylene (iPP), ethylene propylene rubber (EPR), ethylene pentene copolymer (EPC), polyisobutylene (PIB), styrene butadiene (SBR), polyolefins, polyethylene-co-poly-1-octene (PE-co-PO), PE-co-poly(methylene cyclopentene) (PE-co-PMCP), stereoblock polypropylenes, polypropylene polymethyl pentene, polyethylene oxide (PEO), PEO block copolymers, silicone, and combinations thereof.

In order to make unsintered tape-cast films (i.e., green films), the following steps may be employed. The garnet precursors are combined in amounts such that after sintering, the ratio of chemical reactants matches the ratio of the constituent components in the final garnet electrolyte film assuming no mass loss. These precursors are mixed and milled. After about 8 hours, a plasticizer is added in an amount of approximately 5 weight % of the combined components. Solvent is added in an amount of approximately 5-50 weight % of the combined components. Mixing and milling may optionally continue after the addition of the plasticizer and solvent for another 12 hours. After the completion of the mixing and milling, a resulting slurry is filtered to remove any remaining grinding media and agglomerates or to ensure the homogeneity of the particle sizes therein. The slurry can then be cast, e.g., by doctor blading, to prepare a thin film of unsintered garnet.

Sintering Methods

In some examples, the methods set forth herein include a sintering step. In some of these examples, sintering includes heating the electrolyte film or powder in the range from about 850° C. to about 1200° C. for about 1 to about 720 minutes and in atmosphere having an oxygen partial pressure between 1 atm to 1e-15 atm.

In some examples, the methods set forth herein include a sintering step. In some of these examples, sintering includes heating the electrolyte film, powder, or precursor to about 1100° C. for about one to four hours.

Sintering, in some examples, includes sintering by forging, field-assisted sintering, spark plasma sintering, hot-press sintering, sintering with the addition of secondary phases to control grain growth, liquid phase sintering or a combination thereof.

F. EXAMPLES

Electron microscopy was performed in a FEI Quanta SEM, a Helios 600i, or a Helios 660 FIB-SEM, though equivalent tools may be substituted. XRD was performed in a Bruker D8 Advance ECO or a Rigaku Miniflex 2. EIS was performed with a Biologic VMP3, VSP, VSP-300, SP-150, or SP-200. Optical imaging was performed with an optical camera. DC cycling was performed with Arbin BT-2043, or BT-G, though it is understood that equivalent tools may be substituted.

Example 1

Method of Making Translucent and Flexible Li$^+$ Ion-Conducting Separator

In this example, a mixture of $Li_2S:P_2S_5:LiI$ (herein "LPSI") was mixed for 1-24 hours at 100-300 rpm in an inert and hermetic milling vessel with inert media, in an 60-75:10-25:5-30 mole ratio. The resulting mixture was then sieved and annealed in an inert and hermetic vessel at a temperature of 175-500° C. for a time from 180-600 min. The heat treated mixture was removed from the annealing vessel and sieved. The sieved material was hot pressed at a pressure of 2-20 MPa line pressure in a hydraulic press and heated at 150-400° C. for 10-600 min. All processing was performed in an inert atmosphere. This process formed the LPSI translucent separator.

A translucent separator is shown optically (100) in FIG. 1 as a circular-shaped translucent film of LPSI (101). The film (101) is shown in FIG. 1 supported by tweezers (102). The film (101) has a diameter of approximately 1 cm. The film is flexible and bends under its own weight, as shown in FIG. 1.

Figure 2:
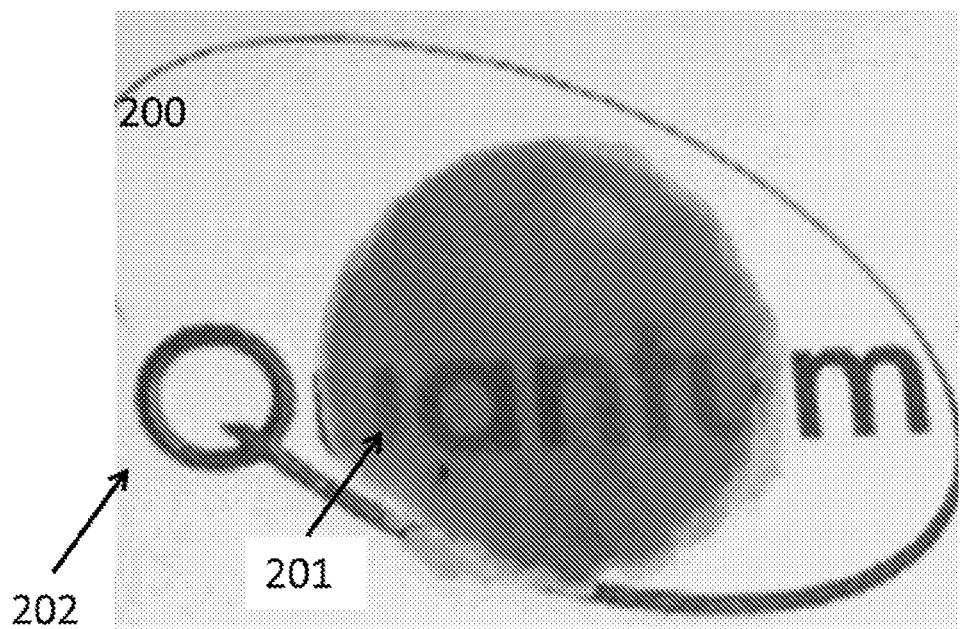

As shown in FIG. 2, the translucent separator is overlaid over a piece of paper with the word "Quantum" written on it (200). The film (201) is shown in FIG. 2 supported on top of the paper (202). The film (201) has a diameter of approximately 1 cm.

Example 2

Spark-Plasma-Synthesis (SPS) Method of Making Li$^+$ Ion-Conducting Separator

In this method, lithium-stuffed garnet calcined powders were batched. Specifically, powders with small particle size of LiOH, $La_2O_3$, $ZrO_2$, and aluminum nitrate nonahydrate were dried and well mixed in a weight ratio of about 1.8:5.8:2.9:1. The powder is calcined in alumina crucibles at between 750-1100° C. for 2-20 hours and then crushed. The crushed calcined powder is loaded into a die and the die is loaded into an SPS chamber. The powder is sintered under a pressure of 1-200 MPa at a temperature of 750-1200° C.

for 1-660 min. The temperature ramp rate varies from 5-100° C./min. Current and voltage are supplied according to a closed-loop feedback control to hit the desired temperature.

The green film was sintered used an SPS apparatus Thermal Technology SPS25-10. The SPS apparatus provides uniaxial pressure to the sintering film while it is sintering. SPS also provides an electrical field for fast densification of the sintering film.

Figure 6:
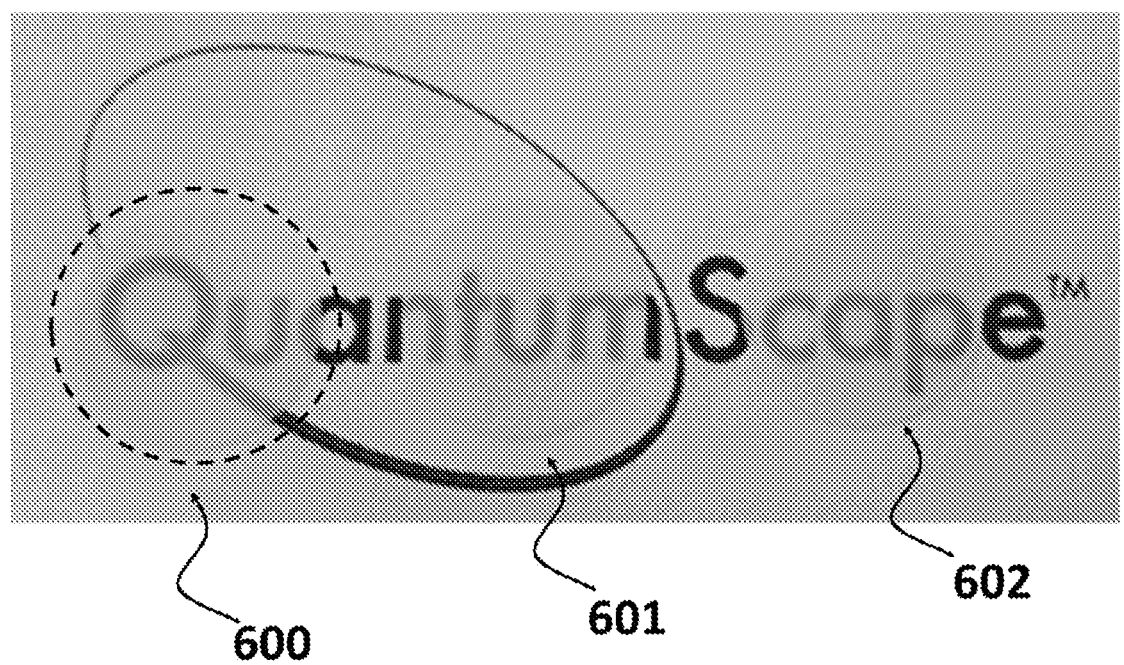
FIG. 6 shows an optical image of a translucent lithium-stuffed garnet separator, prepared according to Example 2.
Figure 7:
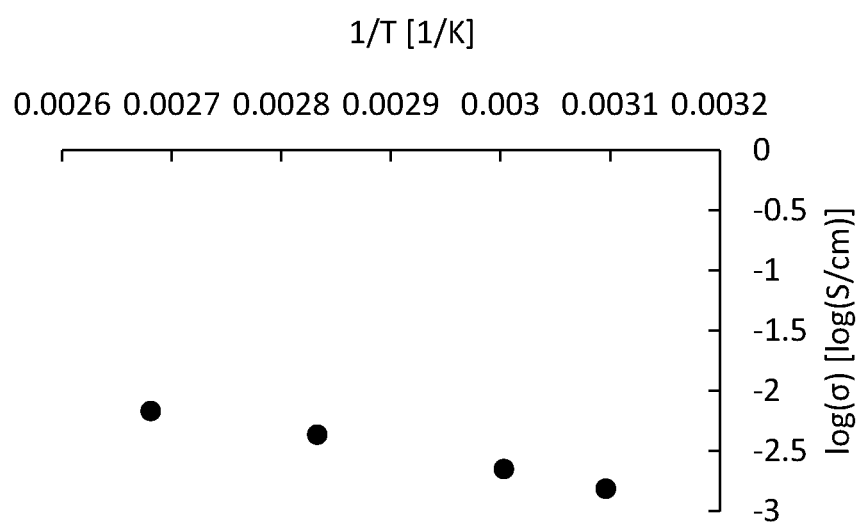
FIG. 7 shows an Arrhenius plot of conductivity [Log($\sigma$)] as a function of 1/T wherein T is Temperature in Kelvin for a translucent lithium-stuffed garnet separator, prepared according to Example 2.

As shown in FIG. 6, a transparent separator was produced by the method in this Example. FIG. 6 shows three transparent separators, labeled as 600, 601, and 602 respectively. The area in FIG. 6 showing transparent separator, 600, is outlined to highlight it.

Figure 3:
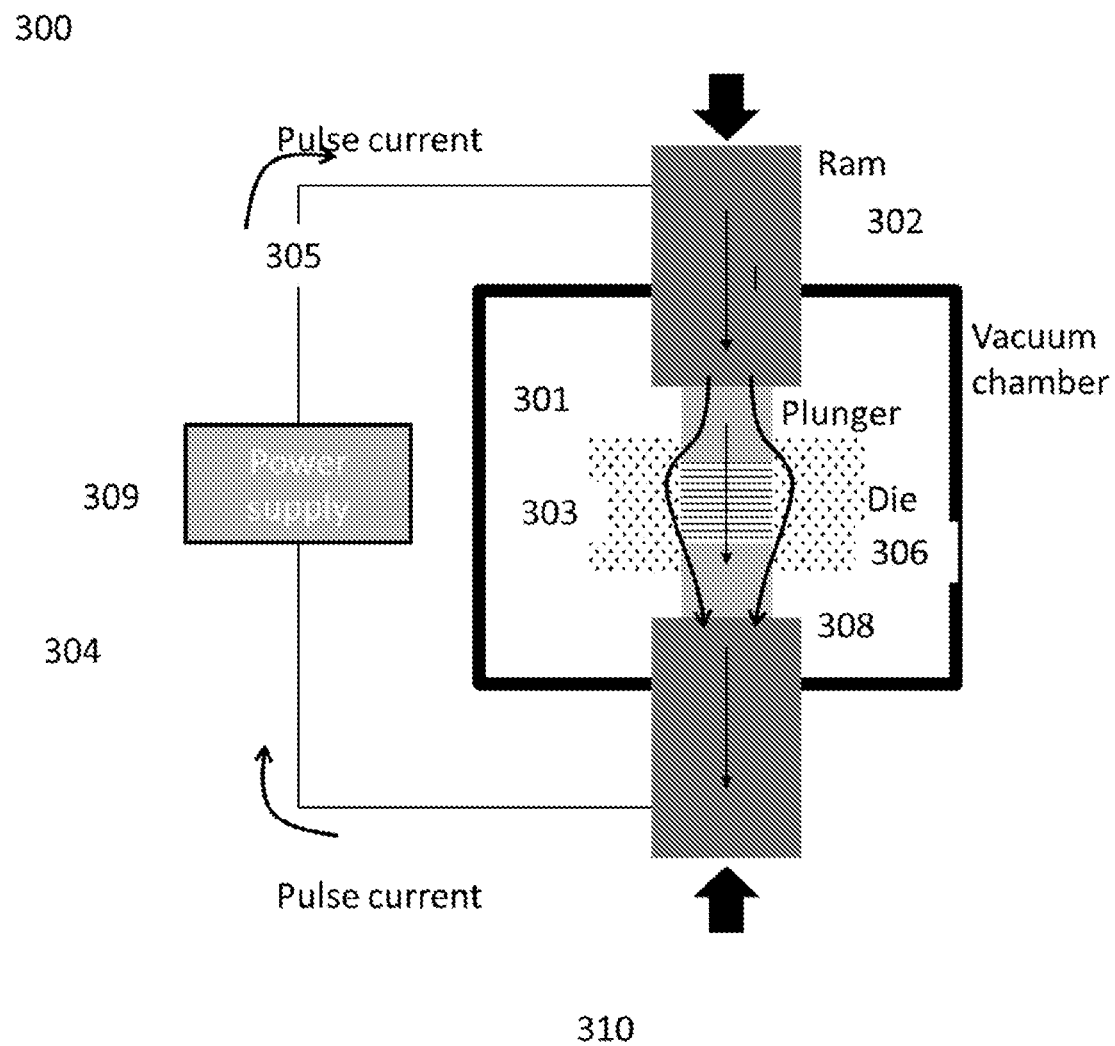
FIG. 3 shows a schematic of spark plasma sintering (SPS).

As shown in FIG. 3 the SPS apparatus (300) includes a list of components. Included are a vacuum chamber (301) which allows for atmosphere control around the sintering film. Also included are rams (302) and (303), included in a graphite die case (306), which are used to apply pressure to powder (303). The SPS also includes a means for running a current (305) and (309). The SPS also includes a thermocouple (308) for monitoring and controlling temperature of the sintering film.

Figure 4:
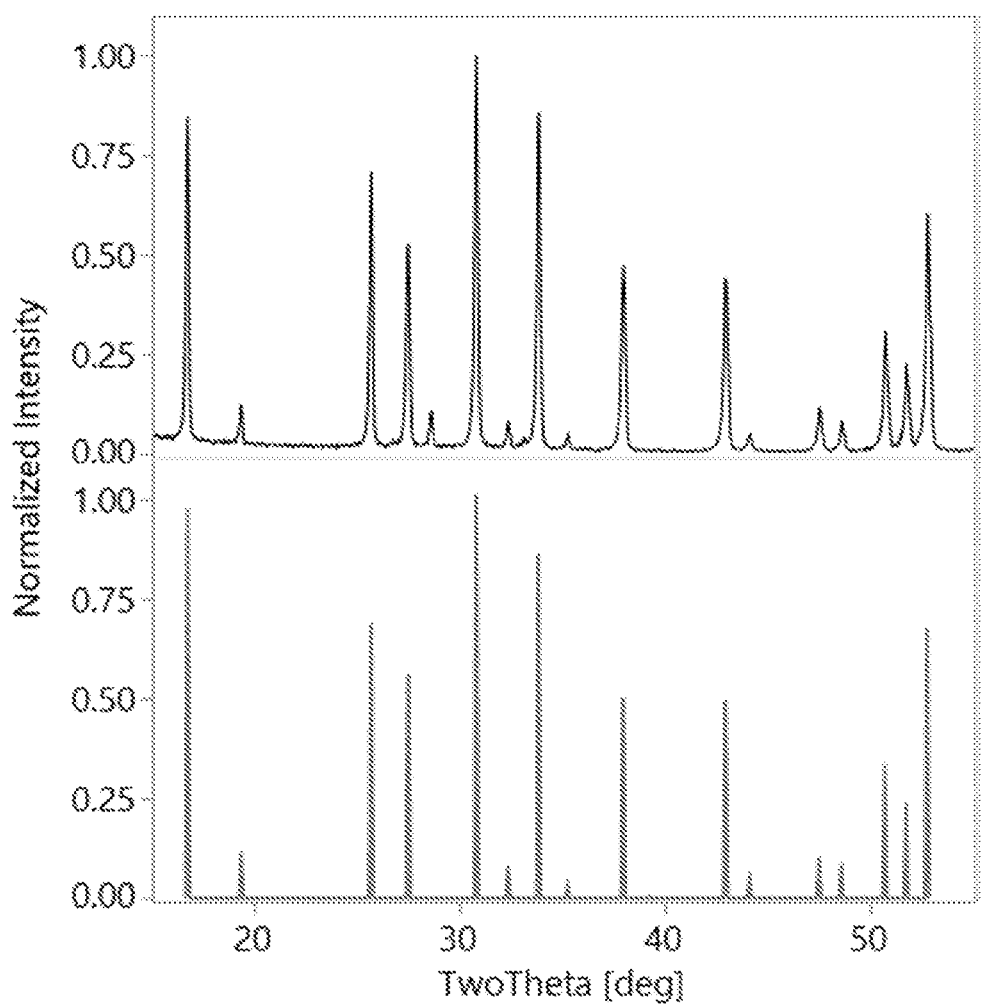
FIG. 4 shows an XRD pattern of a translucent lithium-stuffed garnet separator prepared according to Example 2 (top) overlaid with a reference XRD pattern (bottom).

As shown in FIG. 4, the material sintered according to the SPS method of this Example retained the garnet crystal phase. One sintered sample was analyzed by XRD and is compared to a garnet crystal phase reference pattern.

Electrochemical Impedance Spectroscopy (EIS) was performed on the SPS films to measure the Area-Specific Resistance (ASR) of each sample prepared by the SPS method in this Example. EIS was performed by attaching a Biologic VMP3 to lithium contacts deposited on two sides of a sample. An AC voltage of 25 mV rms is applied across a frequency of 300 kHz-0.1 mHz while the current is measured. As is known in the art, EIS allows partitioning of the ASR into bulk and interfacial ASR by resolving two semicircles in a Nyquist plot. An interfacial ASR ($ASR_{interface}$) is calculated from the interfacial resistance ($R_{interface}$) via $ASR_{interface} = R_{interface} * A/2$ where A is the area of the electrodes in contact with the separator and the factor of 2 accounts for 2 interfaces, assuming they are symmetric.

Six (6) samples were prepared by the method of this Example, the EIS test results at room temperature which are shown in Table 1, below

TABLE 1

| Sample (Room temperature) | Bulk [Ω] | Interface [Ω] | $ASR_{interface}$ [Ωcm$^2$] |
|---|---|---|---|
| SAMPLE 1 | 528.6 | 127.7 | 18.2 |
| SAMPLE 2 | 510.7 | 173.0 | 24.7 |
| SAMPLE 3 | 493.1 | 192.7 | 27.5 |
| SAMPLE 4 | 488.2 | 125.2 | 17.9 |
| SAMPLE 5 | 431.2 | 216.5 | 30.9 |
| SAMPLE 6 | 422.2 | 93.4 | 13.3 |

Example 3

Electrochemical Cycling of Separators Prepared from Example 2

Figure 5:
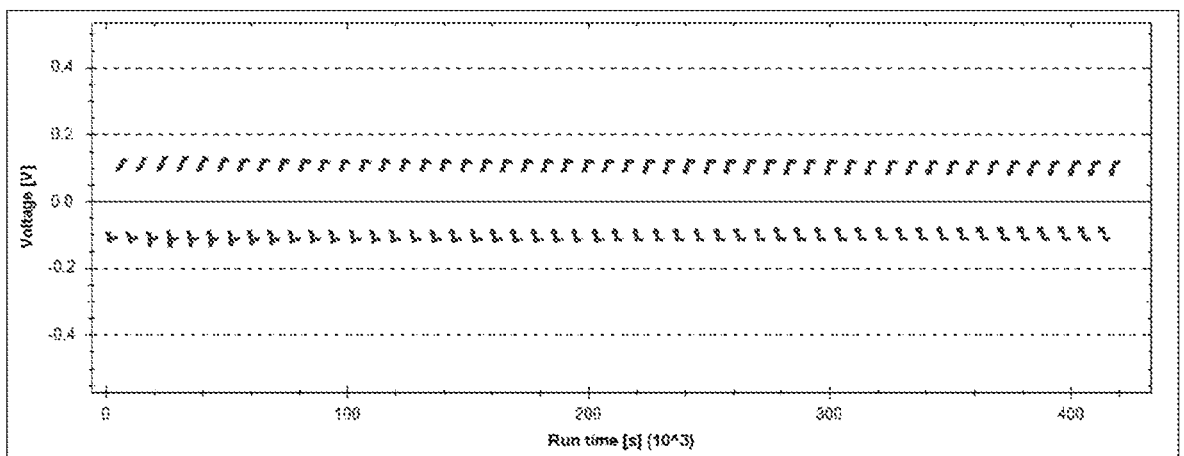
FIG. 5 shows DC cycling of a translucent lithium-stuffed garnet separator, prepared according to Example 2.

Separators were placed in a symmetric electrochemical cell with Li-metal electrodes on both sides of the samples. A current of 2 mA/cm$^2$ was applied to pass 2 mAh/cm$^2$ (about 10 μm) of lithium in one direction, then the polarity of current was reversed to pass 2 mAh/cm$^2$ (about 10 μm) of lithium in the opposite direction. Voltage was monitored during the test, and a plot of voltage versus time for the first 50 cycles is shown in FIG. 5. The sample was maintained at 50° C. during the test and a moderate amount of pressure is applied to maintain contact between lithium and the separator.

To prepare the sample for electrochemical measurement, after sintering, the sample surfaces were planarized and cleaned. Lithium was applied to each side in a manner as to obtain a low interfacial impedance. All processing was done in an inert atmosphere.

Example 4

Electrochemical Cycling of Separators Prepared from Example 2

FIG. 8 shows a plot of transmission versus wavelength for a translucent lithium-stuffed garnet separator, prepared according to Example 2. The transmittance of samples was measured by Thermo Evolution 220 UV-Vis instrument with 60 mm integrating sphere. The UV-Vis spectra was collected in transmittance mode with a wavelength range 400-800 nm and 2 nm/sec scan speed. A baseline correction was performed before measurements using 100% T (no sample)/0% T (blocked sample) method. All samples were mirror-polished to 0.7 mm thick to eliminate surface scattering and thickness effects.

Figure 9:
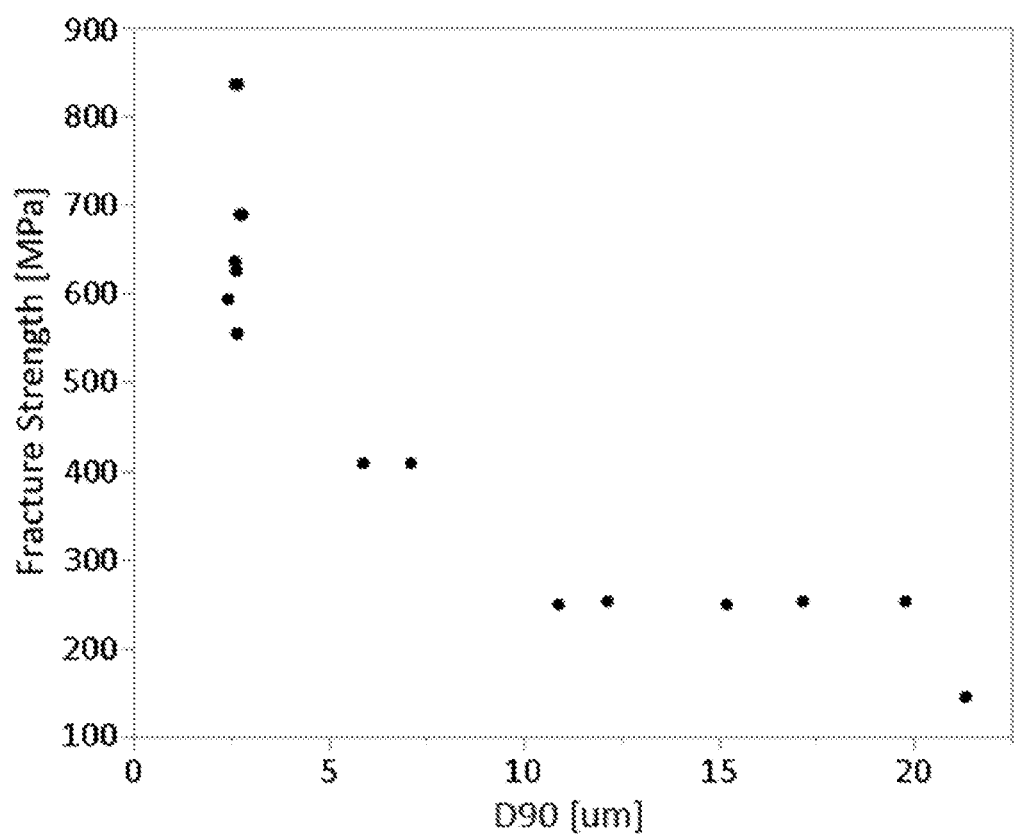
FIG. 9 shows a plot of fracture strength as determined by a ring-on-ring biaxial flexural strength test versus $d_{90}$ grain diameter as determined by quantitative SEM analysis of a surface of a tape-cast separator.

FIG. 9 shows a plot of fracture strength as determined by a ring-on-ring biaxial flexural strength test versus $d_{90}$ grain diameter as determined by quantitative SEM analysis of a surface of a tape-cast, sintered thin film separator. The variability in fracture strength is due to the fact that the weakest defect in a film will dictate the fracture strength. Nevertheless, the figure illustrates that high fracture strength can only be achieved for small grain size $d_{90}$ values. As used herein, the phrase "fracture strength," refers to a measure of force required to break a material, e.g., a thin film electrolyte, by inducing a crack or fracture therein. Fracture strength values recited herein were measured using the ring on ring test. The ring-on-ring test is a measure of equibiaxial flexural strength and may be measured as specified in the ASTM C1499-09 standard. The test is performed at ambient temperature unless stated explicitly otherwise.

Figure 10A:
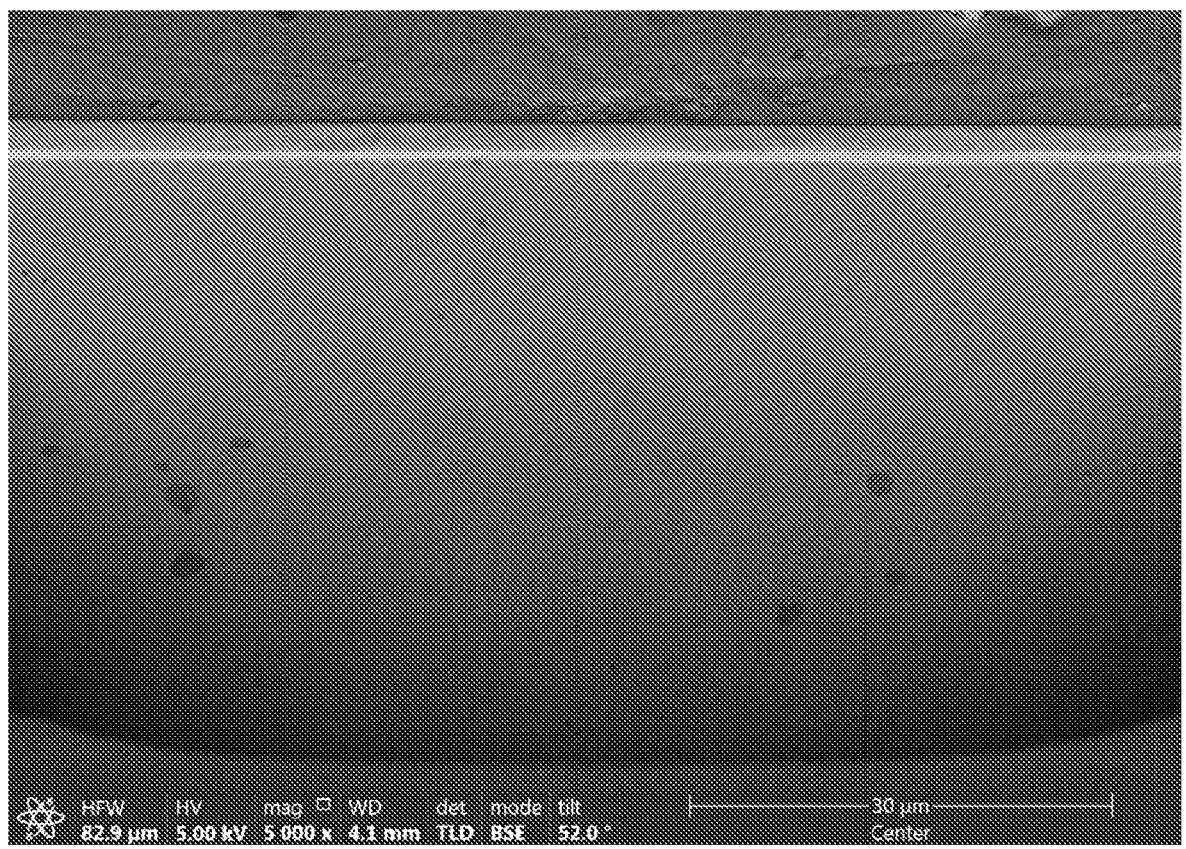
FIG. 10A shows a FIB cross-section image of a translucent and high density lithium-stuffed garnet separator, prepared according to Example 2.
Figure 10B:
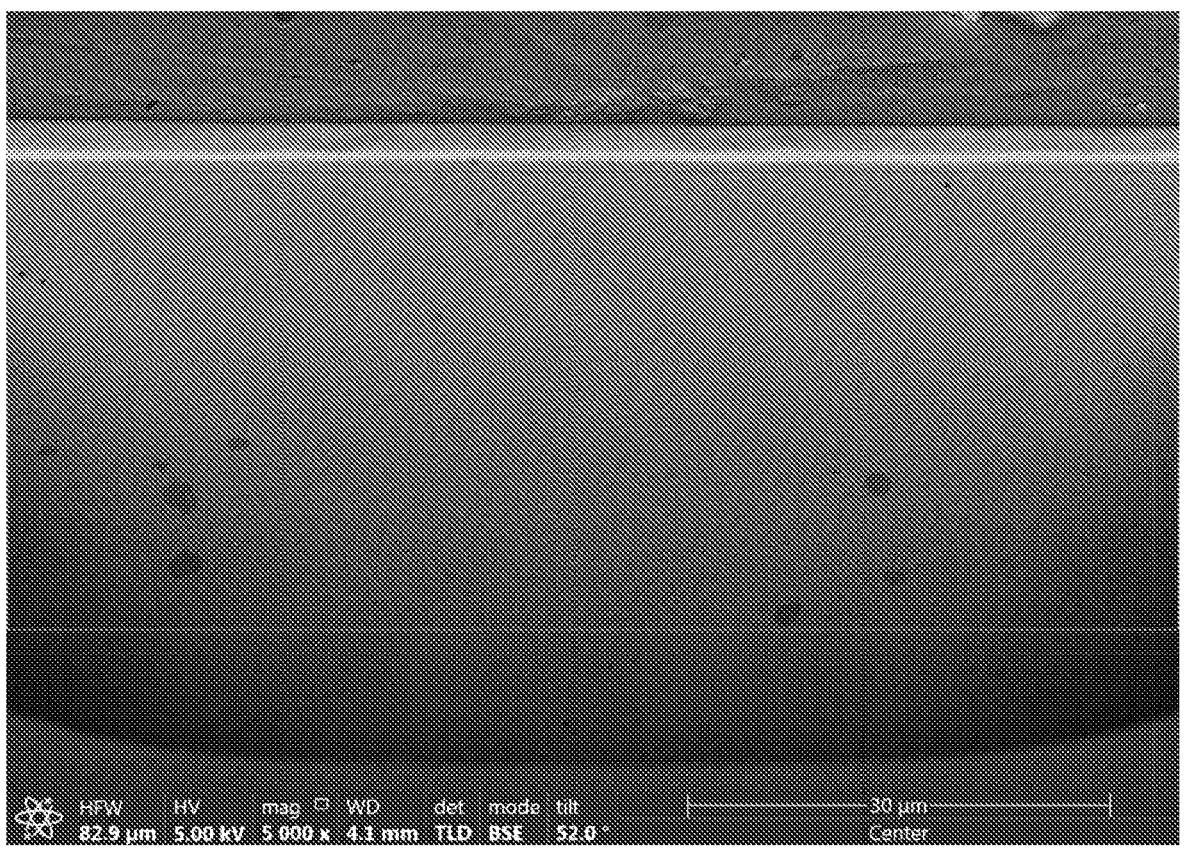
FIG. 10B shows the output of quantitative porosity determination for the image in FIG. 10A, showing a density of 99.95%.

FIG. 10A shows a FIB cross-section image of a translucent and high density lithium-stuffed garnet separator, prepared according to Example 2. FIG. 10B shows the output of quantitative porosity determination for the image in FIG. 10A, showing a density of 99.95%.

Example 5

A sample of LBHI was prepared by mixing the LiBH$_4$ and LiI in an inert vessel in a weight ratio of 1:1.5-2.5. Annealing was performed at 150-400° C. for 4-10 hours. A melt processed sample was created by taking the powder to above the melting point and pouring the melt into a mold and cooling slowly. A hot pressed sample was prepared by depositing mixed and calcined LBHI powder in a die, heating the die to below the melting point of LBHI, and applying pressure to the plungers over a time of 1-200 min.

The embodiments and examples described above are intended to be merely illustrative and non-limiting. Those skilled in the art will recognize or will be able to ascertain using no more than routine experimentation, numerous equivalents of specific compounds, materials and procedures. All such equivalents are considered to be within the scope and are encompassed by the appended claims.

What is claimed is:

1. A $Li^+$ ion-conducting separator, wherein the separator is polycrystalline and transmits more than 40% of incident light at 500 nm, 600 nm, or 700 nm wavelength; wherein a $d_{90}$ grain size ranges from 0.1 to 20 µm; wherein the thickness of the separator is less than 1 mm and wherein the thickness of the separator is greater than 10 nm.

2. The $Li^+$ ion-conducting separator of claim 1, wherein the separator is polycrystalline, with a $d_{90}$ grain size of less than 20 µm, and transmits more than 40% of incident light at 500 nm wavelength.

3. The $Li^+$ ion-conducting separator of claim 1, wherein the separator is polycrystalline, with a $d_{90}$ grain size of less than 20 µm, and transmits more than 40% of incident light at 600 nm wavelength.

4. The $Li^+$ ion-conducting separator of claim 1, wherein the separator is polycrystalline, with a $d_{90}$ grain size of less than 20 µm, and transmits more than 40% of incident light at 700 nm wavelength.

5. The $Li^+$ ion-conducting separator of claim 1, wherein the separator has a transmission coefficient greater than 0.5 for incident light at wavelengths in the range 300-700 nm.

6. The $Li^+$ ion-conducting separator of claim 1, wherein the separator has a transmission percentage greater than 50% for incident light at 500 nm wavelength.

7. The $Li^+$ ion-conducting separator of claim 1, wherein the separator has a 10% total reflectance for incident light at 400 nm to 700 nm wavelength.

8. The $Li^+$ ion-conducting separator of claim 7, wherein less than 10% of the total reflectance is diffuse reflectance and the remainder of the total reflectance is specular reflectance.

9. The $Li^+$ ion-conducting separator of claim 1, wherein the separator is selected from an oxide, a sulfide, a sulfide-halide, LIRAP, and a borohydride.

10. The $Li^+$ ion-conducting separator of claim 9, wherein the separator is an oxide selected from a lithium-stuffed garnet characterized by the formula $Li_xLa_yZr_zO_t \cdot qAl_2O_3$, wherein $4 < x < 10$, $1 < y < 4$, $1 < z < 3$, $6 < t < 14$, $0 \le q \le 1$.

11. The $Li^+$ ion-conducting separator of claim 10, wherein the lithium-stuffed garnet is doped with Nb, Ga, and/or Ta.

12. The $Li^+$ ion-conducting separator of claim 10, wherein the lithium-stuffed garnet is $Li_aLa_bZr_cAl_dMe''_eO_f$, wherein $5 < a < 8.5$; $2 < b < 4$; $0 < c \le 2.5$; $0 \le d < 2$; $0 \le e < 2$, and $10 < f < 13$ and Me'' is a metal selected from Nb, Ga, Ta, or combinations thereof.

13. The $Li^+$ ion-conducting separator of claim 10, wherein the lithium-stuffed garnet is characterized by the formula $Li_xLa_yZr_zO_t \cdot 0.11(Al_2O_3)$, $Li_xLa_yZr_zO_t \cdot 0.22(Al_2O_3)$, $Li_xLa_yZr_zO_t \cdot 0.35(Al_2O_3)$, $Li_xLa_yZr_zO_t \cdot 0.5(Al_2O_3)$, $Li_xLa_yZr_zO_t \cdot 0.65(Al_2O_3)$, $Li_xLa_yZr_zO_t \cdot 0.75(Al_2O_3)$, or $Li_xLa_yZr_zO_t \cdot (Al_2O_3)$, wherein $5 < x < 8.5$.

14. The $Li^+$ ion-conducting separator of claim 1, wherein the separator comprises:
   a lithium-stuffed garnet oxide characterized by the formula $Li_uLa_vZr_xO_y \cdot zAl_2O_3$, wherein
   u is a rational number from 4 to 8;
   v is a rational number from 2 to 4;
   x is a rational number from 1 to 3;
   y is a rational number from 10 to 14; and
   z is a rational number from 0.05 to 1;
   wherein u, v, x, y, and z are selected so that the lithium-stuffed garnet oxide is charge neutral.

15. The $Li^+$ ion-conducting separator of claim 1, wherein the separator has a transmission percentage that varies by less than ±10% over an area of at least 0.5 $cm^2$.

16. The $Li^+$ ion-conducting separator of claim 1, wherein the separator is transparent over an area of at least 1 $cm^2$.

17. The $Li^+$ ion-conducting separator of claim 1, wherein the separator is translucent over an area of at least $64.\pi\ mm^2$.

18. The $Li^+$ ion-conducting separator of claim 1, having a defect density less than $1/m^2$ to $1/mm^2$.

19. The $Li^+$ ion-conducting separator of claim 1, having a scattering center density that ranges from less than $1/m^2$ to $1/mm^2$.

20. The $Li^+$ ion-conducting separator of claim 1, having a geometric porosity that ranges from 10 (parts-per-billion) ppb to 6%.

21. The $Li^+$ ion-conducting separator of claim 1, having an Archimedes porosity that ranges from 10 ppb to 6%.

22. The $Li^+$ ion-conducting separator of claim 1, wherein the lithium ion conductivity is greater than $10^{-4}$ S/cm at 25° C.

23. The $Li^+$ ion-conducting separator of claim 1, wherein the lithium interfacial area-specific resistance is less than 20 $\Omega cm^2$ at 25° C.

24. An electrochemical cell comprising a $Li^+$ ion-conducting separator of claim 1.

25. The electrochemical cell of claim 24, wherein the electrochemical cell is a rechargeable battery.

* * * * *